United States Patent
Yan et al.

(10) Patent No.: US 8,679,859 B2
(45) Date of Patent: Mar. 25, 2014

(54) METHOD FOR FUNCTIONALIZING MATERIALS AND DEVICES COMPRISING SUCH MATERIALS

(75) Inventors: Mingdi Yan, Lake Oswego, OR (US); Olof Ramström, Stockholm (SE); Li-Hong Liu, Portland, OR (US); Xin Wang, Portland, OR (US); Michael M. Lerner, Corvallis, OR (US); Tosapol Maluangnont, Corvallis, OR (US)

(73) Assignees: State of Oregon by and through the State Board of Higher Education on behalf of Porland State University, Portland, OR (US); State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 1153 days.

(21) Appl. No.: 12/455,269

(22) Filed: May 28, 2009

(65) Prior Publication Data
US 2010/0028559 A1    Feb. 4, 2010

Related U.S. Application Data

(63) Continuation-in-part of application No. PCT/US2008/003348, filed on Mar. 12, 2008.

(60) Provisional application No. 60/906,863, filed on Mar. 12, 2007, provisional application No. 61/063,635, filed on Feb. 4, 2008, provisional application No. 61/130,210, filed on May 28, 2008.

(51) Int. Cl.
*G01N 33/543* (2006.01)

(52) U.S. Cl.
USPC ........... 436/518; 977/700; 977/734; 977/742; 436/532

(58) Field of Classification Search
USPC .................. 436/518, 532; 977/700, 734, 742
See application file for complete search history.

(56) References Cited

U.S. PATENT DOCUMENTS

| | | | |
|---|---|---|---|
| 5,465,151 | A | 11/1995 | Wybourne et al. |
| 5,580,697 | A | 12/1996 | Keana et al. |

(Continued)

FOREIGN PATENT DOCUMENTS

WO    WO/03/087206    10/2003

OTHER PUBLICATIONS

International Search Report from parent PCT Application No. PCT/US2008/003348, mailed Feb. 17, 2009.

*Primary Examiner* — Melanie Y Brown
(74) *Attorney, Agent, or Firm* — Klarquist Sparkman, LLP

(57) ABSTRACT

Devices comprising functionalized materials, and embodiments of a method for making and using such devices, are disclosed. Exemplary devices include ophthalmic devices, nanoparticles, quartz crystal microbalances, microarrays, and nanocomposites. In particular embodiments, device surfaces are modified with monomers and/or polymers, typically carbohydrate monomers and/or polymers. Embodiments of a method for making and using such devices are disclosed. Monomers and/or polymers are covalently bonded to surfaces using functionalized perhalophenylazides. In some embodiments, device surfaces are functionalized with a perhalophenylazide. One or more monomers and/or polymers subsequently are covalently bonded to the device surface using the perhalophenylazide. In other embodiments, monomers and/or polymers are derivatized with a functionalized perhalophenylazide. The derivatized monomers and/or polymers then are covalently bonded to the device surface using the perhalophenylazide. In some embodiments, graphite is functionalized with perhalophenylazide to produce a functionalized graphene sheet. In other embodiments, graphene sheets are covalently attached to functionalized substrates.

9 Claims, 40 Drawing Sheets
(18 of 40 Drawing Sheet(s) Filed in Color)

(56) References Cited

U.S. PATENT DOCUMENTS

| | | |
|---|---|---|
| 5,582,955 A | 12/1996 | Keana et al. |
| 5,587,273 A | 12/1996 | Yan et al. |
| 5,830,539 A | 11/1998 | Yan et al. |
| 6,022,597 A | 2/2000 | Yan et al. |
| 6,478,423 B1 | 11/2002 | Turner et al. |
| 6,586,038 B1 | 7/2003 | Chabrecek et al. |
| 6,869,581 B2 * | 3/2005 | Kishi et al. .................. 423/447.6 |
| 6,923,978 B2 | 8/2005 | Chatelier et al. |
| 6,940,580 B2 | 9/2005 | Winterton et al. |
| 7,040,756 B2 | 5/2006 | Qiu et al. |
| 7,303,814 B2 | 12/2007 | Lamberti et al. |
| 2004/0242023 A1 | 12/2004 | Yan et al. |
| 2005/0019791 A1 * | 1/2005 | Jung et al. ..................... 435/6 |
| 2005/0053642 A1 | 3/2005 | Ulbricht et al. |
| 2007/0138007 A1 * | 6/2007 | Yemini et al. ................. 204/291 |
| 2008/0214410 A1 | 9/2008 | Yan et al. |
| 2009/0075430 A1 * | 3/2009 | White et al. .................. 438/122 |
| 2009/0253590 A1 * | 10/2009 | Murakoshi et al. ............. 506/22 |
| 2009/0286308 A1 * | 11/2009 | Berthelot et al. .......... 435/287.1 |

* cited by examiner

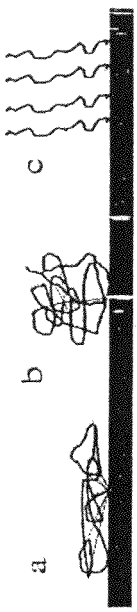
FIG. 12
FIG. 13
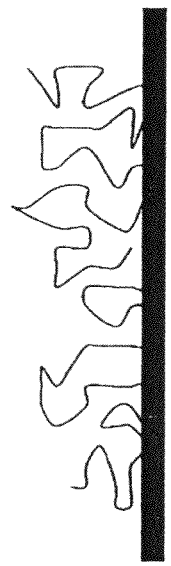
FIG. 14
FIG. 15

METHOD FOR FUNCTIONALIZING MATERIALS AND DEVICES COMPRISING SUCH MATERIALS

CROSS REFERENCE TO RELATED APPLICATIONS

This application is a continuation in part of PCT Application No. PCT/US2008/003348, filed Mar. 12, 2008, which claims the benefit of the earlier filing date of currently pending U.S. Provisional Application No. 60/906,863, filed Mar. 12, 2007, and U.S. Provisional Application No. 61/063,635, filed Feb. 4, 2008, which are incorporated herein by reference. This application also claims the benefit of the earlier filing date of currently pending U.S. Provisional Application No. 61/130,210, filed May 28, 2008, which is incorporated herein by reference.

ACKNOWLEDGMENT OF GOVERNMENT SUPPORT

This invention was made with government support under grant number INT-0122964 awarded by the National Science Foundation, NIH AREA grant number 1R15 GM066279-01A2 awarded by the National Institutes of Health, and NIH Award Numbers R01GM080295 and 2R15GM066279 awarded by the National Institutes of General Medical Science (NIGMS). The government has certain rights in the invention.

FIELD

The present disclosure concerns devices comprising functionalized materials, especially devices with monomer-coated and/or polymer-coated surfaces, and embodiments of a method for preparing such functionalized materials.

BACKGROUND

Previous methods have been reported in the literature for coating substrates with polymers to alter the chemical and physical properties of the substrate surface. In traditional colloidal chemistry, for example, polymers are coated onto nanoparticles by physisorption, thus providing a passivation layer and preventing the nanoparticles from aggregation or degradation. Polyelectrolyte deposition is a popular method due to the simplicity of the process. This method relies on the Coulombic attraction between a charged nanoparticle and an oppositely charged polyelectrolyte polymer. (Wang, D. et al., *Chem. Mater.* 2002, 14:1909-1913.) The drawback to this method is that it is limited only to polymers that are available in a polyelectrolyte form.

Alternatively, polymers can be coated onto substrates by covalent bond formation. Covalent attachment generally falls into one of two categories, the first of which is the so-called grafting-from method. (Bourgeat-Lami, E., *J. Nanosci. Nanotech.*, 2002, 2:1-24.) In this approach, the polymer is produced in situ, which also is known as surface-initiated polymerization. (Bartholeme, C. et al., *Macromolecules*, 2003, 36:7946-7952.) Another common approach to covalently coating substrates with polymers is the grafting-to technique. This approach employs polymers that possess specific functional groups that can react with surface functionalities on the substrates. Again, the drawback to these methods is that they are limited to polymers that have specific functional groups or polymers that can polymerize in situ.

U.S. Pat. No. 5,830,539, which is incorporated herein by reference, describes embodiments of a method for altering the chemical and physical properties of the surface of a microstructure, e.g., a micro-well etched into a silicon wafer, by applying a thin film of a polymeric material to the microstructure surface. U.S. patent application Ser. No. 10/769,423, filed Jan. 30, 2004, which is incorporated herein by reference, describes embodiments of a method for preparing polymer-based microstructures, such as micro-wells and micro-towers, on substrates.

Of particular interest is the coating of substrates with biocompatible monomers or polymers. For example, carbohydrate-coated substrates can be used to study the interactions between carbohydrates and proteins. Carbohydrates also have a unique ability to specifically interact with receptors on pathogens and toxins. Carbohydrates are stable compounds and are inherently biocompatible, nontoxic and non-immunogenic. Thus, they are a useful tool in many applications, such as diagnostics, environmental monitoring, food safety control, and the detection and decontamination of biological pathogens and toxins.

For this reason, there is a need for new and robust methods for generating biocompatible surfaces. These biocompatible surfaces will find application in areas such as glycomics, carbohydrate-protein interactions, drug delivery, drug discovery, nanomedicine, improved biomedical devices, and pathogen and toxin sensing and decontamination.

SUMMARY

The present disclosure concerns devices comprising functionalized materials and embodiments of a method for making such functionalized materials. For example, device surfaces are modified with carbohydrate monomers or polymers.

One embodiment concerns ophthalmic devices, such as contact lenses, having at least one monomer or polymer, typically a carbohydrate monomer or polymer, covalently attached to the device surface. The carbohydrate is selected to improve desirable properties of the ophthalmic device, such as increasing the contact lens hydrophilicity.

Certain embodiments concern nanoparticles modified with monomers or polymers. Some embodiments concern nanoparticles modified with carbohydrate monomers and/or polymers. The nanoparticles are useful for a variety of applications, including detecting and removing particular species, such as toxins and pathogens, from solutions. In another embodiment, monomers and/or polymers are attached to silica nanoparticles.

Other embodiments concern structures having a non-photoactive component associated with at least a portion of the surface. The non-photoactive component facilitates interaction of a monomer or polymer with the surface. The monomer or polymer subsequently is covalently bonded to the surface.

Particular embodiments concern quartz crystal microbalances coated with one or more carbohydrate monomers and/or polymers. In some embodiments, the quartz crystal microbalance is coated with a first layer of a polymer and then a second layer containing one or more carbohydrate monomers and/or polymers. The carbohydrate-coated quartz crystal microbalances are used for studying carbohydrate-protein interactions.

Certain embodiments concern carbohydrate microarrays. Substrate surfaces are modified with carbohydrate monomers and/or polymers applied in a pre-determined pattern. In particular embodiments, the surface is coated with a first layer of a polymer, followed by application of carbohydrate monomers and/or polymers in a pre-determined pattern. The carbohydrate microarrays are used for screening and detecting ligands, e.g., proteins or bacteria, which bind to selected carbohydrates.

Particular embodiments concern nanocomposites, such as clay or mineral platelets. An alkyl ammonium compound is associated with the platelet surface and facilitates interaction of monomers and/or polymers with the surface. The modified surfaces facilitate exfoliation of the platelet particles. The monomer or polymer subsequently is covalently bonded to the platelet surface.

Certain embodiments concern graphene, a form of graphite. Graphene is synthesized and surface-functionalized simultaneously. In some embodiments, the functionalized graphene is further functionalized with another molecule, e.g., an antibody, and utilized for detection of specific species. In other embodiments, graphene sheets are covalently attached to functionalized substrates.

Embodiments of a method for making and using devices comprising functionalized materials are disclosed. Monomers and/or polymers are covalently bonded to surfaces using functionalized perhalophenylazides. In some embodiments, device surfaces are functionalized with a perhalophenylazide. One or more monomers and/or polymers subsequently are covalently bonded to the device surface using the perhalophenylazide. In other embodiments, monomers and/or polymers are derivatized with a functionalized perhalophenylazide. The derivatized monomers and/or polymers then are covalently bonded to the device surface using the perhalophenylazide.

The foregoing and other objects, features, and advantages of the disclosed structures and method will become more apparent from the following detailed description, which proceeds with reference to the accompanying figures.

BRIEF DESCRIPTION OF THE DRAWINGS

The patent or application file contains at least one drawing executed in color. Copies of this patent with color drawings will be provided by the Patent and Trademark Office upon request and payment of the necessary fee.

FIG. 12 depicts a polymer chain adsorbed on a substrate.

FIG. 13 depicts various polymer conformations on a substrate surface, including: a) pancake, b) mushroom, and c) brush conformations.

FIG. 14 depicts a polymer attached to a substrate at multiple points.

FIG. 15 depicts a diblock copolymer adsorbed on a substrate.

DETAILED DESCRIPTION

I. Abbreviations

Figure 1:
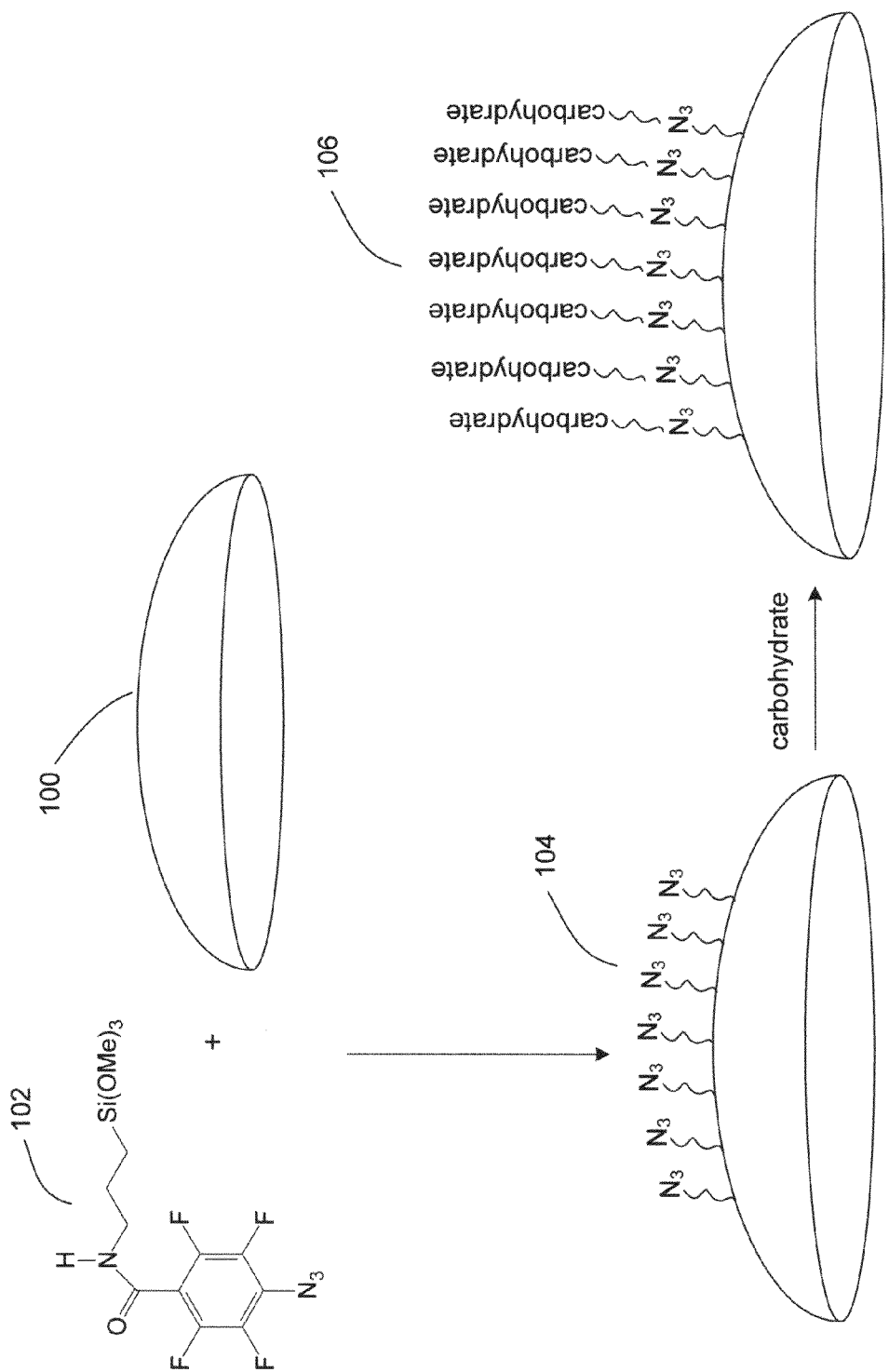
FIG. 1 illustrates one disclosed embodiment for producing polymer-coated contact lenses.

The disclosed embodiments are best understood with reference to the following abbreviations:
AFM—atomic force microscopy
APTES—aminopropyltriethyl silane
BSA—bovine serum albumin
Con A—concanavalin A, jack bean lectin
CP—cloud point
ELLA—enzyme-linked lectin assay
EtOH—ethanol
DMF—dimethyl formamide
DOPA—3,4-dihydroxyphenylalanine
GAGs—glycosaminoglycans
GSII—*Griffonia simplicifolia* II agglutinin
HOPG—highly-ordered pyrolytic graphite, crystalline graphite
HRMS—high resolution molecular spectroscopy
IR—infrared
MeOH—methanol
NHS—N-hydroxysuccinimide
NMP—N-methyl-2-pyrrolidone
NMR—nuclear magnetic resonance
PAG—polyalkylene glycol
PBA—phosphate buffered saline containing bovine serum albumin
PBS—phosphate buffered saline
PEG—poly(ethylene glycol)
PEO—poly(ethylene oxide)
PEOX—poly(2-ethyl-2-oxazoline)
PFPA—perfluorophenylazide
PFPA—C18-4-azido-2,3,5,6-tetrafluoro-N-octadecylbenzamide
PHPA—perhalophenylazide
PNA—peanut agglutinin
PS—polystyrene
PSA—*Pisum sativum* agglutinin
PVC—polyvinylchloride
PVP—polyvinylpyrrolidone
P4VP—poly(4-vinylpyridine)
QCM—quartz crystal microbalance
SAM—self-assembled monolayer
SBA—soybean agglutinin
SEM—scanning electron microscopy
TEM—transmission electron microscopy
TEOS—tetraethyl orthosilicate
TGA—thermogravimetric analysis
ToF—SIMS-time-of-flight secondary ion mass spectrometry
UEA—*Ulex europaeus* agglutinin-I
UV—ultraviolet
VAA—*Viscum album* agglutinin
XPS—X-ray photoelectron spectroscopy

II. Definitions

The following terms are used herein to aid the reader, but are not intended to limit the defined terms to a scope less than would be understood by a person of ordinary skill in the art:

The term "ambipolar" means applying equally to both positive and negative ions.

An "azide functionalized substrate" is a substrate to which one or more nitrenogenic groups (defined below) are adhered, covalently or otherwise.

"Ballistic transport" is the transport of electrons in a medium without scattering, resulting in negligible electrical resistivity.

A "bis-azide" is a functionalizing reagent that comprises at least two nitrenogenic groups.

A "carbohydrate" is any of a class of organic compounds with the general formula $C_x(H_2O)_y$. Carbohydrates include sugars, starches, celluloses, and gums. A carbohydrate may be a monosaccharide, a disaccharide, or a polysaccharide. Carbohydrates may be naturally occurring or synthetic. A monosaccharide is a monomer, or simple sugar, having a single chain or a single ring structure. Monosaccharides can be further classified by their structure and the number of carbon atoms in the ring or chain, such as aldoses, ketoses, pyranoses, furanoses, trioses, tetroses, pentoses, hexoses, and heptoses, among others. Examples of monosaccharides include, but are not limited to, N-acetylglucosamine, allose, altrose, arabinose, deoxyribose, dihydroxyacetone, erythrose, fructose, fucose, α-L-fucopyranose, galactose, β-D-galactopyranose, galacturonic acid, glucose (dextrose), glucuronic acid, glyceraldehyde, gulose, idose, lyxose, mannose, α-D-mannopyranose, mannuronic acid, neuraminic acid, psicose, rhamnose, ribose, ribulose, sorbose, tagatose, threose, xylose, and xylulose. Disaccharides are formed from two monosaccharides joined by glycosidic bonds. Examples of disaccharides include, but are not limited to, cellobiose, gentiobiose, isomaltose, lactose, lactulose, laminaribiose, maltose, mannobiose, melibiose, nigerose, rutinose, sucrose, trehalose, and xylobiose. Polysaccharides are polymers formed from two or more monosaccharides joined by glycosidic bonds. Polysaccharides formed from 3-10 monosaccharides are often called oligosaccharides. Examples of polysaccharides include, but are not limited to, agarose, alginate, amylopectin, amylose, carageenan, cellulose, chitin, chitohexanose, chitosan, chondroitin sulfate, curdlan, dermatan sulfate, dextran, dextrin, emulsan, furcellaran, galactomannan, glucomannan, gellan gum, glucosamine, glycogen, glycosaminoglycan, guar gum, gum arabic, heparan sulfate, heparin, hyaluronic acid, deacylated hyaluronic acid, inulin, isomaltulose, karaya gum, keratan sulfate, laminaran, locust bean gum, muramic acid, pectic acid, pectin, pullulan, pustulan, rhamsan gum, schizophyllan, scleroglucan, stachyose, starch, tragacant gum, welan gum, xanthan, and xanthan gum. Carbohydrates also are found in "glycoconjugates," which are carbohydrates covalently bonded to other chemical species such as, for example, proteins and lipids. Examples of glycoconjugates include, but are not limited to, glycolipids, glycopeptides, glycoproteins, lipopolysaccharides, and peptidoglycans.

"Chemisorption" is chemical adsorption whereby a molecule adheres to a surface through formation of a chemical bond. Because the adsorbed molecules are linked to the surface by valence bonds, they usually will occupy certain adsorption sites on the surface and only one layer of chemisorbed molecules typically is formed.

The term "exfoliation" refers to the dispersion or separation of clay platelet particles where the platelets are dispersed predominantly in an individual state.

The term "derivatize" means to alter the chemical composition of a compound by a chemical reaction that changes some part of the molecule, leaving most of the molecule unchanged.

A "functional group" is a group of one or more atoms bonded together in an organized way so as to have particular chemical and/or physical properties. Exemplary functional groups include, without limitation, aldehydes, alkenyl groups, alkynl groups, amines, azides, carboxyl groups and derivatives thereof, disulfides, haloalkyl groups, hydroxyl groups, ketones, maleimido groups or other dienophilic groups, nitrenogenic groups, phosphates, sulfhydryl groups, and sulfonyl halide groups.

The term "functionalized polymer" can concern either a functionalized polymeric substrate or a functionalized polymer molecule. Functionalized polymer molecules comprise one or more functional groups.

A "functionalizing reaction" is a reaction in which a molecule, or portion of a molecule, such as at least a portion of a substrate surface, is functionalized with functional groups other than those naturally present on the molecule or substrate surface. For example, a molecule or substrate surface may be functionalized with nitrenogenic groups to provide an azide-functionalized molecule or substrate. A functionalizing reaction can consist of one or more stages. When a substrate is functionalized, at least one stage involves the association or reaction of a functional group of the functionalizing reagent with the surface atoms of the substrate.

A "functionalizing reagent" is a reagent adapted for functionalizing another molecule, or portion or a molecule, such as at least a portion of a substrate. Molecules of functionalizing reagents have at least one reactive functional group, such as a nitrenogenic group, (as a first functional group) coupled, either directly or indirectly, to at least a second functional group. The first and second functional groups may be the same or different. In certain disclosed embodiments the nitrenogenic group is not directly coupled to the second functional group, but preferably is constrained by the molecular structure of the functionalizing reagent between the nitrenogenic group and the second functional group. The second functional group of the functionalizing reagent, which also can be a nitrenogenic group, serves to adhere the functionalizing reagent to the substrate. Other functional groups that may be used to adhere the functionalizing reagent to a substrate include, without limitation, thiols, amines, and silanes. Additional functional groups may be present on the functionalizing reagent and may serve to alter the properties of the functionalized substrate or to permit attachment of additional molecules to the substrate. Additional examples, without limitation, of functional groups, constrained structurally from reacting with the nitrene moiety after the nitrene moiety is generated, also may be present on the functionalizing reagent:

(a) carboxyl groups and various derivatives thereof such as (but not necessarily limited to): N-hydroxysuccinimide esters; N-hydroxybenzotriazole esters; acid halides corresponding to the carboxyl group; acyl imidazoles; thioesters; p-nitrophenyl esters; alkyl, alkenyl, alkynyl and aromatic esters, including esters of biologically active (and optically active) alcohols such as cholesterol and glucose; various amide derivatives such as amides derived from ammonia, primary, and secondary amines and including biologically active (and optically active) amines such as epinephrine, dopa, enzymes, antibodies, and fluorescent molecules;

(b) hydroxyl groups and sulfhydryl groups, either free or esterified to a suitable carboxylic acid which could be, for example, a fatty acid, a steroid acid, or a drug such as naproxen or aspirin;

(c) haloalkyl groups wherein the halide can be later displaced with a nucleophilic group such as a carboxylate anion, thiol anion, carbanion, or alkoxide ion, thereby resulting in the covalent attachment of a new group at the site of the halogen atom;

(d) maleimido groups or other dienophilic groups such that the group may serve as a dienophile in a Diels-Alder cycloaddition reaction with a 1,3-diene-containing molecule such as, for example, an ergosterol;

(e) aldehyde or ketone groups, and sulfur analogs thereof, such that subsequent derivatization is possible via formation of well-known carbonyl derivatives such as hydrazones, semicarbazones, or oximes, or via such mechanisms as Grignard addition or alkyllithium addition; and (f) sulfonyl halide groups for subsequent reactions with nucleophiles, such as amines, for example, to form sulfonamides.

The functionalizing reagent may be selected from functionalized aliphatic compounds, aryl compounds, and haloaryl compounds, such as aryl azides, alkyl azides, alkenyl azides, alkynyl azides, acyl azides, and azidoacetyl derivatives. All such reagents are capable of carrying a variety of functional substituents that serve to couple the functionalizing reagent to a second compound, such as a substrate, provide sites where additional molecules may be coupled to the functionalizing reagent, or otherwise alter the chemical and/or physical properties of the functionalized substrate. Halogen atoms may be present to the maximum extent possible in the positions on the functionalizing reagent molecule adjacent the azide group. Improved results typically are achieved when the halogens are fluorine and/or chlorine atoms.

Examples of nitrenogenic azides and functionalizing reagents useful for functionalizing polymeric substrates may be found in U.S. Pat. No. 5,580,697 to Keana et al., U.S. Pat. No. 5,830,539 to Yan et al., and PCT publication WO 98/22541 naming Yan et al. as inventors, all of which are incorporated by reference herein.

Particularly effective functionalizing reagents may be derived from perhalophenyl azides (PHPAs), particularly perfluorophenyl azides (PFPAs) derived from 4-azido-2,3,5,6-tetrafluorobenzoic acid. For example, Schemes 1, 2, 3, and 4 below illustrate synthetic routes to a variety of functionalizing reagents based upon 4-azido-2,3,5,6-tetrafluorobenzoic acid. A person of ordinary skill in the art will recognize that the particular reactions and any reaction conditions indicated are illustrative of more general routes for forming functionalizing reagents from azides.

Scheme 1

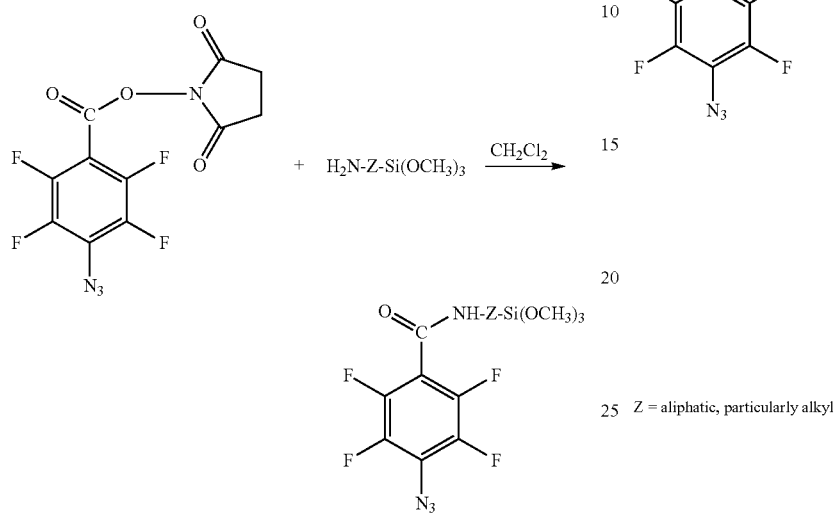

Z = (CH$_2$)$_2$NH(CH$_2$)$_3$
Z = (CH$_2$)$_6$NH(CH$_2$)$_3$

Scheme 2

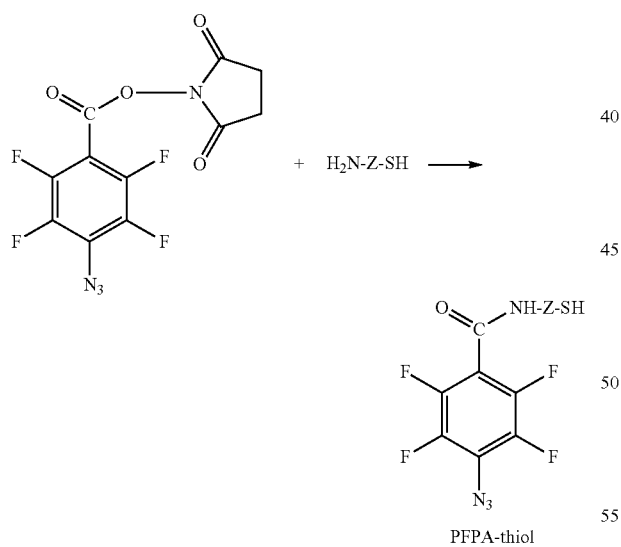

Z = aliphatic, particularly alkyl

Scheme 3

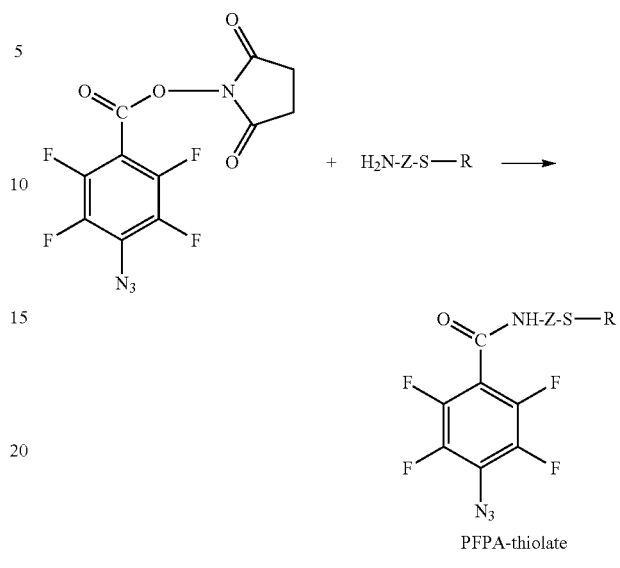

Z = aliphatic, particularly alkyl

Scheme 4

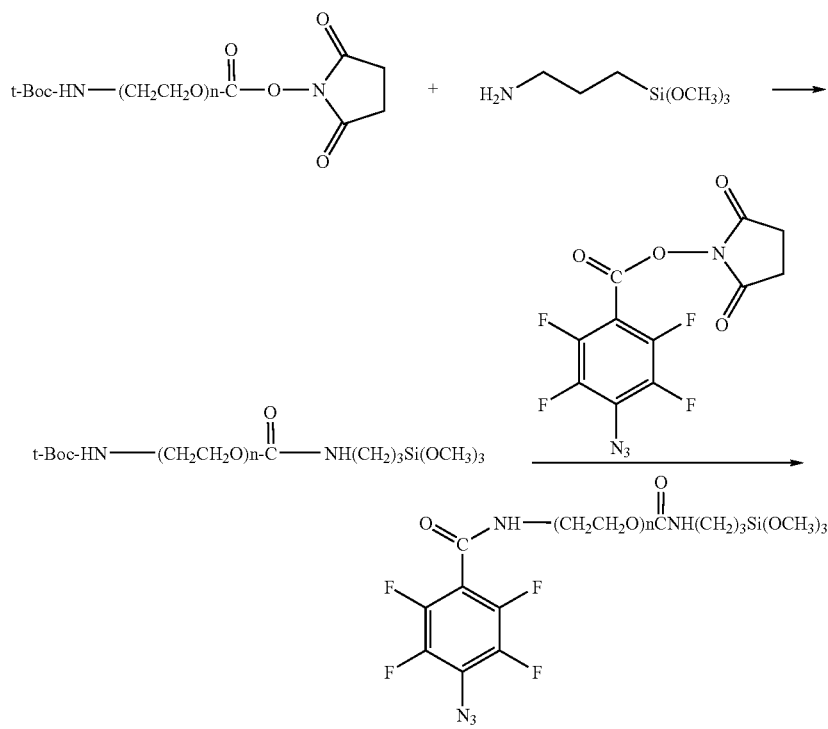

The term "grafting density" refers to the concentration of polymers per unit area on a substrate surface.

A "lectin" is a type of protein found in both plants and animals. Lectins include, for example, abrin, aggrecan, asialoglycoprotein receptor, calnexin, calrecticulin, CD22, CD33, CD94, collectin (mannan-binding lectin), concanavalin A, galectin, *Griffonia simplicifolia* II agglutinin, legume lectin, mannose receptor, myelin-associated glycoprotein, N-acetylglucosamine receptor, phytohaemagglutinin, *Pisum sativum* agglutinin, pokeweed mitogen, ricin, selectin, sialoadhesin, soybean agglutinin, *Ulex europaeus* agglutinin-I, versican, and *Viscum album* agglutinin, among others. Lectins are carbohydrate-binding proteins that are highly specific for their carbohydrate moieties. They may bind to a soluble carbohydrate or to a carbohydrate moiety which is a part of a glycoprotein or glycolipid. They typically agglutinate certain animal cells and/or precipitate glycoconjugates. Lectins are involved in biological recognition phenomena such as cell-cell and cell-matrix interactions, cell growth and cell death, routing and migration, storage, signaling, environmental adaptation, defense mechanisms, etc. For example, purified lectins are used in a clinical setting for blood typing. Lectins from legume plants, such as PHA or concanavalin A, also have been used as model systems to understand the molecular basis of how proteins recognize carbohydrates. Ricin, a biochemical warfare agent, is isolated from castor oil plant seeds and is a protein that comprises two domains. One of the ricin domains is a lectin that binds cell surface galactosyl residues and enables the protein to enter cells.

A "microarray" is a structure comprising a substrate upon which molecules have been affixed, typically in separate locations, and also typically in an ordered manner, thus forming a microscopic array.

A "nanoparticle" is a small particle with at least one dimension less than about 100 nm. A "nanohybrid" is a nanoparticle with a coating such as, for example, a polymer shell. "Monodisperse" nanoparticles are particles having substantially the same diameter.

A "nitrene group" (—N=N=N) (also generally termed "nitrene" or "nitrene intermediate") is a particular functional group comprising plural nitrogen atoms regarded by persons of ordinary skill in the art as the nitrogen analogs of carbenes. Like carbenes, nitrenes are generally regarded as highly reactive intermediates that may not be isolatable under ordinary conditions. Important nitrene reactions include (but are not limited to) addition or insertion into C—H, N—H, O—H, and C—C bonds (single, double and triple).

A "nitrenogenic group" is a chemical moiety that becomes a nitrene group when exposed to a reaction-energy source. An azide group is an example of a nitrenogenic group.

A "quartz crystal microbalance" (QCM) is a mass-sensing device. An electrical signal is sent through a gold-plated quartz crystal, producing a vibration at a resonance frequency. Changes in frequency are related to changes in mass on the surface of the crystal. The change in frequency is directly proportional to the mass on the crystal. A QCM is capable of detecting changes in mass on the order of about of $10^{-16}$ kg. (Sauerbrey, G., *Zeitschrift für Physik*, 1959, 155: 206-222.) In some instances, QCMs are used to monitor the rate of thin film deposition. In other instances, QCMs are used to determine the affinity of molecules to functionalized surfaces. QCMs also can function as biosensors. A molecule which binds to a specific ligand is associated with the QCM surface. Subsequent binding of the ligand results in a measurable change in the resonance frequency.

"Physisorption" is physical adsorption whereby a molecule adheres to a surface only through weak intermolecular interactions, i.e., through van der Waals forces. Multilayer adsorption of molecules can occur.

A "polymer molecule" is a molecule formed from smaller molecules termed "monomers," typically by covalent bonding of one monomer to a second monomer. The monomers that form a polymer molecule can be the same or different. If the monomers are the same, the polymer is a homopolymer. If the monomers are different, the polymer also may be called a co-polymer. Polymer molecules can be natural, such as, but not limited to, carbohydrates, polysaccharides (such as celluloses and starches), proteins, and nucleic acids; or synthetic, such as, but not limited to, nylon and polyaliphatic materials, particularly polyalkylene materials, examples of which include polyethylene and polypropylene. In a polymeric material, polymer molecules can be associated with each other in any of several ways, including non-covalently (as a thermoplastic) or by a covalently cross-linked network (as a thermoset).

Polymeric materials include virtually any polymeric material comprising polymer molecules possessing —CH groups, and/or —NH groups, and/or —OH groups, and/or C=O groups, and/or C=N groups, and/or carbon-carbon single bonds, and/or carbon-carbon double bonds, and/or carbon-carbon triple bonds. Such polymeric materials include, but are not limited to:

(a) saturated polyolefins as exemplified by polyethylene, polyvinyl chloride, polytetrafluoroethylene, polypropylene, polybutenes, and copolymers thereof;

(b) acrylic resins such as polymers and copolymers of acrylic acid, methacrylic acid such as, poly(methylmethacrylate), poly(hexylmethacrylate), and acrylonitrile;

(c) polystyrene and its analogues such as poly(p-chlorostyrene), poly(p-hydroxystyrene), and poly(alkylstyrene);

(d) unsaturated polyolefins such as poly(isoprene) and poly(butadiene);

(e) polyimides such as polyimide(benzophenone tetracarboxylic dianhydride/tetraethylmethylenedianiline);

(f) polyesters such as poly(trimethylene adipate), poly(ethylene terephthalate), and poly(hexymethylene sebacate);

(g) conjugated and conducting polymers such as poly(3-alkylthiophene), poly(3-alkylpyrrole), and polyaniline;

(h) inorganic polymers such as poly(aryloxyphosphazene), poly>bis(trifluoroethoxy) phosphazene, polysilanes, and polycarbosilanes, siloxane polymers, and other silicon-containing polymers;

(i) organic metals (i.e., organic polymers with metallic properties) such as polycroconaines and polysquaraines, as described in Chemical and Engineering News (Aug. 31, 1992);

(j) organometallic polymers such as palladium poly-yne and ferrocene-containing polyamides;

(k) polysaccharides such as agarose, alginate, amylopectin, carageenan, cellulose fibers, chitin, dextran, dextran sulfate, starch, glycogen, and glycosaminoglycans such as dermatan sulfate, heparan sulfate, heparin, glucosamine, hyaluronic acid, chondroitin sulfate, and keratan sulfate;

(l) thermally responsive polymers such as N-isopropylacrylamide (PNIPA), and co-polymers of PNIPA and poly(acrylic acid) or polyacrylamide.

(m) polypeptides such as poly-lysine.

(n) polymers of cyclic amines such as poly(2-ethyl-2-oxazoline) (PEOX) and poly(ethylenimine).

(o) polymers of nucleic acids such as deoxyribonucleic acid (DNA) and ribonucleic acid (RNA).

(p) polyethers such as poly(ethylene glycol) and poly(ethylene oxide)

A "polymeric material or substrate" is a material or substrate comprising polymer molecules or a network of polymer molecules.

The term "proteophobic" means antagonistic to proteins. I.e., a proteophobic surface repels proteins.

A "reaction-energy source" is an energy source that promotes a desired reaction. For example, a reaction energy source may promote adherence of a polymeric material to a substrate, for example, by converting nitrenogenic groups on functionalizing reagent molecules to nitrenes, which may then react with, for example, a polymeric material, or by directly adhering the polymeric material to a substrate. Suitable reaction-energy sources include (but are not limited to): photons (including ultraviolet (UV) photons, deep-UV photons, laser light), X-rays, microwaves, thermal energy (such as infrared radiation and conductive heating), energized electrons (such as an electron beam), and energized ions (such as an ion beam). Reaction-energy sources can be used alone or in combination. Reaction-energy sources are conventionally used for such tasks as lithography, scanning microscopy and, in the case of UV and visible photons, effecting photochemical reactions and excitation of fluorescent molecules. A reaction-energy source comprising UV light can be supplied, for example, using a mercury or xenon lamp. A medium pressure mercury lamp is a source of photons between about 220 nm and about 1,000 nm, with a maximal intensity at about 360 nm. A photomask may be used to prevent photons from reaching certain portions of a sample while allowing photons to reach other portions. This provides an example of a process for forming desired patterns.

A reaction-energy source comprising electrons can be supplied to a reaction by the following representative procedure: A sample is irradiated under vacuum by an electron or particle beam with an energy selected within the range of from about 1 kV to about 40 kV. A representative electron-beam source is a JEOL 840A electron microscope modified for electron-beam lithography. The beam may be applied in a substantially continuous pattern or may be stepped across the surface of the treated substrate to expose certain areas and not others. A dwell time at each step can be adjusted to change the exposure.

A thermal energy reaction-energy source can be supplied, for example, by heating a sample in an oven, typically ramped at a desired rate to a preselected working temperature or preheated to a designated temperature. For example, the designated temperature can be a temperature sufficient to increase the polymer chain mobility for a given polymer being attached to a substrate. The designated temperature can vary depending on the given polymer-type. For example, working embodiments used temperatures greater than the glass transition temperatures of the polymers being attached to the substrates; these were typically temperatures between about 120° C. and 190° C. The heating time can be a time sufficient to impart the energy needed to bond the polymer film to the substrate. Working embodiments used times of between about 5 minutes and 40 minutes.

A "substrate" typically is a non-fluid material providing a surface that can be functionalized according to the present invention. A substrate can comprise any suitable material, including solely by way of example and without limitation, polymer molecules (e.g. thermoplastic polymer molecules), a thermoset molecular network (e.g., cross-linked polymer molecules), metals (e.g., aluminum, cobalt, copper, gold, iron, neodymium, nickel, platinum, palladium, and silver), metal alloys, metal compounds (e.g., metal nitrides, metal oxides, such as hematite ($Fe_2O_3$)), semiconductor materials (e.g., gallium arsenide, silicon nitride, titanium dioxide, and cadmium sulfide), silicon, silica, glass, mica, quartz (and other atomic or molecular associations such as found in certain glasses and crystals), and graphite (and other forms of carbon such as fullerenes, carbon electrodes, and carbon nanotubes). It also should be understood that a first material may be adhered to a first substrate to provide a second substrate to which additional materials may be adhered, and so on. The substrate may be a device comprised of multiple layers of materials, for example a microelectronic device.

A substrate is functionalized by chemistry whereby functional groups on the functionalizing reagent molecules interact with the substrate or substrate surface to adhere the functionalizing reagent to the substrate. A substrate may be functionalized by chemistry whereby a functional group on the functionalizing reagent molecule is either attracted to (e.g. by dipole-dipole interactions) or bonded (e.g. through hydrogen bonds, ionic bonds, or covalent bonds) to the substrate surface.

Examples of molecules or materials that may be attached to a substrate include, without limitation, proteins, nucleic acids, carbohydrates, organometallic catalysts, polymers, peptides, metals, alloys, and combinations thereof.

III. Applications

Embodiments of a method for coupling monomers and polymers to surfaces are disclosed herein. Surfaces can be either modified such that substantially the entire substrate surface is modified, or specific areas can be modified by techniques such as photomasking and/or by using conventional printing devices.

A. Modification of Substrate Surfaces

An exemplary method for modifying substrate surfaces uses a functionalized nitrenogenic molecule to covalently bond molecules of interest to a substrate surface. In particular embodiments, the functionalized nitrenogenic molecule is a functionalized azide, for example a functionalized perhalophenylazide (PHPA), such as a functionalized perfluorophenyl azide (PFPA). The functionalized nitrenogenic molecule comprises a functional group that serves to couple the functionalized nitrenogenic molecule to the surface of a solid substrate and a nitrenogenic group, such as an azide group, that can be converted to a nitrene. The functional group may be any functional group suitable for coupling the functionalized nitrogenic molecule to the substrate surface. This approach relies on the photochemistry of PHPAs. UV irradiation of PHPAs generates singlet perhalophenyl nitrenes that can undergo insertion or addition reactions into various bonds, such as C—H, N—H, O—H and C—C (single, double and triple) bonds of the molecules of interest. Because the molecules of interest require no functional groups for attachment, it is possible to attach a wide variety of molecules. Of particular interest is the attachment of monomers and polymers.

Another advantage of this approach is that light is highly chemoselective and activates only photosensitive moieties without affecting other molecular and structural entities. The photosensitive groups can be specifically targeted utilizing mild conditions either in the solid state or in solution. Monomer and polymer density and yield can be controlled, for example, by adjusting the intensity of the light source. Furthermore, reactions can be locally initiated by focusing the light on areas of interest, thus providing spatial control and resolution.

In some embodiments, a functionalized PHPA is applied to a substrate surface by any suitable method, such as spraying, spin-coating, or complete or partial immersion, followed by treatment with one or more reaction energy sources. The functional group adheres the functionalized PHPA to the substrate surface. Application of the reaction energy source(s) then converts the azide group to a highly reactive nitrene that facilitates a reaction, such as an addition or insertion reaction with a monomeric or polymeric material. The result is a monomeric or polymeric material attached to the substrate surface, generally covalently. Spatial control of the reaction energy can provide a monomeric or polymeric film adhered to a substrate in a pre-determined pattern.

Alternatively, a functionalized PHPA can adhere to a substrate surface (e.g., polystyrene) through its nitrenogenic group. Application of the reaction energy source then converts the nitrenogenic group to a nitrene that reacts with the substrate surface and covalently bonds the functionalized PHPA to the substrate surface. The functional group then reacts with a molecule of interest and couples the molecule to the functionalized substrate surface. For instance, if the functional group is an N-hydroxysuccinimide ester, it can readily react with highly polar molecules such as, for example, molecules with hydroxyl or amine groups.

In other embodiments, the monomer or polymer of interest is derivatized with a functionalized PHPA. The functionalized PHPA is coupled to the monomer or polymer via its functional group. The PHPA-derivatized monomer or polymer subsequently is applied to the substrate surface and covalently bonded thereto by treatment with one or more reaction energy sources.

In certain embodiments, a multilayer structure is produced. For example, a substrate surface is derivatized by a functionalized PHPA and coated with a polymer in a first step. Another PHPA-derivatized monomer or polymer is subsequently applied to the polymer-coated substrate surface and covalently bonded by treatment with one or more reaction energy sources in a second step.

B. Polymer Association on Ophthalmic Devices

In some embodiments, device surfaces are functionalized by PHPAs with subsequent attachment of one or more monomers or polymers to the derivatized surface. In particular embodiments, the devices are ophthalmic devices, e.g., contact lenses. Soft contact lenses are typically made from polymers. For example, soft contact lenses are made from polymers including, but not limited to, poly(2-hydroxyethyl methacrylate), poly(methyl methacrylate), silicone hydrogels (i.e., polymacon), siloxanes, filcon polymers (i.e., acquafilcon, alfafilcon, balafilcon, elastofilcon, etafilcon, Filcon™ IV, genfilcon, lenefilcon, lotrafilcon, nelfilcon, ocufilcon, and vilfilcon, among others), focon polymers (fluorsilfocon, neofocon, paflufocon, pasifocon, silafocon, and telefocon, among others) and combinations thereof. Common problems with soft contact lenses include insufficient lens wetting, low oxygen permeability, nonspecific binding of debris such as lipids and proteins to the lens surface, etc. For example, silicone contact lenses are oxygen permeable, but are very hydrophobic. Hence, some silicone contact lens surfaces are modified with agents to block the hydrophobic sites. Other silicone contact lens surfaces incorporate rewetting agents within the lens structure. In another example, Filcon IV™ has been modified with hyaluronate gel, a biopolymer found naturally in tears. Hyaluronate gel is a hydrating and mucomimetic agent, which improves wettability of the lens.

Polymeric materials used to form contact lenses can be functionalized with a PHPA, and then the functionalized polymeric material may be formed into a contact lens. Alternatively, a contact lens surface 100 can be functionalized according to disclosed embodiments of the present invention with a PHPA, as shown in FIG. 1. For example, a siloxane contact lens surface 100 can be functionalized with a PHPA-silane 102. The PHPA-silane 102 is applied to the contact lens 100 by a suitable method, such as immersion, spin-coating, or spray coating. A variety of monomers or polymers can be covalently attached to the functionalized contact lens surface 104.

Suitable monomers or polymers for functionalizing polymers used to make contact lenses, or a contact lens itself, include, but are not limited to, agarose, alginates, Ll-arabinose, carageenan, cellulose, chitin, chitosan, chondroitin sulfate, curdlan, dextran, blue dextran, animated dextran, emulsan, fructose, fucoidin, L-fucose, furcellaran, galactomannan, D-galactosamine, D-galactose, D-galacturonic acid, gellan gum, glucomannan, glucuronic acid, D-glucosamine, glucose, L-glycero-D-mannoheptose, glycerol, glycosaminoglycan, guar gum, gum arabic, heparin, hyaluronic acid, deacetylated hyaluronic acid, inulin, karaya gum, lactose, laminaran, locust bean gum, D-mannose, D-mannuronic acid, mucins, mucopolysaccharides, muramic acid, neuraminic acid, pectic acid, pectin, pullulan, pustulan, rhamsan gun, D-ribose, schizophyllan, scleroglucan, starches, threose, tragacant gum, welan gum, xanthan, xanthan gum, and D-xylose. Exemplary monomers and polymers include biocompatible monomers or polymers that make the contact lens surface substantially more hydrophilic and increase contact lens lubrication and wetting relative to an unmodified contact lens surface.

The polymers are applied to the functionalized contact lens surface 104 by any suitable method, such as immersion, spin-coating, or spray coating. Irradiation with a reaction energy source(s) converts the azide group to a highly reactive nitrene that facilitates a reaction, such as an addition or insertion reaction with the polymeric material. The result is a polymer-coated contact lens 106 where the polymeric material is adhered to the contact lens surface, generally covalently.

C. Polymer Association on Nanoparticles

Coating nanoparticles with polymer shells allows nanoparticle properties to be tailored for a particular purpose as desired. Nanoparticles can be formed from many materials, such as silica, metals, metal alloys, metal compounds, carbon (graphite, fullerenes, carbon nanotubes), and inorganic phosphates, among others. Characteristics including solubility, corrosion resistance, biocompatibility, and mechanical stability can be altered by the application of surface coatings. These coatings have potential applications in areas such as drug delivery, gene delivery, biomedical devices, optics, electronics, and catalysts.

One disclosed embodiment of the current method concerns covalently attaching various polymers to silica nanoparticles via a photochemically-initiated process with PHPAs. In particular embodiments, the perhalophenylazide is a PFPA.

Figure 2:
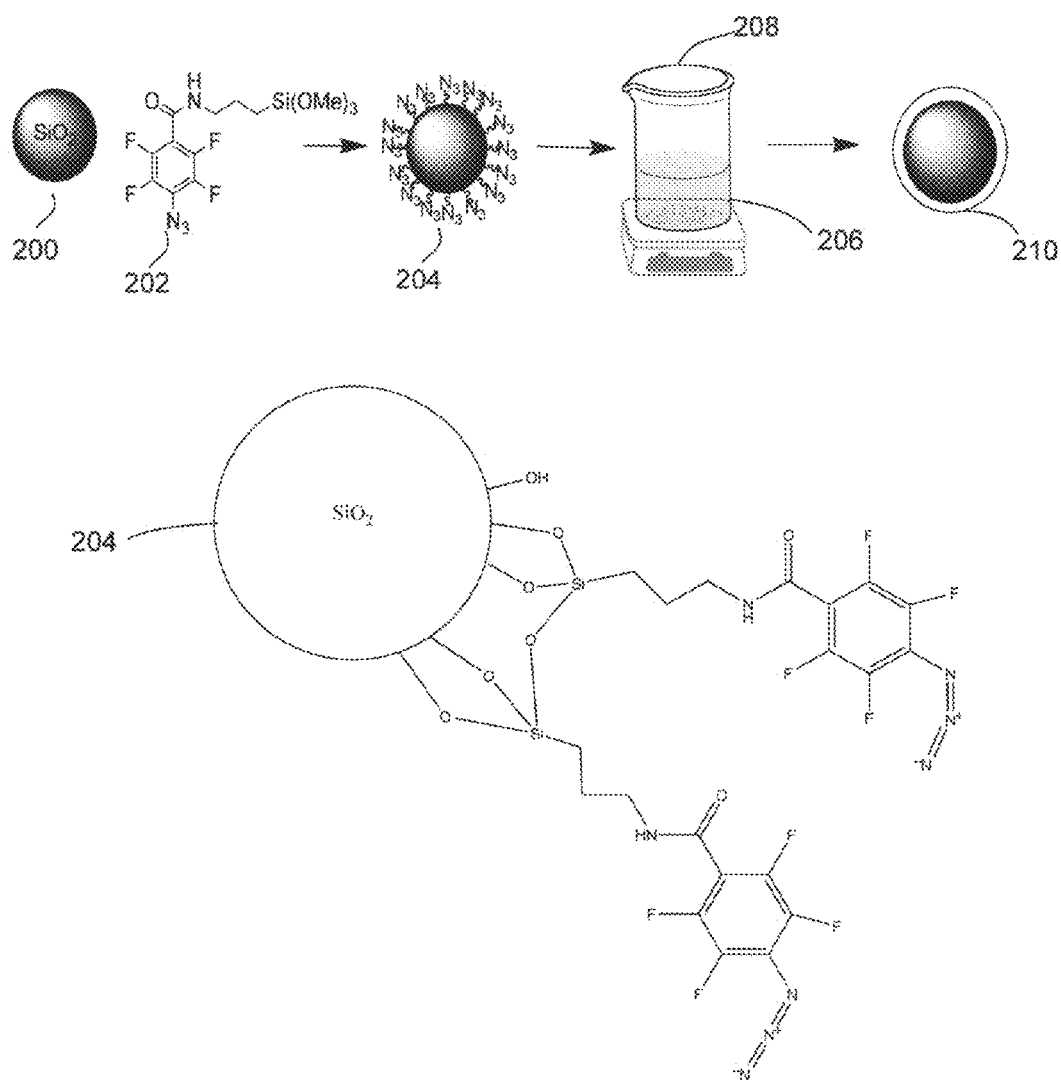
FIG. 2 illustrates one disclosed embodiment for producing polymer-coated silica nanoparticles.

In certain embodiments, a variety of polymers can be attached to PHPA-functionalized silica nanoparticles. Silica nanoparticles 100 are synthesized and a polymer is applied to the nanoparticle, such as by immersion coating, as shown in FIG. 2. In particular examples, the polymer was selected from polystyrene (PS), poly(2-ethyl-2-oxazoline) (PEOX), and/or poly(4-vinyl pyridine) (P4VP). Silica nanoparticles 100 can be synthesized by a variety of techniques, including the Stober procedure. (Stober, W. et al., *J. Colloid Interface Sci.*, 1968, pp. 62-69.) The nanoparticles 200 are subsequently functionalized in situ with a PHPA-silane, typically a PFPA-silane 202. The PFPA-silane 202 is applied to the nanoparticles 200 by a suitable method, such as immersion.

In the embodiment of FIG. 2, the functionalized nanoparticles 204 are dispersed in solution and combined with a polymer solution 206, followed by treatment with one or more reaction energy sources 208. In other embodiments, the polymer can be applied to functionalized nanoparticles by other methods such as, for example, spray-coating or spin-coating. Irradiation with the reaction energy source 208 covalently bonds the polymer 206 to the functionalized nanoparticle surface 204. The result is a polymer-coated nanoparticle 210.

Regardless of their structures, architecture and properties, a wide range of polymers and monomers can be coupled to the PHPA-functionalized silica nanoparticles. This method is especially beneficial for polymers that are difficult to couple to surfaces by the conventional graft-to or graft-from approaches due to the lack of functional groups or inability to surface polymerize in situ.

The technique described herein can be considered as a graft-to approach. It differs from conventional protocols, however, in that the polymer is attached to the substrate by insertion reactions that would be unlikely to occur at the polymer chain ends because of the low statistical probability of insertion into a monomer at either end of the polymer chain. More frequently the polymer is attached to the substrate by an insertion reaction at a point within the chain of the polymer. Additionally, the grafting densities are lower in comparison to polymer brushes prepared by the surface-initiated polymerization methods known in the prior art. The PHPA structure can be modified readily to introduce various functional groups as well as further structural variations. Several exemplary variations are shown below in Schemes 5 and 6.

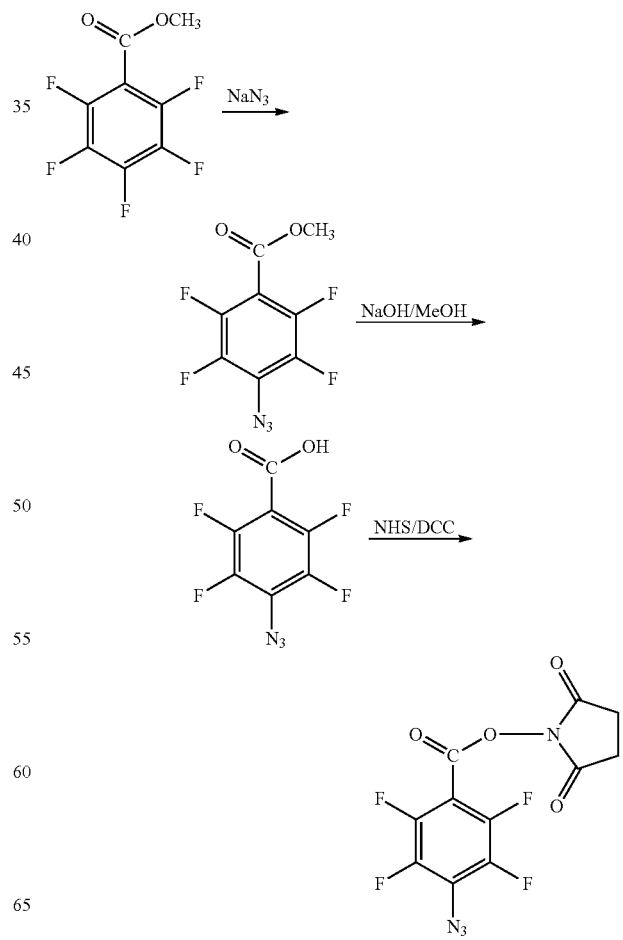

Scheme 5

19
-continued
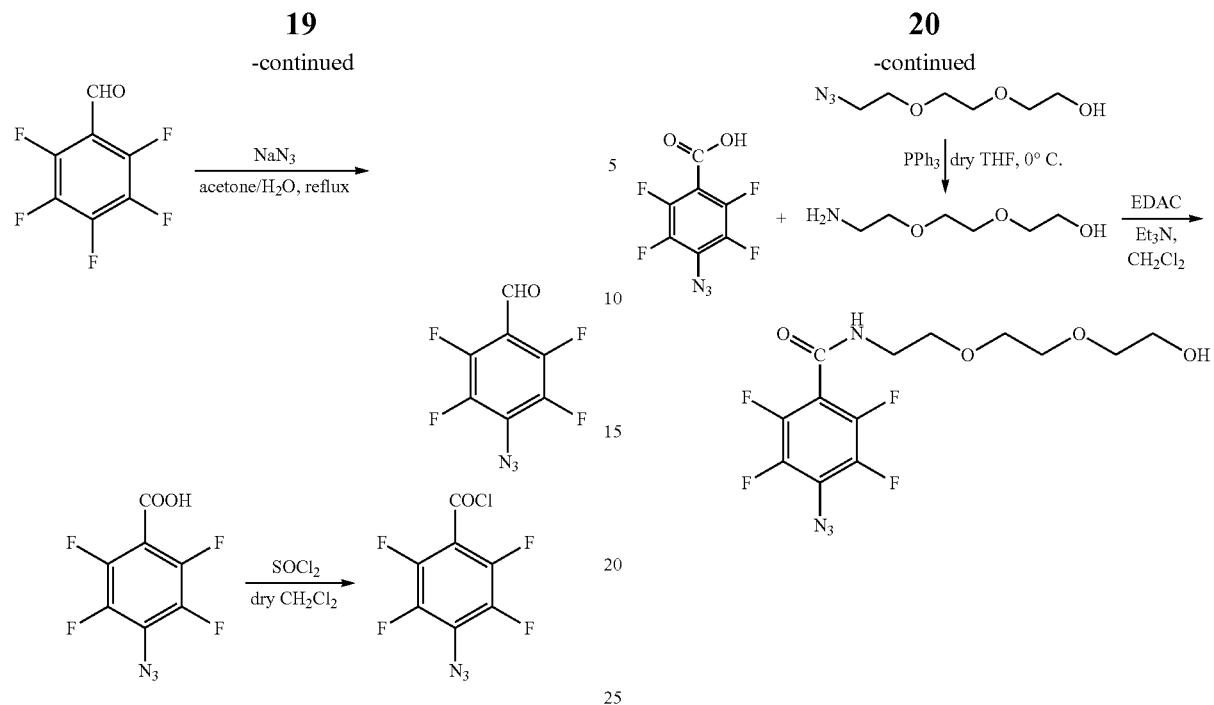
20
-continued
Scheme 6
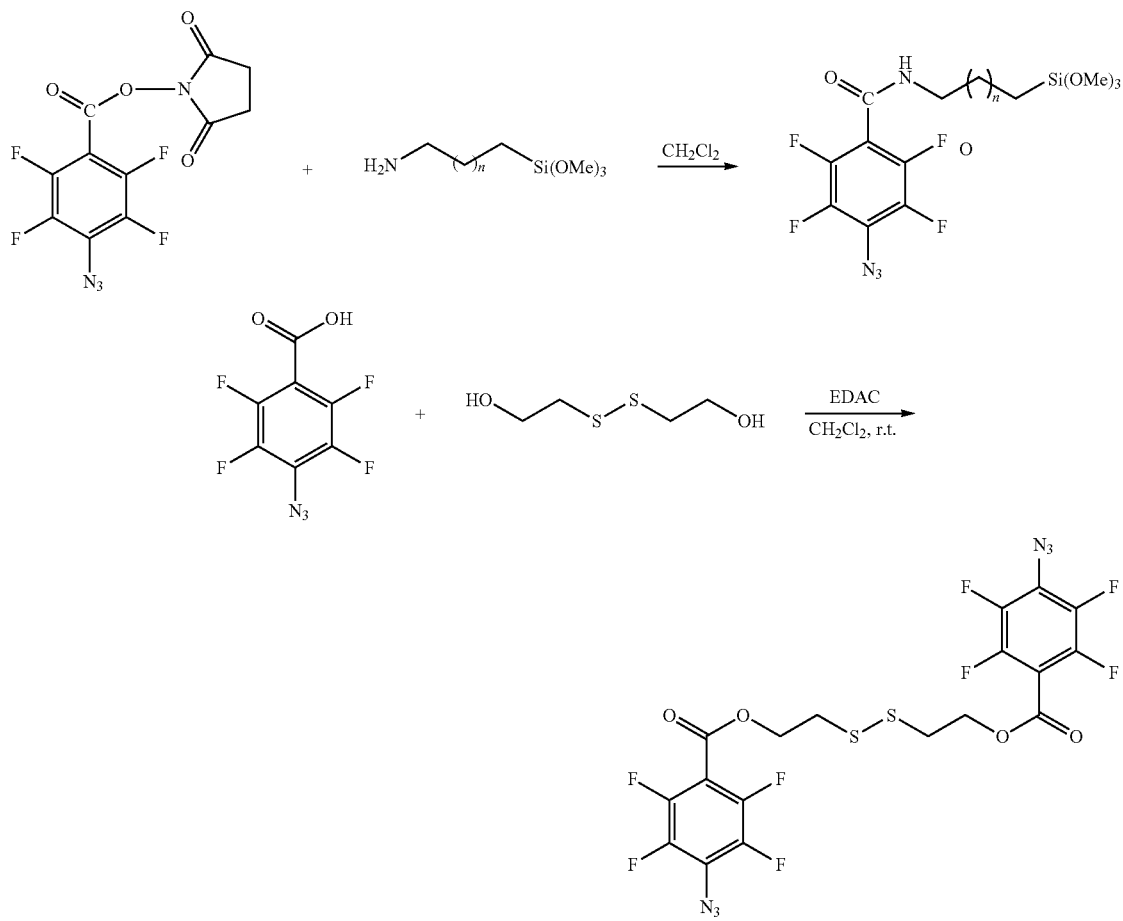

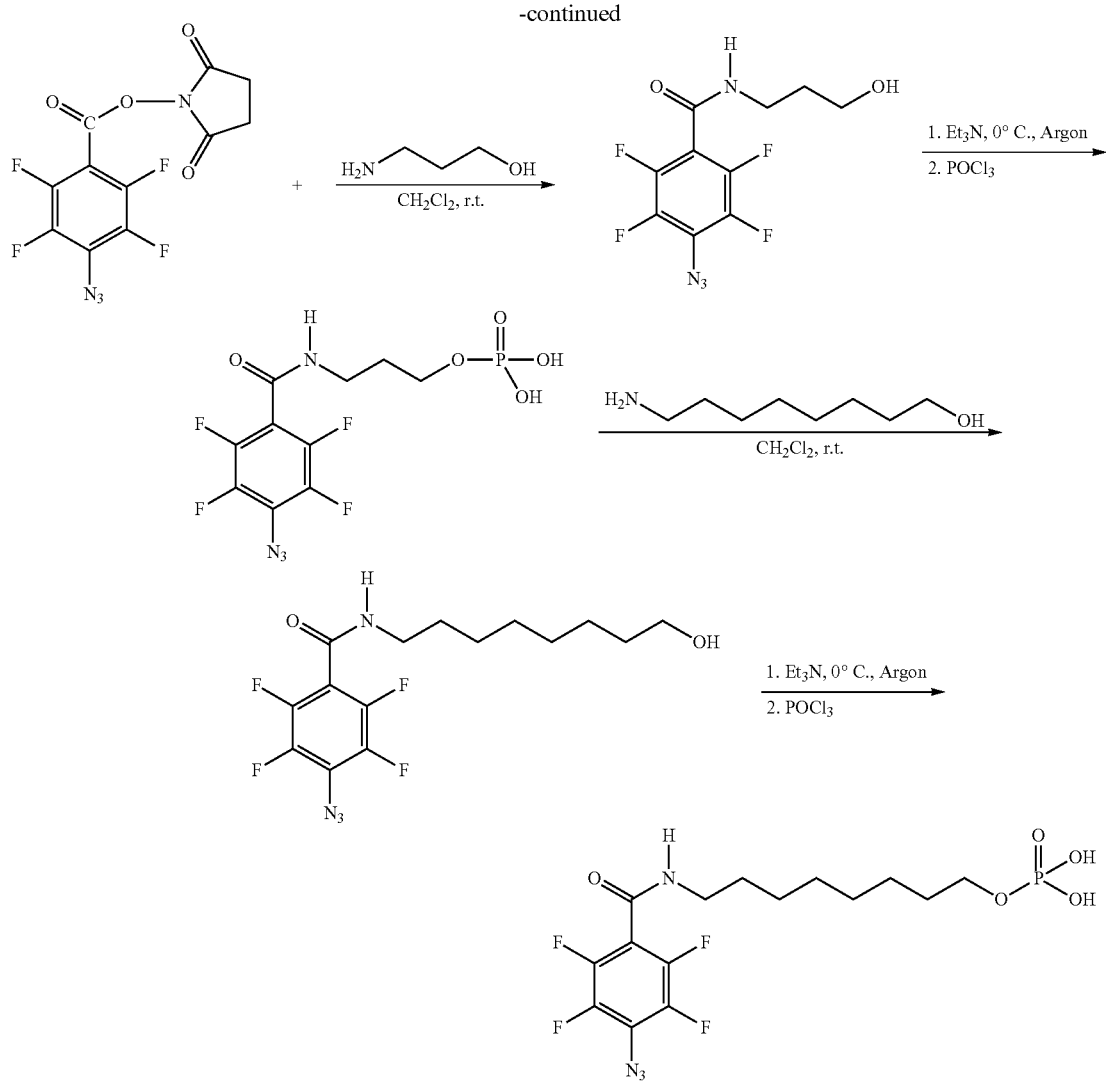

D. Carbohydrate Association on Nanoparticles

In other embodiments, carbohydrates are attached to semiconductor and metallic nanoparticles. Coupling chemistry that does not require chemical derivatization of the carbohydrates is appealing. A few examples have been reported to conjugate underivatized carbohydrates on flat substrates for microarray construction. One approach uses hydrazide-modified gold substrates where the hydrazide reacts with the terminal aldehyde group of the carbohydrates. A similar approach employs amino-functionalized surfaces and the coupling with carbohydrate takes place by reductive amination to yield an amine conjugate. In both cases, reducing sugars are necessary, and for monosaccharides, the coupled products often become acyclic and lose their binding affinity. Carbohydrates, being complex in structure and difficult to chemically derivatize, are another class of compounds that are well-suited for the PFPA photocoupling chemistry. PFPA-functionalized nanoparticles were prepared that can be used subsequently to covalently couple, in principle, any carbohydrate structures by way of the insertion reactions of the photochemically-activated nitrene species. Furthermore, the coupling reaction is fast, taking place in minutes instead of the hours which are needed in most thermally-initiated conjugation reactions.

In particular embodiments, gold-plated quartz crystals are coated first with a polymer and subsequently with a carbohydrate in a double ligation method. The resulting structure functions as a quartz crystal microbalance (QCM) biosensor.

The QCM biosensor has become increasingly adopted for studying carbohydrate-protein interactions. Measurements can be performed in real time using native analytes without labeling procedures. In the QCM format, a carbohydrate ligand is often attached to the surface, and the protein left free in solution. This technique allows for strong response signals and also facilitates competition assays.

Figure 3:
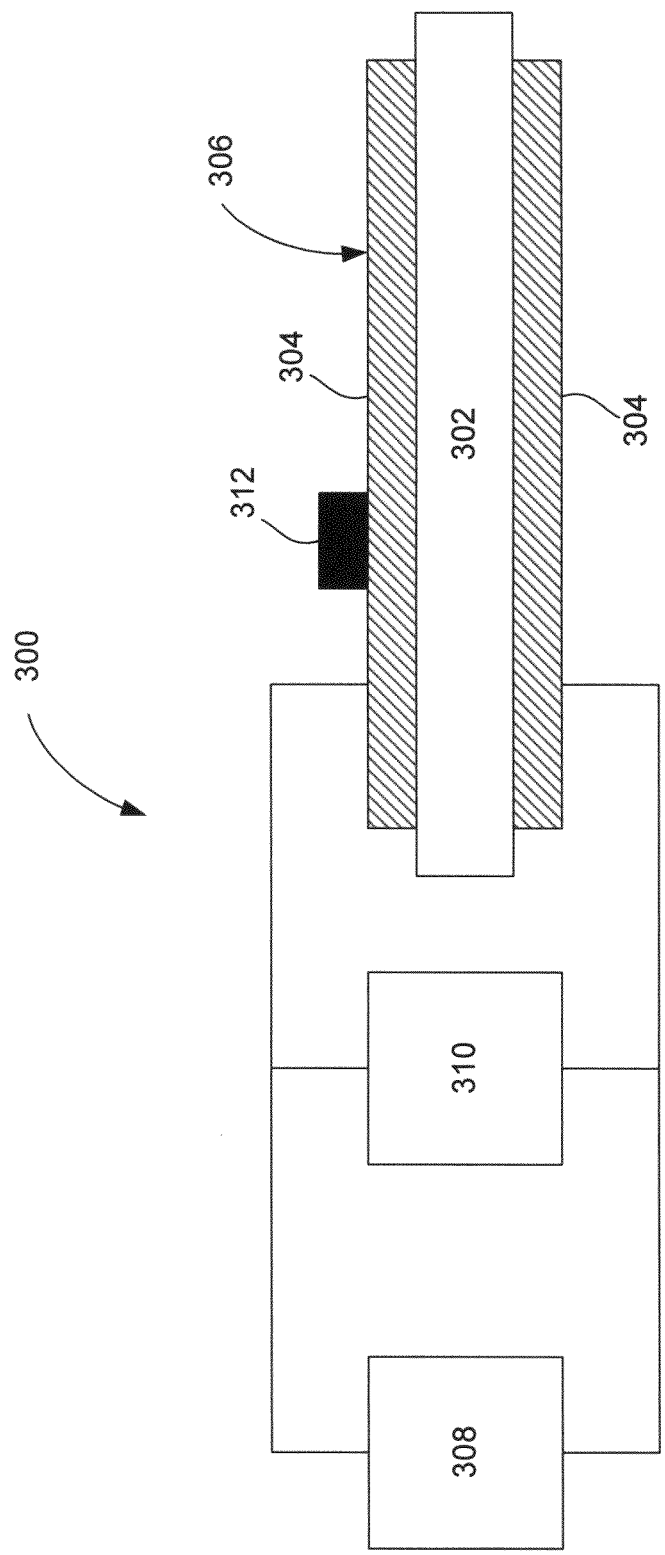
FIG. 3 is a block diagram of a quartz crystal microbalance.

FIG. 3 is a block diagram of a simple QCM 300. The QCM 300 comprises a quartz crystal 302 plated with a thin layer of gold 304. The gold-plated quartz crystal 306 is electrically connected to a power source 308 suitable for producing an oscillating current and a detector 310. An electrical signal from the power source 308 passes through the gold-plated quartz crystal 306, producing a vibration at a resonance frequency. The vibration frequency is measured by the detector 310. A mass 312 on the surface of the gold-plated quartz crystal 306 causes a change in the resonance frequency, which is measured by the detector 310.

Figure 4:
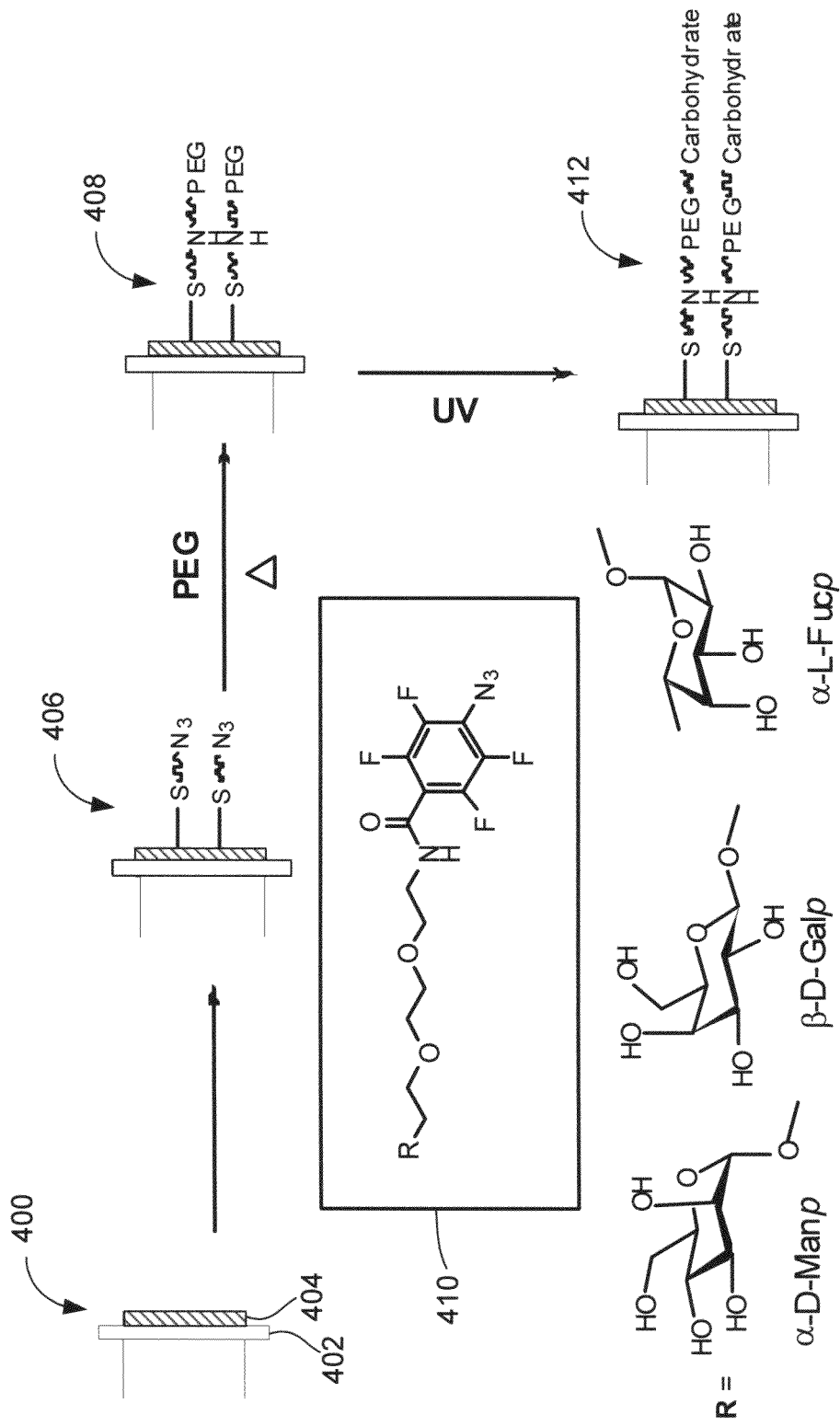
FIG. 4 illustrates one disclosed embodiment for producing carbohydrate-coated, gold-plated quartz crystals.

An embodiment of a method for making a QCM biosensor is illustrated in FIG. 4. In a first ligation step, a polyalkylene glycol (PAG), such as PEG, PEO, or a polyalkylene copolymer, such as a block PEG-poly(propylene glycol) copolymer, is operatively associated with the gold-plated quartz crystals 400 as shown in FIG. 4. Gold-plated crystals 400 comprise quartz crystals 402 having a gold plating 404. The gold-plated quartz crystals 400 are functionalized with a sulfur-containing moiety, such as a sulfur-bearing PHPA, e.g., a PHPA-disulfide, such as a PFPA-disulfide. The PHPA-disulfide is applied to the crystals 400, such as by immersing the crystals 400 in a solution of the PHPA-disulfide. The PHPA-disulfide adsorbs to the gold surface via disulfide/gold coupling. The functionalized crystals 406 are subsequently immersed into molten PAG and treated with one or more reaction energy sources. Alternatively, PAG may be applied to the functionalized crystals 406 by another suitable method, such as by spin-coating or spray-coating. The nitrene moiety inserts into the PAG molecules, thus producing a gold-plated quartz crystal substantially coated with a thin layer of covalently bound PAG. The PAG-coated crystals 408 have a highly hydrophilic, biocompatible surface which is suitable for attaching carbohydrates to the gold-plated quartz crystals.

PEG and PEO molecules with average molecular weights ranging from about 6,000 to about 200,000 can be used. However, PEG having an average molecular weight of about 20,000 resulted in the best overall performance with low non-specific binding and high durability. The PEG coating is proteophobic, thus reducing non-specific adsorption of proteins to the QCM and improving the QCM's signal-to-noise ratio. Lower molecular weights led to increased non-specific binding. Higher molecular weights resulted in reduced long-term performance in the flow-through QCM system.

In a second ligation step, at least a first, and potentially plural different carbohydrates are operatively associated with, or attached to, the PAG-coated crystals 308. In particular examples, the carbohydrates were selected from α-D-mannopyranoside, β-D-galactopyranoside, and α-L-fucopyranoside. The carbohydrates are functionalized by addition of a PHPA, such as a PFPA, as outlined in Example 2 below. In exemplary embodiments, a linker is inserted between the carbohydrate and the PHPA moiety. Linkers can include aliphatic groups, substituted aliphatic groups, aryl groups, and substituted aryl groups, among others. Particular examples of linkers include, but are not limited to, alkylene glycols, such as poly(ethylene glycol) (PEG), and substituted glycols. Both the length and nature of the linker can affect the interaction between the carbohydrate and a protein molecule. Insertion of a sufficiently long ethylene glycol-based linker such as, for example, 2-[2-(2-chloro-ethoxy)-ethoxy]-ethanol, results in efficient protein binding to the carbohydrate. A suitable linker length can be determined empirically by a person of ordinary skill in the art by using varying linker lengths and plotting the amount of protein binding versus the linker length. If the PHPA-carbohydrate is too close to the substrate surface, it may be difficult for the protein molecule to interact with and bind to the carbohydrate, particularly if there is any roughness or unevenness to the substrate surface. The linker extends the PHPA-carbohydrate further away from the surface and allows the protein molecule to more easily come into contact with the carbohydrate.

PHPA-derivatized carbohydrates 410 are applied to PAG-coated crystals 408 by a suitable method, such as immersing the PAG-coated crystals 408 in a solution of PHPA-derivatized carbohydrates 410, followed by treatment with one or more reaction energy sources. The final structure 412 is a gold-plated quartz crystal coated with PAG and having an outer layer of carbohydrates covalently bonded to at least a portion of the surface.

The structures 412 can be used, for example, in flow-through QCM instrumentation, enabling analysis of carbohydrate-protein interactions in real-time. For example, plant lectins were evaluated for their binding specificity and efficiency to different carbohydrate-derivatized surfaces as described in Example 2 below.

In an alternate embodiment, carbohydrates are functionalized with a PHPA-thiol or PHPA-disulfide and operatively associated with at least a portion of the gold-plated quartz crystal. For example, the functionalized carbohydrates are covalently bonded to the gold-plated quartz crystal using the PHPA-thiol or PHPA-disulfide upon exposure to a reaction energy source. A BSA solution then is applied to the carbohydrate-derivatized, gold-plated quartz crystal. The BSA occupies any nonspecific sites on the surface of the gold-plated quartz crystal that are not occupied by the functionalized carbohydrates. The BSA reduces any nonspecific binding of desired proteins and improves the QCM signal-to-noise ratio.

A carbohydrate-derivatized QCM can be used to bind and detect the presence of lectins, protein molecules, and bacteria. Thus, carbohydrate-derivatized QCMs are a useful screening tool for pathogens and toxins. For example, a QCM derivatized with mannose can be used to detect $E.\ coli$ bacteria.

Figure 5:
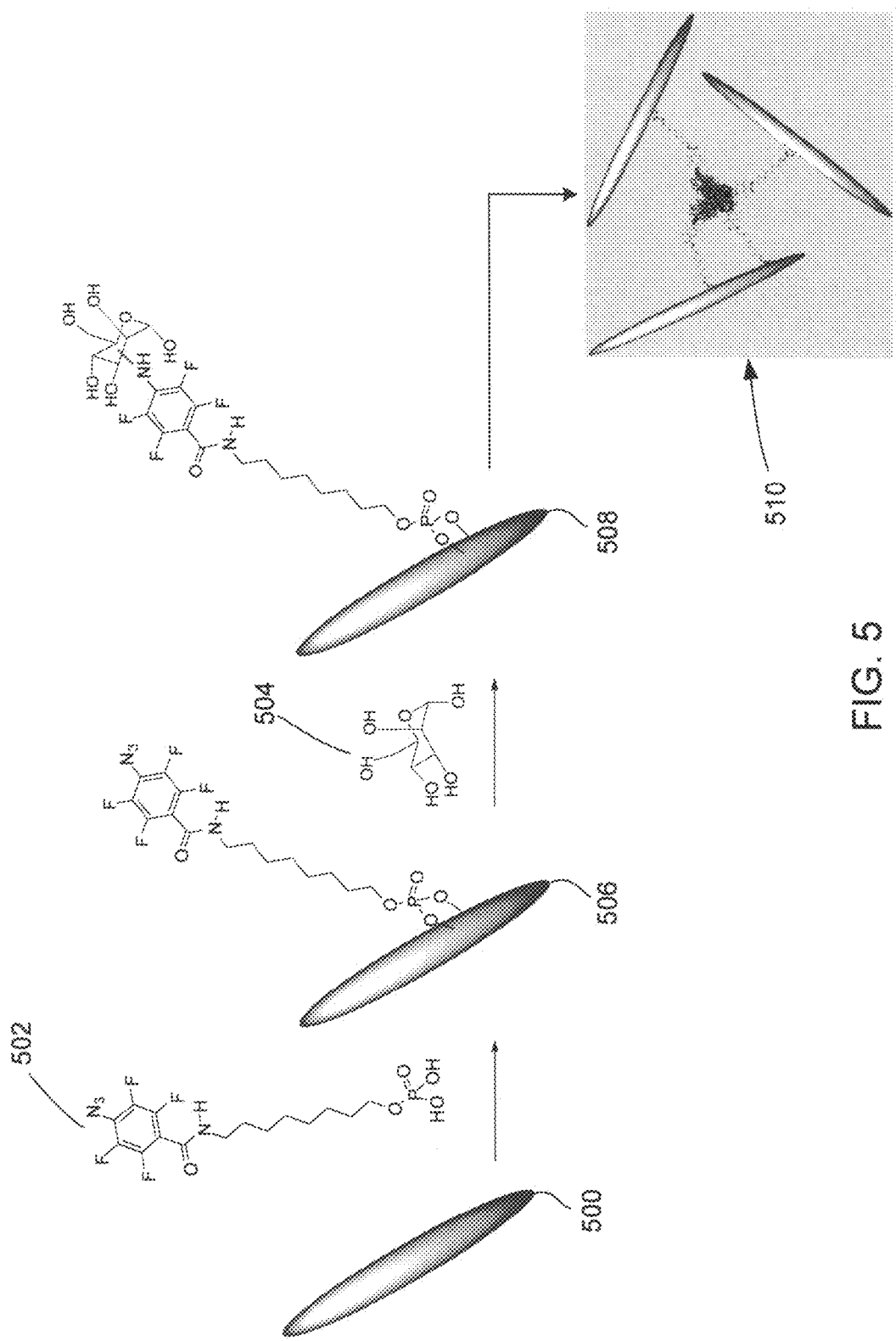
FIG. 5 illustrates one disclosed embodiment for producing carbohydrate-coated magnetic particles.

In certain embodiments, carbohydrates are attached to magnetic nanomaterials. Suitable magnetic nanomaterials include, but are not limited to, magnetic metals, magnetic metal nitrides, and magnetic metal oxides, e.g., cobalt, cobalt alloys, cobalt ferrite, cobalt nitride, cobalt oxide, iron, iron alloys, iron nitride, iron oxide (e.g., hematite), manganese nitride, neodymium alloys, nickel, and nickel alloys. The magnetic nanoparticles are functionalized with a suitable PHPA, such as a PHPA with a phosphorus-bearing functional group, such as a PHPA-phosphate, e.g., a PFPA-phosphate. As shown in FIG. 5, magnetic nanoparticles 500 are functionalized with PHPA-phosphate 502. The PHPA-phosphate 502 is applied to the nanoparticles 500 by a suitable method, such as by immersing the nanoparticles 500 in a solution of the PHPA-phosphate 502. The PHPA-phosphate 502 attaches to the nanoparticles 500 via the phosphate group. A carbohydrate 504 is then coupled to the functionalized nanoparticles 506. For example, the functionalized nanoparticles 506 can be immersed in a solution of carbohydrate 504. The resulting carbohydrate-coated, magnetic nanoparticles 508 bind specific ligands, resulting in a ligand-nanoparticle complex 510. The complex 510 can be magnetically separated from a solution. In alternate embodiments, the carbohydrate can be functionalized with a PHPA. The PHPA-functionalized carbohydrate then can be coupled to the magnetic nanoparticles.

The method illustrated in FIG. 5 is suitable for producing a wide range of structures from monosaccharides to complex carbohydrate conjugates. These structures may be utilized for the efficient detection of pathogens and toxins, and the decontamination of solutions containing pathogens and toxins. The carbohydrate-coated magnetic nanoparticle associates with pathogens and toxins that interact with the carbohydrate. The magnetic nanoparticles and the associated pathogens and/or toxins then are magnetically separated from the solution, thus decontaminating the solution. For example, mannose-coated magnetic nanoparticles can bind $E.\ coli$ bacteria. In a working embodiment, D-mannose was covalently bonded to hematite ($Fe_2O_3$) nanoparticles. The mannose-functionalized nanoparticles have been shown to bind Con A, a plant lectin.

In some embodiments, carbohydrates are attached to non-magnetic metal nanoparticles, such as gold nanoparticles. A unique characteristic of metal nanoparticles as a recognition probe is their remarkable and tunable optical property, the so-called surface plasmon resonance (SPR), determined by their size and shape, the dielectric property of the media, and the distance between particles. Colorimetric bioassays have thus been achieved based on the SPR shift when molecular interactions take place at the surface of the nanoparticles, and have been employed to study fundamental biorecognition processes including cell-cell communication, enzymatic activity, protein-protein interaction, and DNA hybridization. When the ligand-receptor interaction causes additional aggregation of nanoparticles, significant red-shift of the SPR absorption occurs, producing intense color changes visible to the naked eyes.

In one embodiment, gold nanoparticles were synthesized and functionalized with PFPA in a one-pot procedure. Colloidal gold nanoparticles, about 20 nm in diameter, were prepared using the citrate reduction reaction of $HAuCl_4$ (Turkevich et al., *Discuss. Faraday Soc.*, 1951, 11:55-75). The resulting citrate-stabilized gold nanoparticles were light red in color, exhibiting a surface plasmon absorption peak at about 520 nm. The gold nanoparticles were subsequently functionalized with PFPA-disulfide via a modified phase-transfer ligand-exchange reaction, after which the PFPA-functionalized gold nanoparticles migrated to the organic phase, indicating that the hydrophilic surface of citrate-stabilized gold nanoparticles became hydrophobic. The successful functionalization of gold nanoparticles with PFPA was confirmed by $^1H$ NMR and FTIR. The subsequent coupling of carbohydrates to PFPA-functionalized nanoparticles was carried out by mixing the aqueous solution of the carbohydrate with the nanoparticles in acetone, and irradiating the mixture with UV light. In a particular embodiment, α-1,4-mannobiose was coupled to PFPA-functionalized gold nanoparticles. FTIR spectra of the resulting nanoparticles showed the disappearance of the characteristic —$N_3$ absorption at 2125 $cm^{-1}$, indicating that the azido groups were activated. Each step of surface functionalization was accompanied by a color change of the nanoparticle solution. The UV-vis spectra of PFPA-Au and mannobiose-Au both underwent red-shifts after surface functionalization (8 nm and 4 nm, respectively), likely due to the slight size growth and the change of environment around nanoparticles.

Embodiments of the disclosed method produced high carbohydrate coupling efficiencies, and surface coverage of over 80% was obtained for D-mannose. The immobilized carbohydrates effectively retained their recognition abilities as demonstrated by strong interactions with their corresponding carbohydrate-binding proteins, such as mannobiose with Concanavalin A. In addition, the extent of the SPR red-shift of surface-bound carbohydrates upon binding with proteins was consistent with the binding affinity of the free carbohydrate with the corresponding protein in solution. The sensitive SPR signals were conveniently used to monitor the surface chemistry occurred on the nanoparticles, especially in examining the interactions of surface-bound carbohydrates with their binding proteins where large SPR red-shifts were observed causing visible color changes of the Au nanoparticle solutions. Embodiments of the disclosed method can be applied to other carbohydrate structures. Oligosaccharides and polysaccharides have been successfully coupled using the same approach. This general coupling chemistry together with the convenient optical detection offers an attractive platform for rapid qualitative clinical diagnosis, providing label-free sensitive molecular recognition.

E. Carbohydrate Microarrays

Other disclosed embodiments of the method concern producing microarrays, such as carbohydrate microarrays, on surfaces. Microarrays are an efficient way to rapidly analyze large numbers of compounds in highly condensed and easily operated formats using robotics and computer-guided instrumentation. Carbohydrate microarrays show particularly high potential as tools to perform multiple analyses in single assays.

Figure 6:
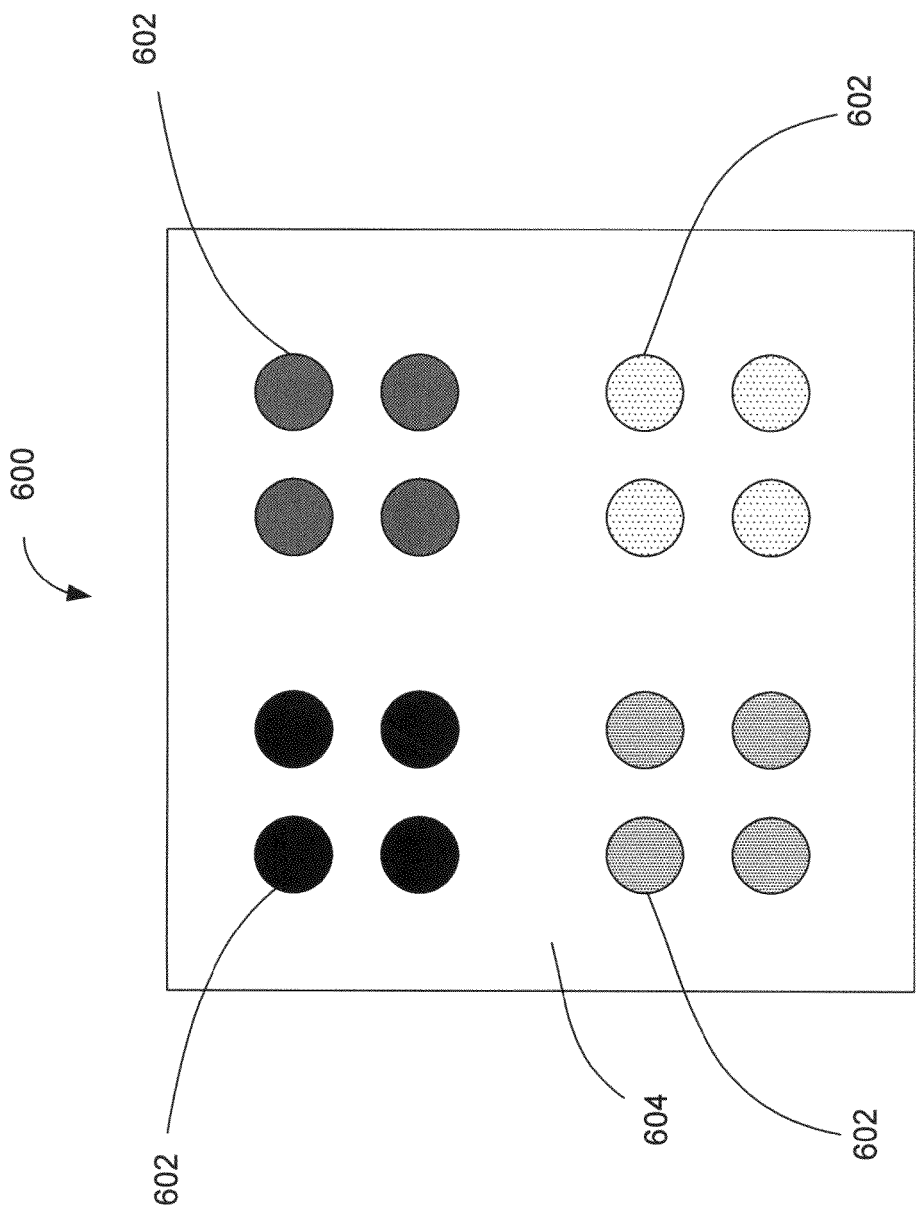
FIG. 6 is a diagram of a carbohydrate microarray.

FIG. 6 is a diagram of a carbohydrate microarray 600. A carbohydrate microarray is made by affixing carbohydrates 602 in separate locations, in an ordered manner, on a substrate 604.

Carbohydrate microarrays can be employed to screen and detect ligands that interact with different biomacromolecules. For example, a working embodiment has shown that lectins can be directly screened for interactions with arrays of potential ligands and inhibitors, enabling rapid screening at high throughput. Carbohydrate microarrays also can be used to detect bacteria and identify their adhesion targets. In addition, a multitude of bacterial toxins, e.g., cholera and tetanus toxins, are known to interact with cell-surface carbohydrate structures. For example, cholera toxin has been shown to bind to galactose affinity columns and to terminal galactose sugars, e.g., oligosaccharide sequences comprising βGal(1-4) βGal(2). Microarrays can be utilized to detect the toxins and to further map their carbohydrate binding preferences. The properties of uncharacterized toxins also can be established.

Because of the high diversity of carbohydrates and the importance of maintaining the three-dimensional structure and positioning of the carbohydrates, manufacturing carbohydrate microarrays has proved difficult. Further, the complexity with which monosaccharides join together to form polysaccharides makes the in vitro synthesis of carbohydrate microarrays problematic. Noncovalent adsorption has proven effective with some polysaccharides but works poorly with smaller carbohydrates such as disaccharides and monosaccharides. Carbohydrates can be covalently bound to a surface through a suitable linker or connected directly to the surface through a suitable moiety already present on the carbohydrate. However, the incidence of a common moiety in the large variety of naturally occurring carbohydrates is limited, and the chemical methods of connecting such moieties specifically and securely to the surface are even more limited. Modification of the carbohydrate with a linker can enhance site-specific interactions between the surface and the carbohydrate, but the chemical modification needs to be both stable and easy to make.

Photochemical techniques can be used to provide light as a reaction energy source to prepare carbohydrate arrays. The disclosed techniques provide several advantages over existing methods: 1) light offers a highly chemoselective method for activating compounds without affecting, such as by activating or inducing a reaction between, other entities either intra- or intermolecularly; 2) light-sensitive groups can be selectively reacted under mild conditions in solid state and in high yield; 3) light wavelength and intensity can be varied to control the conjugation yield and density; and, 4) light-based photopatterning and arraying techniques can be adapted readily for large-scale production.

Embodiments of a method for making carbohydrate microarrays are disclosed herein. The resulting carbohydrate arrays can be used to reveal the recognition patterns of carbohydrate-binding proteins. In one approach illustrated below in Scheme 7, a carbohydrate-photoprobe conjugate is made, such as by derivatizing a carbohydrate with a photoprobe, such as a perhalophenylazide. The conjugate is attached to a substrate. It may be advantageous to insert a linker, such as a variable-length oligo(ethylene oxide) linker (indicated by a wavy line in Scheme 7), between the carbohydrate and the PHPA.

Scheme 7

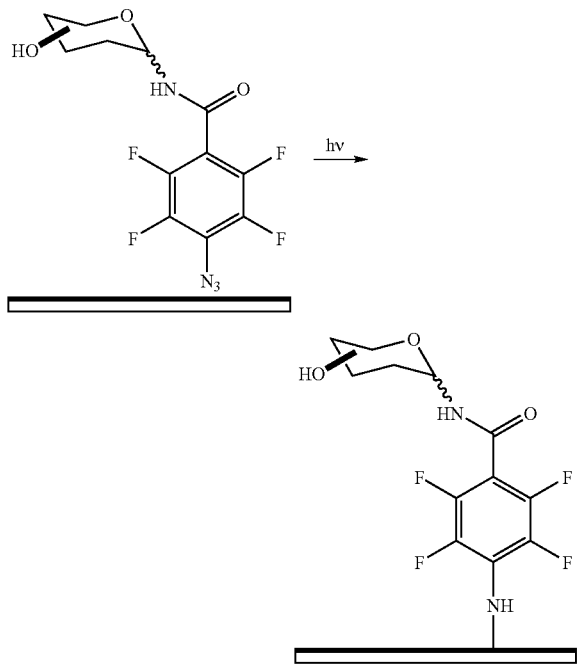

A second approach, illustrated below in Scheme 8, utilizes PHPA-derivatized surfaces for direct photo-induced attachment of carbohydrates. The substrate is functionalized with a PHPA, introducing the photoactive azido groups. Subsequently, the functionalized substrate is coated with the carbohydrate, and the carbohydrate is photochemically attached. In Scheme 8, the line extending into the polysaccharide structure indicates that nitrene group insertion may occur at various locations within the polysaccharide structure. This method does not require derivatization of the carbohydrate and is useful for polysaccharides and other macromolecular entities.

Scheme 8

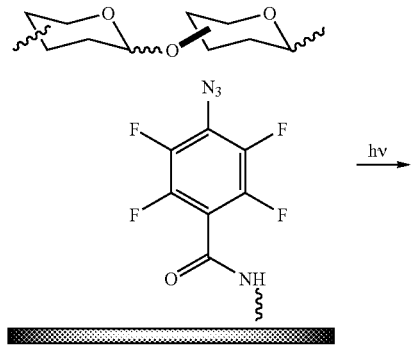

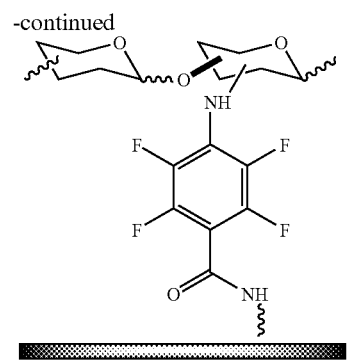

Direct covalent coupling also makes it possible to control carbohydrate orientation on the surface. For example, a ligand or functional group is coupled to a portion of the substrate surface. The ligand or functional group is selected for its ability to selectively interact with a particular region on the carbohydrate molecule and pre-orient the carbohydrate molecule on the substrate surface. The ligand or functional group thus temporarily holds the carbohydrate molecule in the desired position on the substrate surface. Areas of the surface not occupied by the ligand or functional group may be functionalized with a PHPA; alternatively, the carbohydrate may be derivatized with the PHPA. In either embodiment, a reaction energy source subsequently is used to cause the PHPA to covalently bind the pre-oriented carbohydrate molecule and fix its orientation.

A working embodiment demonstrated that PHPA-derivatized monosaccharides (α-D-mannose and N-acetyl-β-D-glucosamine) could be covalently bonded to polymer surfaces. Silica-based materials, such as glass slides, were coated with PEG or PS and then coated with PFPA-derivatized saccharides. A portion of each slide was irradiated with a reaction energy source. The coated slides were exposed to fluorescently-labeled concanavalin A (Con A) and monitored with a fluorescence microscope. The results clearly showed that Con A was specifically bound to the derivatized saccharides on the areas of the PEG-coated surface that had been irradiated with the reaction energy source, with no binding to non-exposed areas. Thus, PEG was shown to be a suitable polymer for further studies. Con A bound with equal fluorescence intensity to both exposed and unexposed areas on the PS-coated surfaces, due to the nonspecific adsorption of proteins by PS. A person of ordinary skill in the art will recognize that other biocompatible polymers are useful for this embodiment, including polyalkylene glycols, PEO, PEOX, PVP, and combinations thereof.

In particular embodiments, carbohydrates are attached to polymer-coated substrates. For example, N-hydroxysuccinimide-perhalophenylazide (NHS-PHPA) is applied to amino-functionalized glass slides, forming a monolayer of the PHPA on the surface. Next the slide is coated with a polymer solution, e.g., PEO, such as by immersion, spray-coating, or spin-coating. Subsequent irradiation with a reaction energy source results in a thin layer of PEO covalently attached to the slide surface. PHPA-derivatized carbohydrates (produced by the method outlined in Example 2) are attached in an array format on the PEO surface by photoinitiated insertion. The array format can be prepared by conventional methods, e.g., inkjet-type printing devices and light irradiation through a digital photomask, among others.

In an alternate embodiment, high-density carbohydrate arrays can be fabricated by a combination of photolithography and arraying techniques. A polymer, such as PEG, is applied to a glass slide previously functionalized with PHPA, e.g., a PHPA-silane. A photomask having an array of opaque circles, the size of which is slightly larger than the spots of carbohydrate to be applied, is placed over the PEG-coated glass slide. The photomask is designed such that the spacing will match those on the arraying device. Irradiation through the photomask covalently attaches PEG to the glass slide, forming background surfaces with low non-specific protein adsorption. The opaque circles on the photomask prevent exposure of covered areas, leaving behind unreacted azido groups for subsequent carbohydrate association. The glass slide is washed with water to remove unbound PEG from the unexposed areas. Carbohydrates then are spotted onto the glass slide in the positions of the unexposed circles. Subsequent photoactivation covalently attaches the carbohydrates to the substrate, forming a carbohydrate microarray.

In a working embodiment, various carbohydrates, including monosaccharides ($\alpha$-D-mannose, $\beta$-D-glucose, $\beta$-D-galactose, N-acetyl-$\beta$-D-glucosamine, $\alpha$-L-fucose, $\alpha$-L-arabinose, $\beta$-D-xylose) and disaccharides (lactose, cellobiose), were covalently bonded in a microarray arrangement on surfaces coated with a PEO thin film. Following array development, binding analysis of the surfaces was performed. Known lectins of different specificity, including *Griffonia simplicifolia* II (GSII), peanut agglutinin (PNA), jack bean lectin (Con A), and soybean agglutinin (SBA), were used to demonstrate the specific binding patterns of the lectins.

In another embodiment, the carbohydrate microarray comprises an additional component that is associated with the carbohydrates and facilitates analysis or detection of the compounds or materials being screened. The additional component can be a biomolecule (e.g., a protein, a peptide, an oligonucleotide, among others) or a compound comprising a functional group that interacts with the compounds or materials being screened by the microarray. For example, a lectin, such as con A, can be associated with mannose on the microarray to facilitate in the detection of *E. coli* bacteria. The con A can be coupled to the substrate surface by any suitable method, or the con A can be associated with a portion of the mannose molecules that are covalently bonded to the surface.

F. Additional PHPA Compounds and Uses

PHPA structures can be tailored readily to introduce various functional groups. The structures also can be modified further to introduce structural variations such as longer spacers for easier access and topography control.

Figure 7:
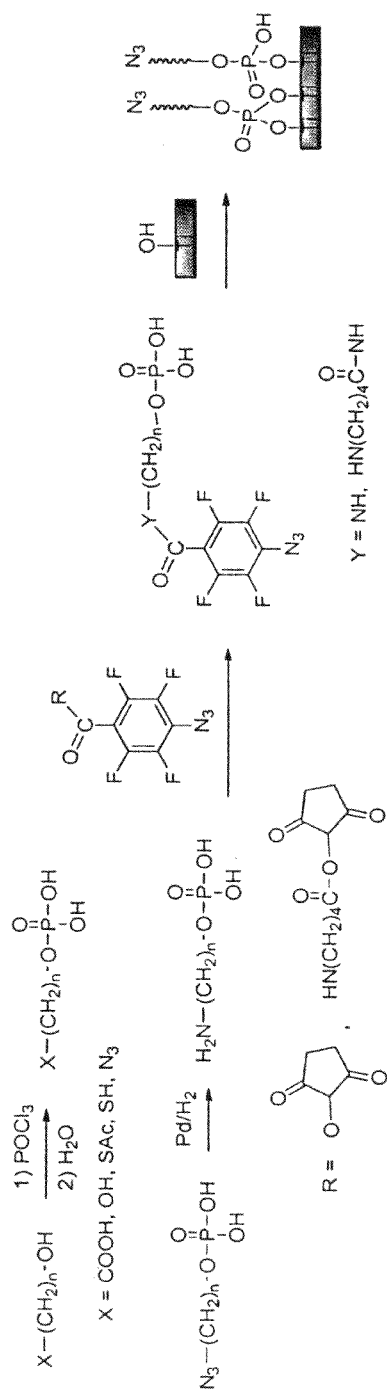
FIG. 7 illustrates one disclosed embodiment for producing phosphate-functionalized polyfluorophenyl azides (PFPAs) for metal oxide surface modification.

For example, phosphate-functionalized PHPAs can be synthesized for attachment to metal oxides such as, for example, $TiO_2$. Phosphates selectively bind to transition metal oxides such as, for example, $TiO_2$, $Ta_2O_5$, $Al_2O_3$, and $Fe_2O_3$, as shown in FIG. 7. Phosphates can be assembled from aqueous solutions, thus making the process attractive for biological and medical applications.

Figure 8:
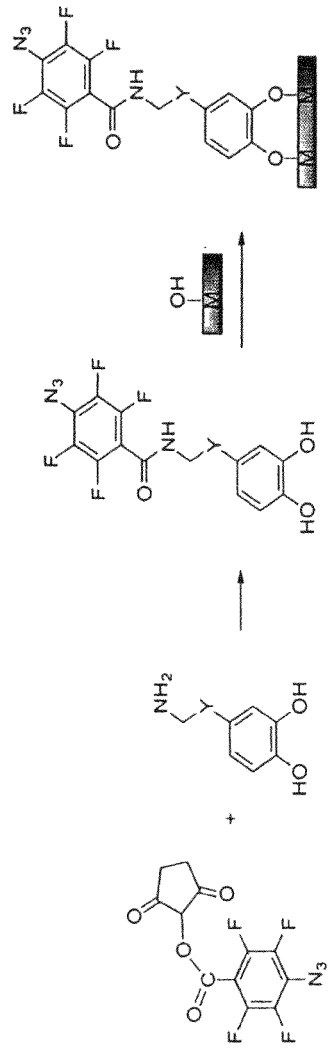
FIG. 8 illustrates one disclosed embodiment for producing polyhydroxy aryl compounds, such as catechol-functionalized PFPAs, for oxide surface modification.

Other efficient compounds for metal oxide surface functionalization include polyhydroxylated aryl compounds, such as catechol, resorcinol, and hydroquinone. Two main mechanisms are proposed to account for the adhesive property of polyhydroxylated aryl-based molecules: condensation of the polyhydroxylated aryl compound with a hydrated metal oxide surface (FIG. 8, Y denotes a spacer), and crosslinking of quinones following oxidation of the polyhydroxylated aryl moiety. Spacers can include aliphatic groups, substituted aliphatic groups, aryl groups, and substituted aryl groups, among others. Particular examples of spacers include, but are not limited to, alkylene glycols, and substituted glycols, such as, for example, ethylene glycol-based linkers. Under the PHPA UV irradiation conditions, catechol oxidation occurs, and therefore both mechanisms of adhesion are expected.

Polyhydroxylated aryl moiety-containing biocompatible polymers previously have been prepared as antifouling surfaces especially suited for bioanalytical applications due to their excellent water-resistant property. Polyhydroxylated aryl-functionalized PHPAs, such as catechol-PHPAs, are expected to be highly versatile crosslinkers.

Quaternary ammonium-functionalized PFPAs can be synthesized for use with clays/minerals in nanocomposite formulation. Clay minerals are cost-effective and versatile raw materials for preparing polymer nanocomposites. These materials are used as energy-saving and environment-friendly automotive parts and food packaging materials. The structures and properties of nanocomposites are directly affected by the extent of dispersion, or exfoliation, of clay platelets. The best performing nanocomposites are obtained from complete exfoliation where the individual nanometer-thick clay platelets are uniformly blended with the polymer matrix. Simple, general, effective and inexpensive methods, such as disclosed embodiments of present technology, are of prime importance to achieve the best properties and performance of these nanocomposite materials.

One approach to exfoliation is to exchange inorganic cations of clays with alkyl ammonium ions. The alkyl group provides an inert coating for the clay platelets and improves blending with the polymer matrix. However, simply exchanging the inorganic cations of the clay with organic ions does not automatically lead to complete exfoliation. Especially challenging are polyolefins such as polyethylene and polypropylene. Polyolefins typically do not mix well with the clay platelets and phase separation of the polymer and platelets occurs.

Figure 9:
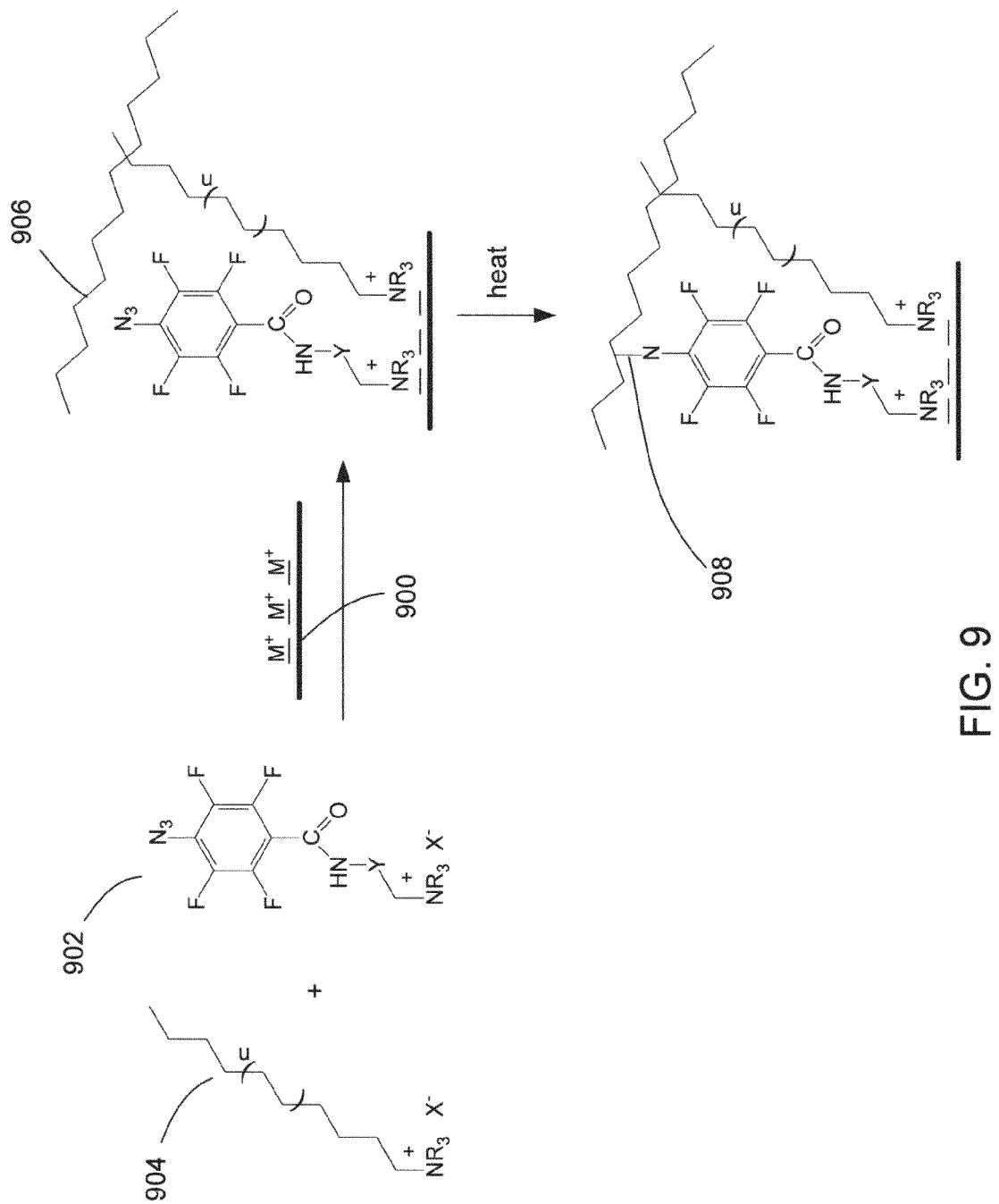
FIG. 9 illustrates one disclosed embodiment for modifying clay surfaces with quaternary ammonium-functionalized PFPAs.

FIG. 9 illustrates one embodiment for improving exfoliation of clay platelets 900 using PHPAs bearing ammonium ions together with an alkyl ammonium compound to increase blending with the polymer matrix. In FIG. 9, X denotes a counter anion, such as a halide, Y denotes a linker, $M^+$ denotes an inorganic cation, and n is an integer. The charge on $M^+$ can be, for example, $1^+$, $2^+$, or $3^+$. The value for n is an integer and ranges from 1 to at least 100, from about 5 to about 50, or typically from about 6 to about 18. Linkers can include aliphatic groups, substituted aliphatic groups, aryl groups, and substituted aryl groups, among others. Particular examples of linkers include alkylene glycols and substituted glycols, such as ethylene glycol-based linkers including, for example, 2-[2-(2-chloro-ethoxy)-ethoxy]-ethanol. Suitable inorganic cations include metal cations such as alkali metal cations, alkaline earth metals, transition metals, ammonium ions, and combinations thereof.

The ammonium-PHPA 902 and alkyl ammonium compound 904 couple through ionic interactions to the negatively charged clay platelets 900. A polymer 906 then becomes physically entangled with the alkyl ammonium compound 904, bringing it into proximity with the ammonium-PHPA 902. The polymer can be any polymer selected to provide an embodiment suitable for the intended use of the nanocomposite. For example, suitable polymers include, but are not limited to, polyolefins (e.g., polyethylene, polypropylene), polyamides, polycarbonates, and polyimides, among others. The length, or molecular weight, of the polymer also is selected to provide an embodiment suitable for the intended use. For example, polyethylene is commercially available (e.g., from Sigma-Aldrich Co.) at molecular weights up to about 6,000,000, such as from about 4,000 to 6,000,000, and more typically from about 4,000 to about 35,000. Polypropylene is commercially available (e.g., from Sigma-Aldrich Co.) at molecular weights from about 14,000 to about 600,000, and more typically from about 14,000 to about 250,000.

Upon application of a reaction energy source, such as heat or light, the ammonium PHPA 902 forms a covalent bond 908 with the neighboring polymer chain 906, attaching the polymer 906 on the clay platelet 900 and leading to improved blending with the polymer matrix. The covalent bond formation can be achieved during nanocomposite processing where functionalized clay and the polymer are heated to melt the polymer, frequently at greater than about 140° C., which is suitable for thermal activation of PHPAs. In case of incomplete reaction, an additional short irradiation can be incorporated. Because the PHPA chemistry is applicable to any materials bearing C—H, N—H, O—H, and C—C bonds (single, double and triple), a great variety of polymers can be used for making high-performance nanocomposite materials.

In another embodiment, PHPA chemistry is useful for preparing graphene, a form of graphite first discovered in 2004. Graphene is a single layer, 0.35 nm thick, of two-dimensional graphite where the carbon atoms form a lattice of hexagon rings. Graphene is a flat, polycyclic, aromatic molecule comprising hexagonal rings of $sp^2$-bonded carbon atoms. Graphene's crystalline structure imparts rigidity and strength to the graphene layer. Graphene has emerged as a unique nanoscale material with promising applications in electronics due to its stable crystal structure, optical transparency, and its exceptional electronic properties of high electron mobility and high saturation velocity (the point at which the carrier velocity reaches a maximum) for both electrons and holes.

Graphene can function as a semi-metal or zero-gap semiconductor. As such, graphene can be used in integrated circuits such as, for example, back-gated field-effect transistors. Although graphene has few intrinsic charge carriers, it is highly conductive and exhibits high electron mobility. By simply adding an electron, its resistivity changes. Graphene demonstrates an ambipolar electric field effect. Charge carriers can be either electrons or holes that can be transported with mobilities exceeding 15,000 $cm^2/Vs$. Ballistic transport makes graphene useful for a wide range of applications, including faster, smaller integrated circuits (e.g., field effect transistors) and highly sensitive sensors. An added advantage of graphene devices is that the metal contacts are expected to be ohmic with low-resistance, which would reduce the transistor switching time and enhance sensor sensitivity.

Graphene also can be used to detect individual molecules. Absorbance of a molecule, e.g., a gas molecule such as $N_2$, on the surface of a graphene sheet causes a local change in electron resistance within the sheet. This property can be utilized to produce highly sensitive graphene-based sensors. Since graphene prepared by the disclosed method has covalently bonded PHPA molecules on its surface, the graphene can be functionalized to produce highly sensitive detection of specific species. For example, an organic functional group on PFPA (e.g., —OH, —COOH, —$NH_2$, etc.) can be used to attach biological molecules such as an anti-PSA (prostate-specific antigen) antibody to the graphene surface.

Graphene can be prepared from graphite by mechanical exfoliation, or peeling, of graphite layers. For example, graphene has been produced in the past by using cellophane tape to peel multiple layers of graphene sheets from highly-ordered pyrolytic graphite (HOPG). The peeled layers of graphene sheets are transferred to a substrate using mechanical pressure followed by removal of the tape. However, the graphene films produced by this method contain different numbers of graphene layers, and the percentage of single graphene sheets varies from sample to sample. An improved version of the mechanical cleavage technique involves applying pressure to press HOPG on the substrate directly, thus physically transferring the material from HOPG to the substrate. Graphene sheets deposited by physical transfer are physisorbed on the substrate and can easily be removed by washing with a solvent (e.g., isopropanol or acetone) or sonication. The physisorbed graphene sheets also are soluble in N-methyl-2-pyrrolidone (NMP), a known solvent for graphene.

Graphene also can be prepared by chemical vapor deposition or by high temperature conversion of diamond nanoparticles. The currently known synthetic procedures for graphene preparation involve high temperature/high pressure processes.

In disclosed embodiments, PHPAs, e.g., PFPAs, including functionalized PHPAs, are used for simultaneous synthesis and surface functionalization of graphene. The functionalized PHPA comprises a perhalophenylazide, optionally a spacer, and a functional group. Spacers can include aliphatic groups, substituted aliphatic groups, aryl groups, and substituted aryl groups, among others. Particular examples of spacers include, but are not limited to, alkylene glycols, and substituted glycols, such as, for example, ethylene glycol-based linkers. Exemplary functional groups include, without limitation, aldehydes, alkenyl groups, alkynl groups, amines, azides, carboxyl groups and derivatives thereof, disulfides, haloalkyl groups, hydroxyl groups, ketones, maleimido groups or other dienophilic groups, nitrenogenic groups, phosphates, sulfhydryl groups, and sulfonyl halide groups.

Figure 10A:
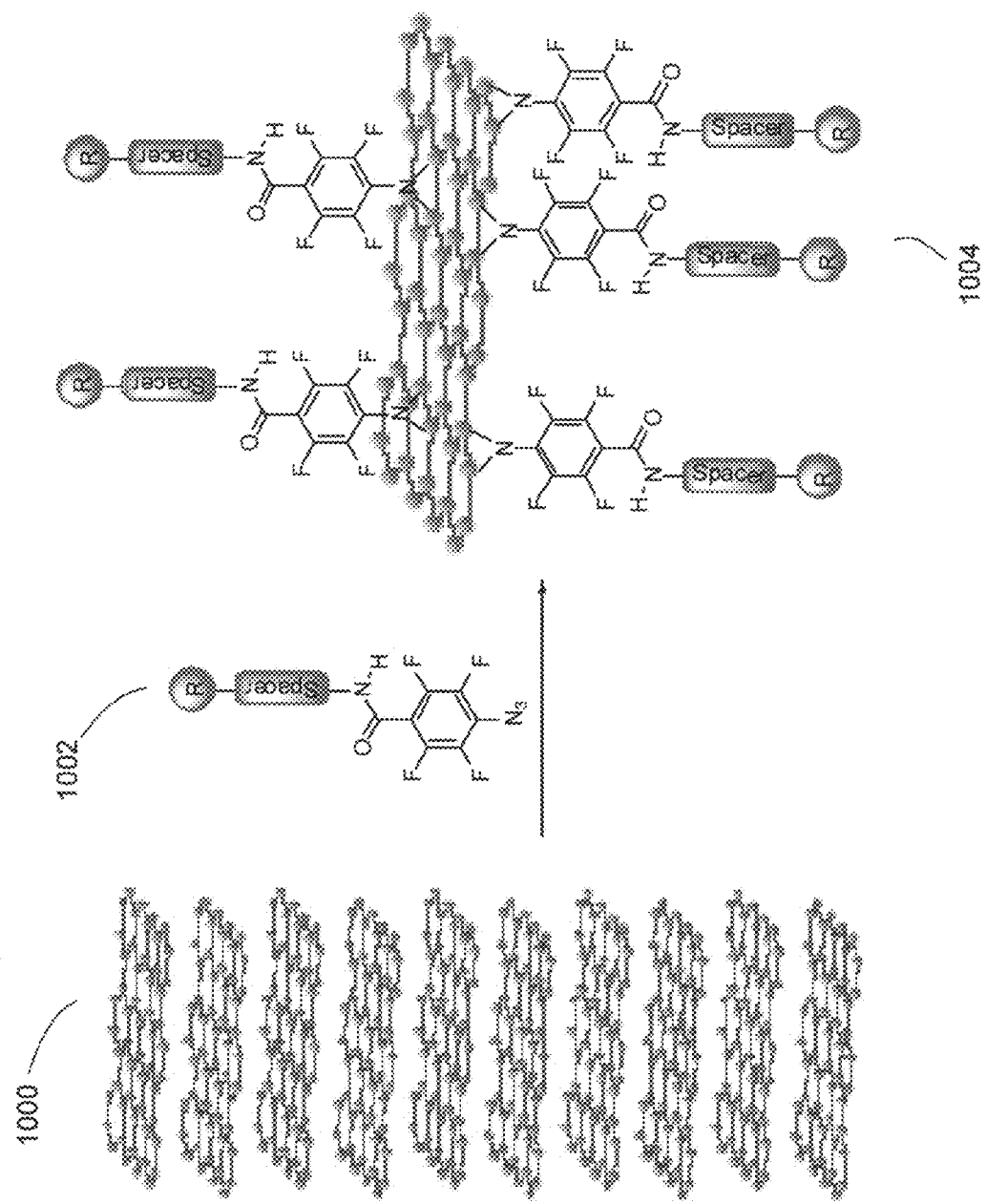
FIG. 10A illustrates one disclosed embodiment for producing PHPA-functionalized graphene.

FIG. 10A illustrates one disclosed embodiment for preparing graphene. In FIG. 10A, R denotes a functional group. Graphite 1000 reacts with a functionalized PHPA 1002, such as a functionalized fluorophenylazide. Upon exposure to a reaction energy source, e.g., UV or heat, the functionalized PHPA 1002 undergoes C═C addition reactions with the graphite structure 1000 to form PHPA-functionalized graphene 1004. As the reaction proceeds, the R group and spacer on the functionalized graphene surfaces facilitate the peeling of layered graphite structures 1000 to yield functionalized graphene sheets 1004. Scheme 9, below, illustrates the chemistry of PFPA activation with heat or UV irradiation and its subsequent reaction with a C═C bond in graphite to form PFPA-functionalized graphene.

Scheme 9

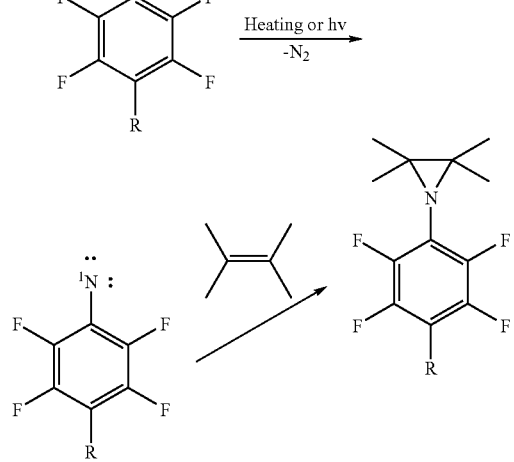

The disclosed embodiments provide a solution-based, low-temperature process for preparing graphene. The functional group, R, on the PHPA increases the solubility of graphene sheets in organic solvents or aqueous solutions, making the resulting functionalized graphene solution-processable. Furthermore, R can be used to attach additional monomers or polymers, including biomolecules or materials, to graphene for device applications.

In some working embodiments, graphite was functionalized with a PFPA molecule to produce PFPA-functionalized graphene. Graphite powder was added to a solution including a PFPA in an organic solvent. Suitable organic solvents include aromatic compounds, halogenated aromatic compounds, aliphatic compounds, and halogenated aliphatic compounds, e.g., chlorobenzene, tetrachloroethane, and N-methyl-2-pyrrolidone, among others. The mixture was ultrasonicated overnight and then refluxed for three days. Unreacted graphite was removed by centrifugation.

In another embodiment, graphite (natural graphite, SP1 graphite (spectroscopic-grade graphite, manufactured by Union Carbide, with an average plate diameter of 100 μm), and graphite flake) was first reacted with a mixture of concentrated sulfuric acid and nitric acid. The intercalated graphite was then filtered, washed, and dried. After drying, the intercalated graphite was exfoliated by heating to 1000° C. in forming gas (3% hydrogen in argon). Next, the exfoliated graphite was mixed with a solvent and a PFPA. Suitable organic solvents include halogenated aromatic compounds and halogenated aliphatic compounds, e.g., chlorobenzene or tetrachloroethane. The mixture was ultrasonicated overnight, followed by refluxing for several days. Unreacted graphite was removed by centrifugation, and the supernatant was filtered to obtain functionalized graphene.

In another working embodiment, HOPG was functionalized. PFPA-NHS was spin-coated onto the HOPG surface, irradiated with UV, and subsequently exposed to horseradish peroxidase enzyme to covalently attach the enzyme to the HOPG.

In other working embodiments, $C_{60}$ and carbon nanotubes were functionalized using PFPAs. Both materials are closely related to graphite and graphene structurally.

Figure 10B:
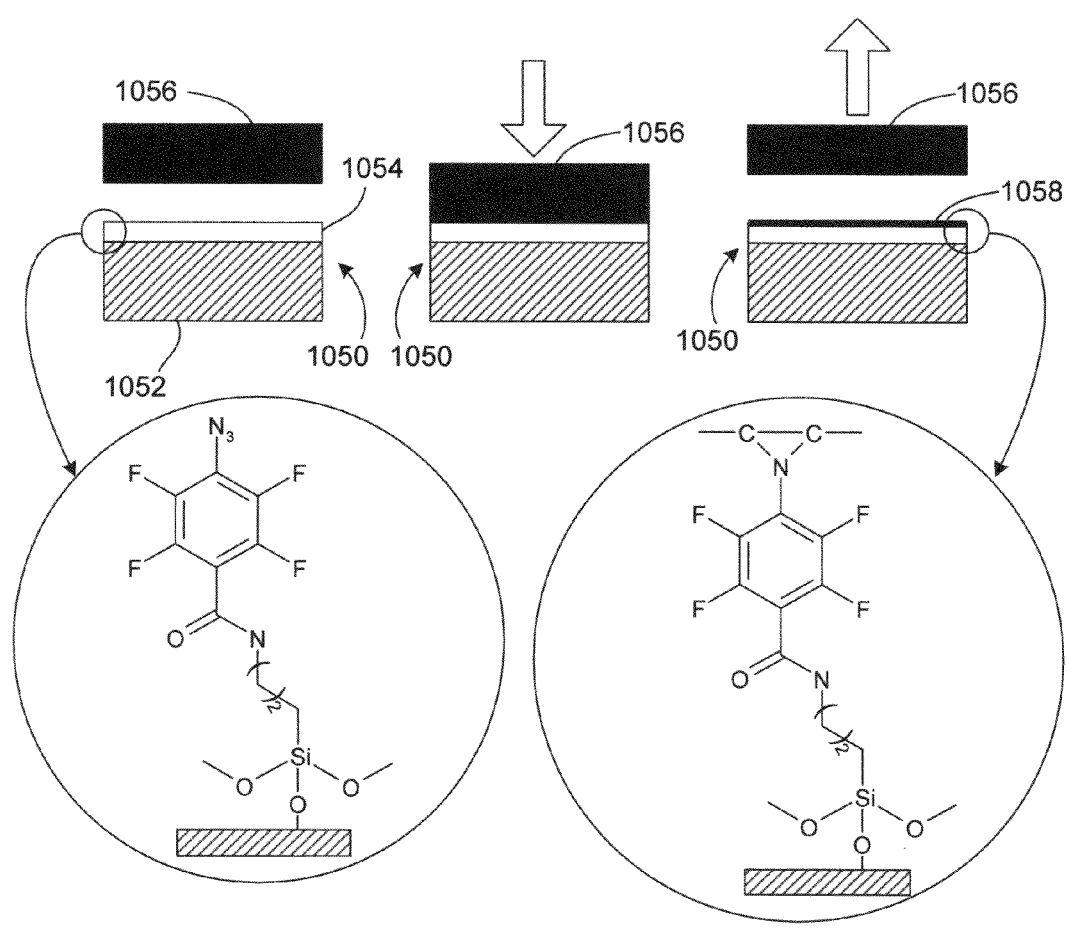
FIG. 10B illustrates one disclosed embodiment for producing covalently immobilized graphene on a silicon wafer.

In another working embodiment, graphene sheets were covalently attached to silicon wafers using PHPAs. FIG. 10B illustrates one disclosed embodiment for preparing covalently immobilized graphene on a silicon wafer. A functionalized silicon wafer 1050 was formed by coating a silicon wafer 1052 with PFPA-silane 1054. HOPG 1056 was mechanically pressed onto the functionalized silicon wafer 1050 and heated at 100-150° C. for 20-40 minutes. Thermal treatment initiated the addition reaction of the perfluorophenylnitrene with graphene. Nitrene formation also can be initiated photochemically and, in another embodiment, graphene films have been covalently immobilized by UV irradiation. The HOPG 1056 was then removed, leaving a sheet of graphene 1058 covalently attached to the functionalized silicon wafer 1050. The immobilized graphene films remained on the wafer after both solvent washing and sonication. In contrast to physisorbed graphene sheets, the covalently immobilized graphene films are insoluble in NMP.

This method can be applied to other substrates by changing the functional group on the PFPA. For example, in another working embodiment, graphene sheets were covalently attached to gold films using a thiol-functionalized PFPA. Thus, the method can be used to construct graphene-based integrated circuits on a wide range of substrates, including copper, gold, and silicon wafers, among others.

In some embodiments, PHPA-graphene is further functionalized with another molecule, e.g. an antibody, and utilized for detection of specific species. For example, antibodies can be attached to PHPA-graphene and used to detect prostate specific antigen, a marker for prostate cancer. In particular embodiments, PFPA-NHS is utilized to covalently attach antibodies to graphene, as illustrated below in Scheme 10. PFPA-NHS binds to graphene via the azide group and is covalently immobilized by UV irradiation. Subsequently, a biomolecule such as an antibody (represented by "Y" in Scheme 10) binds to the NHS functional group. This method provides oriented immobilization of antibodies on the device surface, with the antigen binding sites of the antibody molecules oriented away from the surface of the device. Typically, more than 95% of the antigen-binding activity remains when the antibodies are bound to the device surface.

Scheme 10

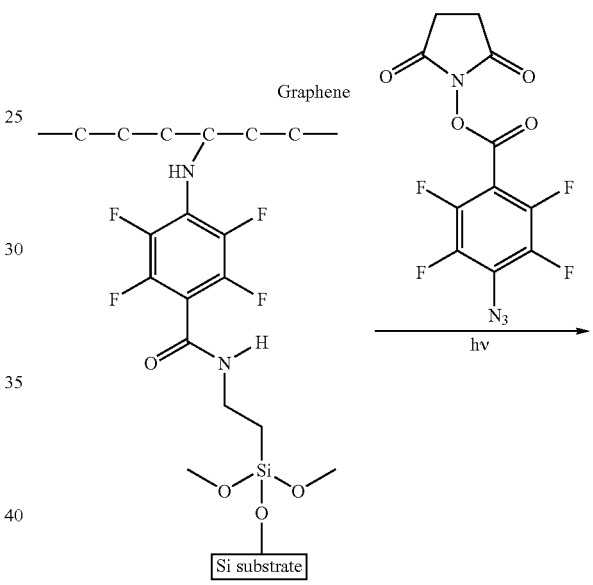

-continued
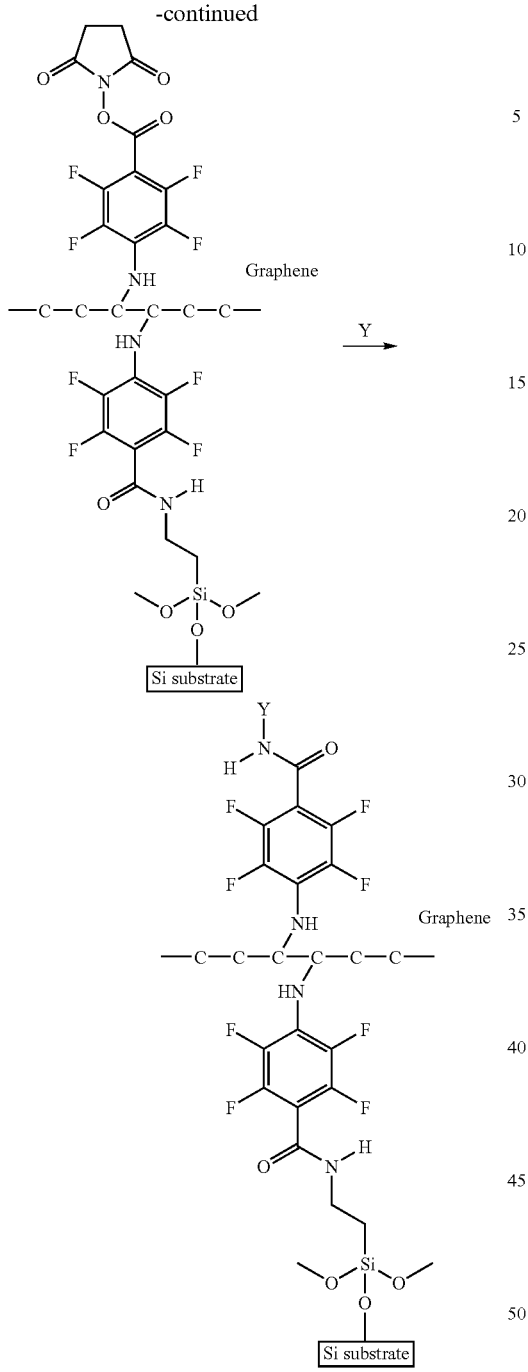
Scheme 11 illustrates another embodiment utilizing a PFPA-derivatized carbohydrate to bind the antibody.

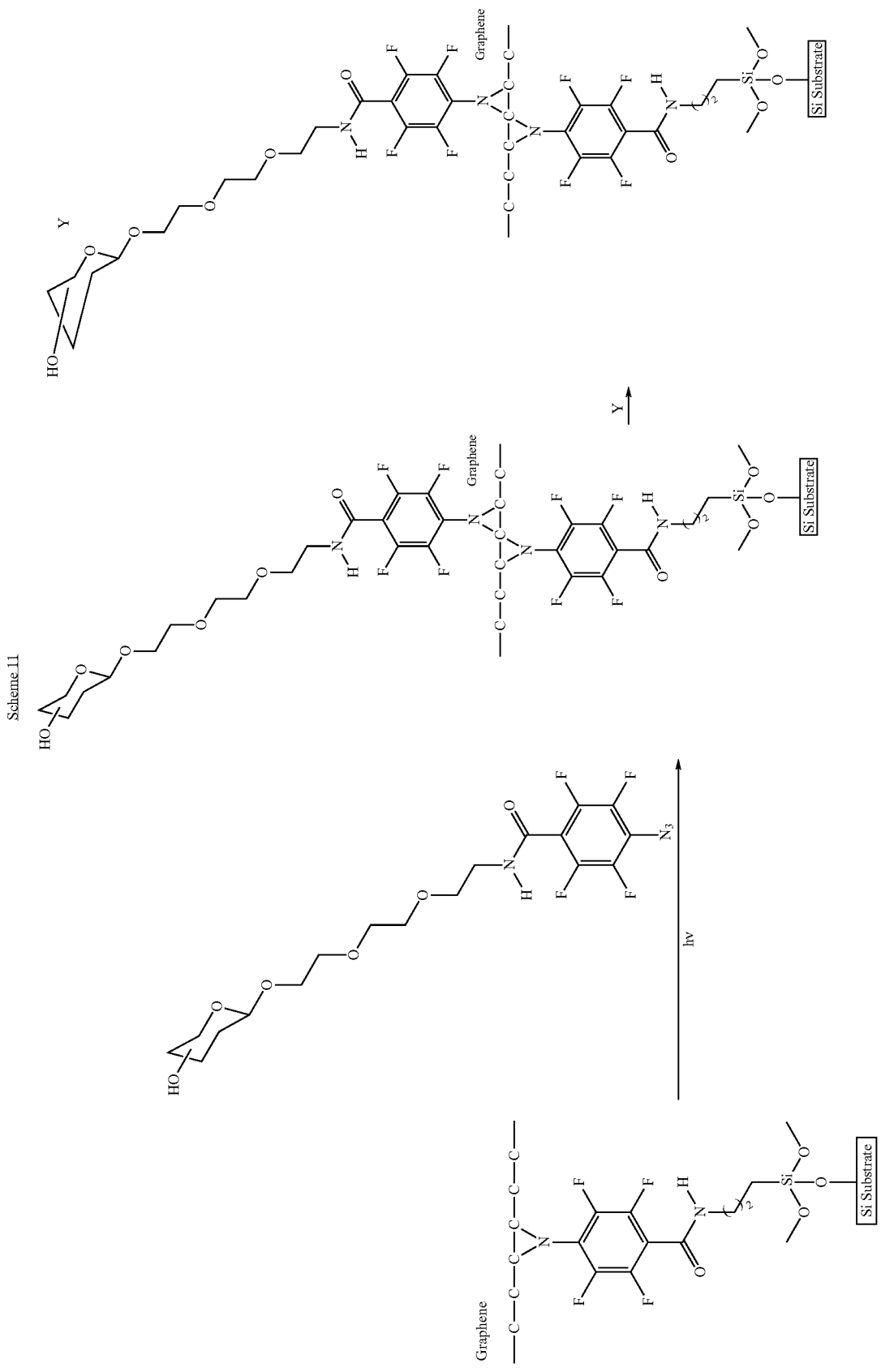

In another embodiment, antibodies are attached to PHPA-graphene using aminopropyltriethyl silane (APTES). APTES activates surface hydroxyl groups and provides amine groups for attachment to antibody molecules. The amine groups are used to target the carbohydrate moieties on antibody molecules using periodic acid Schiff (PAS) chemistry. Glycoprotein carbohydrates make up about 4-18% of antibody molecules. Treatment with periodic acid generates aldehyde groups (—CHO) on the carbohydrate moieties of the antibodies. These aldehydes are highly reactive towards primary amines, as provided by the APTES on the graphene surface, thus binding the antibodies to the graphene surface. This method provides oriented immobilization of antibodies on the device surface, with the antigen binding sites of the antibody molecules oriented away from the surface of the device. Typically, more than 95% of the antigen-binding activity remains when the antibodies are bound to the device surface.

Surface and interface properties, i.e., the structure, composition, chemical functionality, and topography of the surfaces directly affect the polymer association yield, efficiency, and integrity. Multifunctional surfaces can be constructed that can direct molecules to the surface before they are attached. Specifically, the surface functional groups promote physisorption of the molecules to be immobilized. Subsequent photoinduced reaction covalently bonds the molecules to the substrate surface. This strategy produces increased local concentration of the target molecules on the surface, leading to substantially increased yield and efficiency. This strategy eliminates the need for additional reagents, which can potentially contaminate the system. Customized photoactive substrates that are optimal for the attachment of a greater variety of compounds and materials can be constructed.

A mixed monolayer, i.e., a single layer having two or more different chemical moieties attached or associated therewith, approach creates surfaces having PHPA together with another component comprising a functional group that can efficiently interact with the molecule to be attached. The role of this functional group is to attract the target molecule to the functionalized surface through physisorption, i.e., non-covalent intermolecular interactions. Subsequent irradiation results in the covalent attachment of the molecules by the surface azido groups. Previous studies have shown that less than one molecule of PFPA per 100 molecules in the mixed monolayer is needed to achieve efficient attachment, and the density of the surface azido groups can be controlled by the addition of a non-photoactive component associated with the surface. This strategy is especially useful for attachment from solutions where solvent molecules, for example water, can effectively quench the reactive nitrenes.

Figure 11:
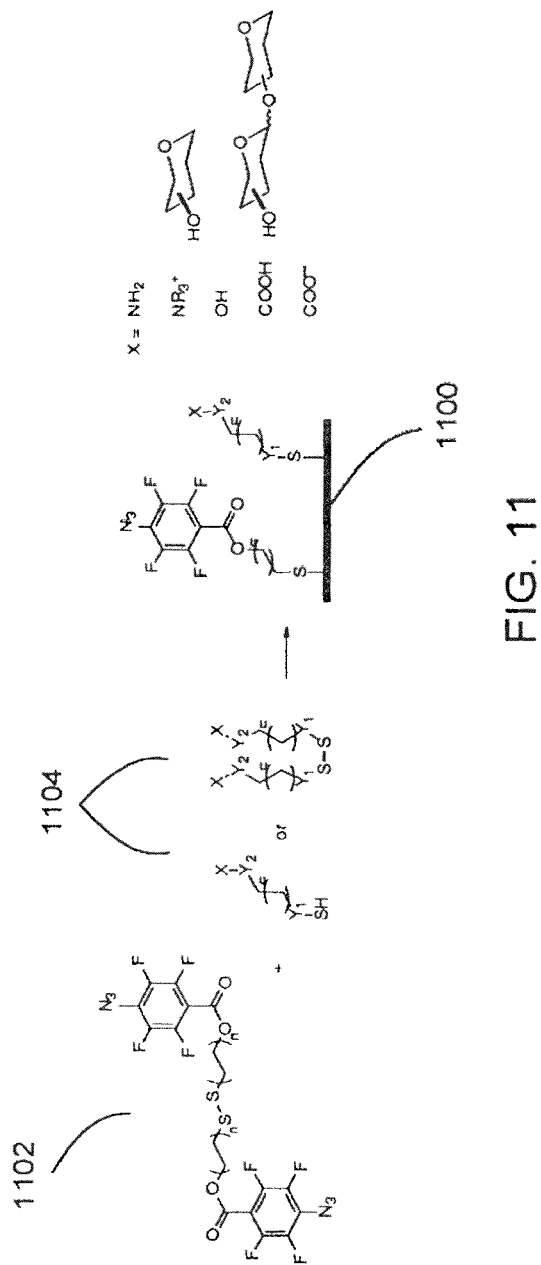
FIG. 11 depicts a mixed monolayer adsorbed, such as by covalent bonding, to a substrate.

FIG. 11 illustrates one example of a mixed monolayer 1100 produced by a bis-PHPA-disulfide 1102 and a functionalized thiol/disulfide 1104. $Y_1$ and $Y_2$ are spacers. Spacers can include aliphatic groups, substituted aliphatic groups, aryl groups, and substituted aryl groups, among others. Particular examples of spacers include, but are not limited to, alkylene glycols, and substituted glycols, such as, for example, ethylene glycol-based linkers.

For example, the attachment of a specific group of polysaccharides, glycosaminoglycans (GAGs), to substrates is of interest. These molecules are linear polysaccharides with repeating disaccharide units containing either N-acetylgalactosamine or N-acetylglucosamine and a uronic acid. GAGs are located primarily on the surface of cells or in the extracellular matrix. These molecules are highly negatively charged. Solutions of these molecules possess high viscosity and low compressibility, which makes them ideal for joint lubrication. GAGs of physiological significance include, but are not limited to, hyaluronic acid, dermatan sulfate, chondroitin sulfate, heparin, heparan sulfate, and keratan sulfate. Hyaluronic acids, large polymers with molecular weights of 100,000-10,000,000, can displace a large volume of water and are excellent lubricators and shock absorbers. Heparin is widely used to inhibit blood clotting in post-surgical patients. A monolayer of heparin covalently bonded to the surface of biomaterials or devices renders them non-thrombogenic for in vivo applications.

The design of GAG-philic surfaces takes advantage of the polarity and multiple negative charges on GAGs. A mixed monolayer is formed on the surface, comprising a PHPA and a non-photoactive component associated with the surface. The non-photoactive component comprises positive charge (s) or polar functional groups that can interact with GAGs via ionic attractions, hydrogen bonding, and dipole interactions, bringing GAGs in closer proximity with the surface azido groups. Of special interest are carbohydrate-derivatized thiols and disulfides. Many mono- and disaccharide derivatives have been synthesized, e.g., thioglucose, thiofructose, and thiolactose, among others. The carbohydrate moiety offers multiple interaction sites with GAGs, which may lead to a large enhancement in attachment efficiency.

Self-assembled GAG monolayers (SAMs) and mixed SAMs based on substrates functionalized with a sulfur-bearing group, such as a thiol or disulfide, e.g., thiol-derivatized gold substrates, can be well controlled. The gold substrate is immersed gradually in a dilute PHPA solution, such as a thiol-PHPA or a disulfide PHPA, using a linear-motion drive. Subsequent immersion into a second thiol or disulfide solution yields a chemical gradient with varied density of the azido and the functional groups. The immersion rate, as well as the reactivity of the two thiol/disulfide components, dictates the composition of the treated surfaces. Other experimental conditions also can be varied, including the concentration of GAG, the use of buffer solutions and the buffer's ionic strength.

Surface characterization techniques are used to study the functionalized surfaces and the attached GAGs. These include ellipsometry for film thickness, QCM for mass changes, XPS for surface elemental analysis, and AFM and SEM for morphology. Chemical analyses are performed to determine the amount and the graft density of the attached GAGs. For example, heparin is analyzed by a colorimetric assay using toluidine blue and HCl/NaCl.

The outcome of SAM formation and attachment is sensitive not only to the chemical composition of the surface but also its nanoscale structure. The ratio of PHPA to the non-photoactive component controls the percentage of the functional group on the surface as well as its distribution. The topography of the surface also can be manipulated to show its effects on attachment. The spacer length for both the PHPA-disulfide and the non-photoactive thiol also can be varied, and the effect studied. Varying these parameters can determine the orientation of the attached molecules, which is difficult to control using the standard photoimmobilization procedure. Larger molecules, especially biomolecules, can be oriented potentially through structural features depending on the chemistry and architecture of the surface. By measuring the activities of attached biomolecules, for example, the orientation of the molecules can be determined. The ability to control the orientation of attached molecules is both important to fundamental immobilization or attachment chemistry and valuable in many practical applications.

Besides the thiol/gold system, SAMs based on silanes/silicon oxide also can be used. An advantage of this system is the availability of a large family of functionalized precursors.

Silanes with end-groups that are polar, non-polar, hydrogen-bond donor/acceptor, or ionic, as well as varied spacers can be purchased from commercial sources. When used together with PHPA-silane, these other silane compounds create surfaces with various chemical, physical, and topographic features which can be used to mediate the adsorption of the molecules to be attached. Varying the conditions and parameters can result in attachment with controlled properties.

The specific organization of polymer chains and their assembly and contribution to the film properties are important in practical applications where the outcome is directly linked to the interactions and entanglement of the tethered polymers with their surrounding media. For example, when poly(ethylene glycol) is used as a biocompatible coating, its effectiveness in preventing protein adhesion is largely governed by the density and conformation of attached polymer chains.

The conformation of polymer chains adsorbed on the substrate can be controlled through their interfacial interactions with the substrate. The conformation of molecules can be selected during the initial physical adsorption process. Subsequent covalent bond formation by the surface azido groups fixes the configuration, resulting in attached molecules with a defined conformation.

Polymers can adsorb spontaneously from solution onto surfaces if the interaction between the polymer and the surface is more favorable than that of the solvent with the surface. The polymer conformation changes upon adsorption due to the large number of internal degrees of freedom. The widely accepted model describes an adsorbed polymer chain consisting of three types of sub-chains: train, loop, and tail (FIG. 12). The conformation of the adsorbed polymer varies with external conditions. For example, at low solution concentrations, the chains in contact with the substrate tend to spread out, having a pancake conformation (FIG. 13a). At higher concentrations, the chains compete for spaces leading to shorter trains and longer tails extending into the solutions (FIG. 13b). A special case is the brush-like structure where the large repulsion among the chains results in nearly fully extended chains and thus high packing density (FIG. 13c).

PEG and high-molecular-weight PEO can be covalently attached to silicon oxide by casting the PEG or PEO on PHPA-functionalized surfaces, such as by spin-coating or spray-coating, followed by exposure to a reaction energy source as disclosed herein. The conformation of the polymer can be selected by the type of solvent, the substrate surface chemistry and architectures, as further described below. Physisorption followed by covalent bond formation by the surface azido groups fixes the configuration, resulting in attached molecules with a defined conformation. PEG/PEO films with conformations ranging from low density to highly packed brush structures can be prepared.

Films of low graft density are obtained by using low concentrations of polymers, low density of surface azido groups for attachment, or good solvents where the polymer chains can adopt a highly hydrated, extended coil conformation. Of special interest are polymer chains tethered through multiple attachment points, thus creating multiple loops. Because of the interpenetration ability of the loop structures, these structures are expected to have unique friction and adsorption properties. Photo-attachment chemistry is readily suited for creating multiple loop structures through the covalent attachment of train segments by the surface azido groups (FIG. 14). Because the attachment chemistry (insertion or addition into C—H, N—H, O—H, and C—C bonds (single, double and triple)) is non-selective, it is applicable to any polymer, thus making this technique general and versatile. The train density can be controlled through surface-induced interfacial interactions.

Polymer brushes, such as PEG/PEO brushes, can be prepared using "cloud point" (CP) conditions. CP conditions are those under which a solution of PEG/PEO in a solvent begins to separate into two phases, and the PEG/PEO is no longer completely soluble or miscible in the solvent. CP conditions can be achieved by increasing the temperature and/or salt concentration of the solution. Under CP conditions, the PEG chain is poorly solvated and its radius of gyration ($R_g$) and hydrodynamic volume are greatly reduced. Also reduced are chain repulsion and interchain distance. Grafting under CP conditions produces surface-bound PEG chains with increased packing density. When such coating is then treated under non-CP conditions, the attached PEG chains try to establish salvation. Because they are constrained by neighboring molecules, the chains therefore stretch and form elongated brush structures.

The graft density can be further increased by increasing the chain length, i.e., the molecular weight of the polymer. However, attaching high-molecular-weight PEO, e.g., PEO with a molecular weight greater than about 20,000, is difficult by conventional end grafting methods due to the low concentration of a single end functional group and the high probability of the end group being buried in the large polymer coil. On the contrary, the disclosed chemistry is well-suited for high-molecular-weight PEO.

The brush conformation exists in many other situations as well. One system particularly suitable for creating a brush conformation with the disclosed chemistry is diblock copolymers made of two distinct blocks. The first block is insoluble. It is attracted to the substrate and acts as an "anchor" fixing the entire polymer chain to the surface. The other block is soluble, forming the brush layer (FIG. 15). PEO brushes are created by adsorbing an aqueous solution of poly(styrene-co-ethylene oxide) diblock copolymer onto a hydrophobic surface that has been functionalized with a PHPA. The PS block is insoluble in water and is attracted to the substrate, functioning as an anchor, whereas the soluble PEO block extends from the surface. As the surface density of the polymer increases and the area per polymer decreases, the PEO block extends away from the surface and forms a quasi polymer brush. Subsequent photoactivation of the PHPA bonds the PS block to the substrate and fixes the PEO brush conformation. The density of the brush can be enhanced by shortening the PS block and increasing the chain length of the PEO block.

In some embodiments, contact lens surfaces are modified with polymer brushes to make the contact lens surface more hydrophilic and increase the wettability and lubrication of the contact lens. For example, a siloxane-based contact lens is functionalized with a PHPA-silane. A diblock copolymer can be attached to the PHPA-functionalized contact lens surface. Alternatively, a monomer can be attached to the PHPA-functionalized contact lens surface and then polymerized in situ.

Surface engineering strategies also can be adapted to create functional surfaces that influence the adsorption behavior of the polymer. It is known that both physical and chemical disorders on the surface can enhance the adsorption ability of the substrate and drastically affect the size of the adsorbed polymers. Recent theoretical studies concluded that the characteristic size of the surface inhomogeneity relative to the radius of gyration of the polymer is important for polymer adsorption, and that by changing the ratio of the two one can efficiently tailor the adsorption behavior of polymers onto non-uniform surfaces. (Chervanyov, A. I. et al., *J. Chem. Phys.*, 2006, 125:084703.) Thus, surface engineering strategies can be used to create customized surface features and vary various aspects of interfacial polymer dynamics for conformation and density controls.

Protein adsorption studies of these created surfaces follow the standard literature procedures. Adhesive proteins of various sizes, bovine serum albumin (16 kD), bovine plasma fibrinogen (67 kD), and horse heart myoglobin (340 kD), can be used and the amount of protein adsorbed can be quantified by x-ray photoelectron spectroscopy (XPS). ToF-SIMS and principal component analysis (PCA) can be employed to study protein conformation changes on these surfaces. Additional tools such as ellipsometry and QCM also can be used to characterize these systems.

IV. Examples

The following examples are provided to further illustrate certain features described above and are not meant to limit the disclosed methods to the particular embodiments disclosed.

Example 1

Synthesis of Silica Nanoparticles, Preparation of Azide-Functionalized Silica Nanoparticles and Attachment of Polymer Materials and Methods:
3-Aminopropyltrimethoxysilane, United Chemical Technologies (Bristol, Pa.), methylpentafluoro benzoate (Aldrich, 99%), sodium azide (99% Aldrich), and dicyclohexylcarbodiimide (Aldrich, 99%) were used to synthesize PFPA-silane. N-octadecyltrimethoxy-silane was purchased from Gelest (Morrisville, Pa.). Ethanol (200 proof, Aaper), tetraethyl orthosilicate (99%, Aldrich) and ammonium hydroxide (30% J. T. Baker) were used in the synthesis of silica particles. Polystyrene (PS) average $M_w$ 280 000, poly(2-ethyl-2-oxazoline) (PEOX) average $M_w$ 500 000, 200 000, and 50 000, and poly(4-vinyl pyridine) (P4VP) average $M_w$ 160 000 were purchased from Aldrich. $CHCl_3$ and $CH_2Cl_2$ were purchased from Fischer. Deuterochloroform used in NMR analysis was purchased from Cambridge Isotope Labs (Andover, Mass.). UV glass filters were purchased from Schott Glass Technologies Inc. (Fullerton, Calif.). All chemicals were used as received.

Photochemical reactions were performed with a medium-pressure Hg lamp (5 mW/cm², Hanovia). IR spectra were taken using a Perkin-Elmer Spectrum RX I model 1600. ¹H-NMR was performed on a Nicolet NT-500 MHz FT-NMR. SEM analysis was performed on an FEI Siron XL30 SEM. TGA analysis was done on a Polymer Technology thermogravimetric analyzer. Elemental analysis was performed by Quantitative Technologies Inc. (City, N.J.)

Synthesis of Silica Nanoparticles
Silica nanoparticles were synthesized via the Stober procedure (Stober, W. et al., *J. Colloid Interface Sci.*, 1968, pp. 62-69, incorporated by reference):

The Stober Reaction

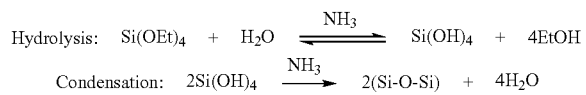

The Stober procedure is suitable for synthesizing silica nanoparticles ranging in diameter from about 10 nm to several hundred nanometers. Known recipes were used to grow monodisperse nanoparticles with a diameter of about 95 nm. (Cosa, C. A. R. et al., *J. Phys. Chem. B.*, 2003, 107:4747-4755, incorporated by reference.) The reaction was allowed to proceed at room temperature for at least eight hours with vigorous stirring.

Preparation of Azide-Functionalized Silica Nanoparticles
PFPA-silane was synthesized using a published procedure, as illustrated below (Keana J. F. W. et al., *J. Org. Chem.*, 1990 55:3640-3647, incorporated by reference):

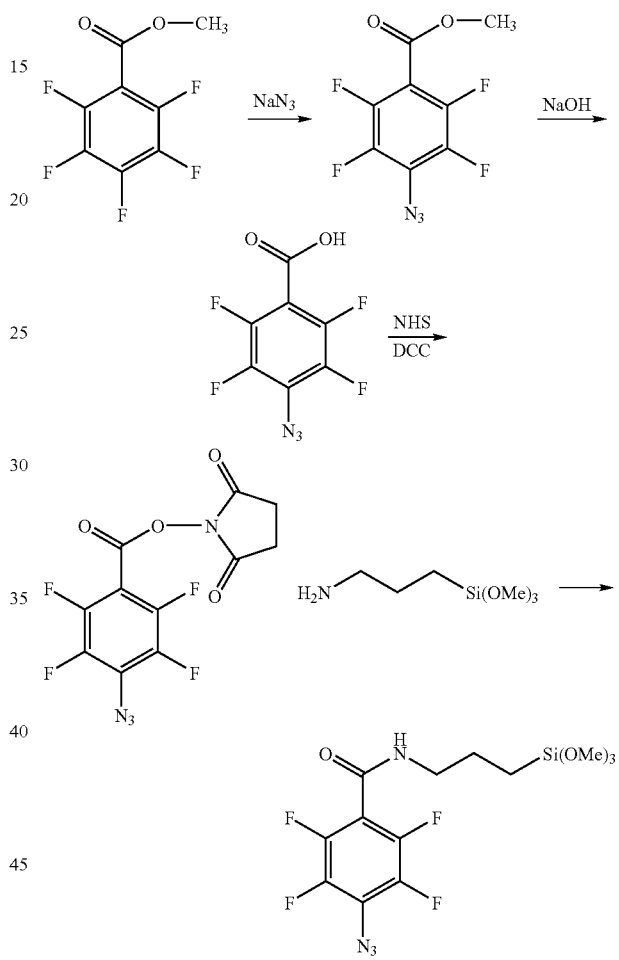

A three-fold excess of PFPA-silane, (110.0 mg, 0.277 mmol) was added directly to the Stober solution and allowed to react overnight. A control was performed using octadecyl trimethoxysilane (104.0 mg, 0.277 mmol). The amounts were calculated by estimating the total surface area of the nanoparticles, assuming all of the tetraethyl orthosilicate (TEOS) reacts, and assuming that the area each silane molecule occupies on the surface of the nanoparticle was around 0.6 nm². (Waddell, T. G. et al., *J. Am. Chem. Soc.*, 1981, 103:5303.) The solution then was refluxed with stirring, for one hour at 78° C. to facilitate covalent bonding of the silane to the silica. (van Blaaderen, A. and Vrij, A., *J. Colloid Interface Sci.*, 1993, 156:1; Westcott, S. L. et al., *Langmuir*, 1998, 14:5396-5401.)

Attachment of Polymer
Reaction steps were performed with adequate ventilation. The functional colloidal silica was rinsed five times: Approximately 9.0 ml of functionalized colloidal silica was centrifuged at 10,000 rpm for 10 minutes and the supernatant was discarded. The rinsed particles were dispersed in EtOH for the first three rinses and CHCl$_3$ for the last two rinses. The solution was centrifuged again, and the supernatant was discarded. The particles were dispersed into about 5 ml of CHCl$_3$.

About 1.0 g, 0.5 g, or 0.25 g of PEOX, PS, or P4VP was combined with the particle solution, while stirring, until the polymer was completely dissolved, resulting in a solution with a polymer concentration of about 200, 100, or 50 mg/ml. A 280-nm optical filter was placed over the solution, and the mixture was irradiated for 10 min with a medium pressure Hg lamp with an intensity of 5 mW/cm$^2$ while stirring was continued.

With higher polymer concentrations, the mixture subsequently was diluted to about 10 ml with CHCl$_3$ to lower the viscosity of the solution and facilitate the centrifugation of particles out of solution. Unattached polymer was removed from the diluted solution by centrifuging the particles, removing the supernatant, and dispersing the particles in CHCl$_3$. This series of steps was performed five times.

Characterization

The IR spectrum of functionalized nanoparticles showed an absorption peak at 2126 cm$^{-1}$, indicating the presence of the azido groups. Elemental analysis of the nanoparticles before and after surface functionalization is shown in Table 1.

TABLE 1

Elemental analysis data for PFPA functionalized particles.

| Sample | % N | % F | F:N |
|---|---|---|---|
| Azide functionalized SiO$_2$ | 0.38 | 0.51 | 1.01 |

Elemental percentages shown in Table 1 are percent by weight. The PFPA-functionalized nanoparticles contained 0.51% F, in good agreement with the theoretically predicted value of 0.59% F. The theoretical value was calculated assuming that the silane reacted with all of the available surface silanol groups (—OH) on the particle, each silane molecule occupied 0.6 nm$^2$, and the nanoparticle was 100 nm in diameter. The F to N ratio was found to be 1.01 for the functionalized nanoparticles (Table 1), which is in agreement with the structure of PFPA-silane, further indicating the presence of PFPA-silane at the surface of the silica nanoparticles.

Figure 16:
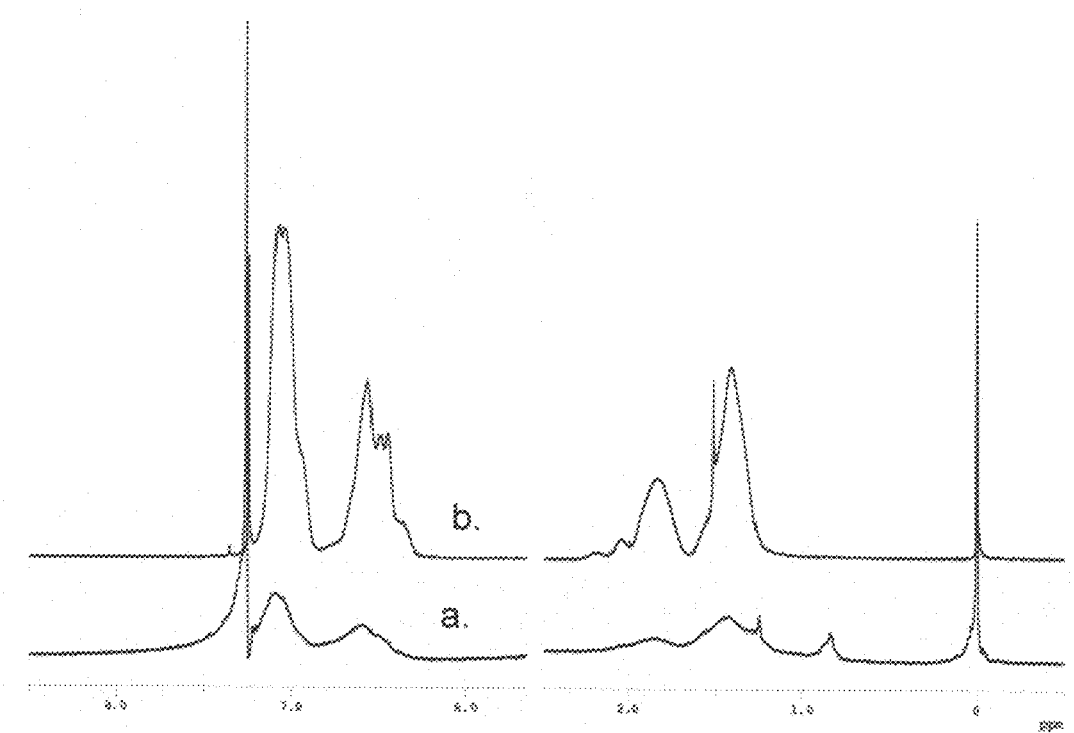
FIG. 16 is $^1$H NMR spectra of polystyrene-coated silica (a) and polystyrene (b).
Figure 17:
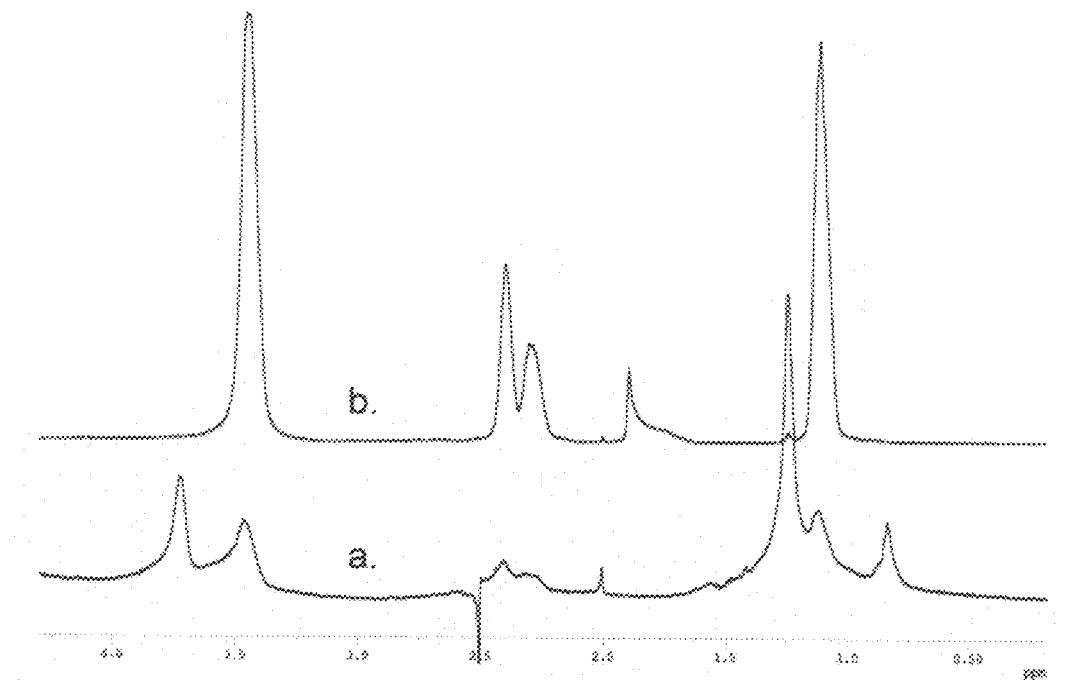
FIG. 17 is $^1$H NMR spectra of poly(2-ethyl-2-oxazoline)-coated silica (a) and poly(2-ethyl-2-oxazoline) (b).

The presence of the attached polymers was confirmed by $^1$H NMR. The polymer-coated nanoparticles were dried in an oven at about 75° C. overnight. Approximately 10.0 mg of dried particles was added to about 0.5 ml of CDCl$_3$. Particles were dispersed by sonication. Samples were scanned 64 times. The spectra of nanoparticles coated with polystyrene (FIG. 16 spectrum a) or poly(2-ethyl-2-oxazoline) (FIG. 17, spectrum a) were compared to that of the unattached polymer (FIG. 16, spectrum b, and FIG. 17, spectrum b). In each case, the peak appearance, and shifts, gave good agreement with the spectrum of the polymer itself. Similar results were also observed with poly(4-vinyl pyridine) (spectra not shown).

To establish that the polymer was covalently bonded to the surface of the silica nanoparticles rather than just physisorbed, several control experiments were carried out. Silica nanoparticles were functionalized with octadecyltrimethoxysilane (ODTMS) as described above. The resulting samples were subjected to the same coating procedure as PFPA-coated nanoparticles using PS, PEOX, or P4VP. In all cases, the $^1$HNMR spectra of the resulting samples did not contain peaks in common with the respective polymers.

Figure 18:
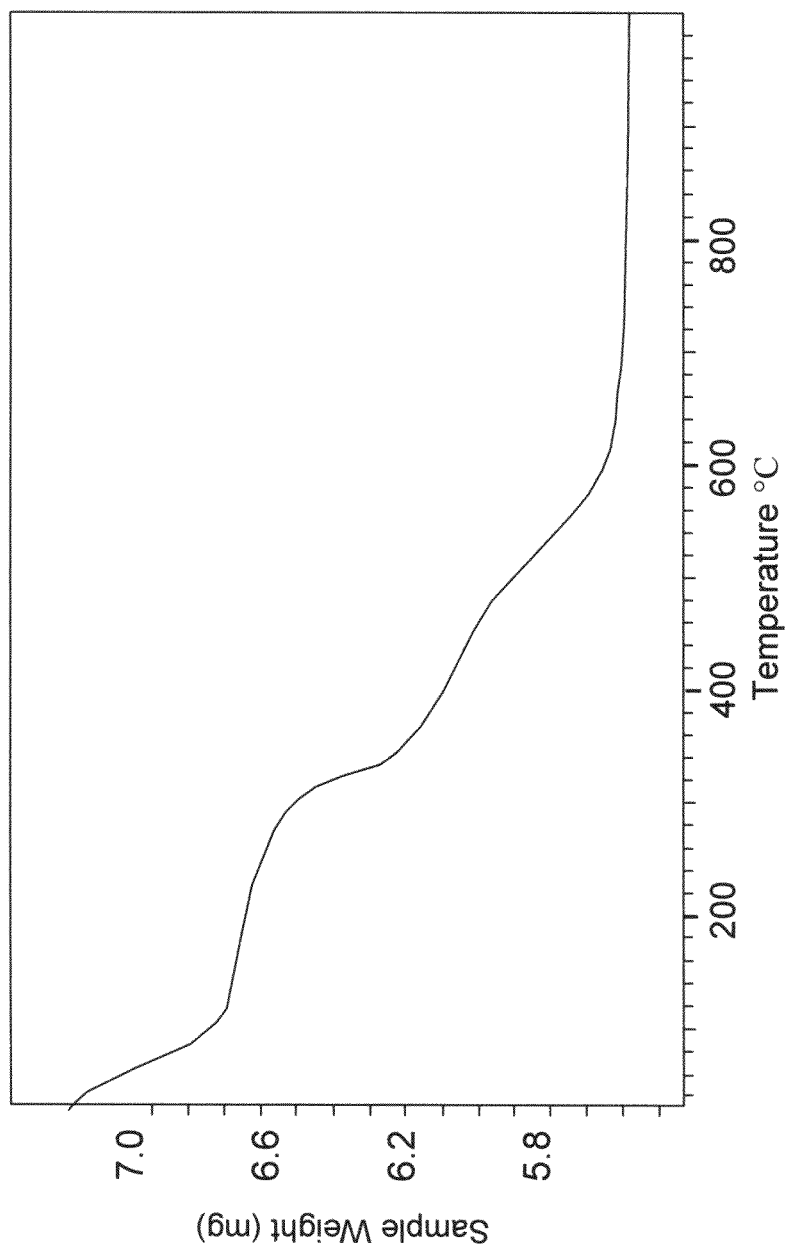
FIG. 18 is a thermal gravity analysis graph of sample weight versus temperature for polymer-coated silica nanoparticles.

The amount of polymers grafted on the nanoparticles (grafting density) was determined by thermal gravity analysis (TGA). Coated nanoparticles were prepared by centrifugation and removal of the supernatant, followed by drying for several days in an oven at about 80° C. During TGA, the polymer is effectively burned away as the temperature is increased from about 25° C. to about 980° C., leaving behind only the silica. FIG. 18 is a typical TGA graph showing the weight loss of the nanoparticles when heated. The grafting density was calculated using the following equation:

$$\text{Grafting density} = \frac{(\Delta Wt - 0.1 Wt_f) * d * r_{np} * 10^{10}}{3 * Wt_f * M_w}$$

$\Delta$Wt is the change in sample weight upon heating from 120-940° C., Wt$_f$ is the weight of nanoparticles at 940° C., 0.1 Wt$_f$ is the correction for the weight of PFPA-silane, d is the density of the nanoparticle, assumed to be 2.0 g/cm$^3$, r is the radius of the nanoparticle in cm, and M$_w$ is the molecular weight of the polymer.

The theoretical maximum grafting density was determined by calculating the approximate radius of gyration of the dissolved polymer molecule in solution. This radius was used to calculate the area that each polymer coil would occupy were it attached to the surface of the nanoparticle. This area was divided into the total surface area of the nanoparticle with radius=46.5 nm, as determined by SEM, to get the total number of polymer coils that would fit onto the nanoparticle surface.

Figure 19:
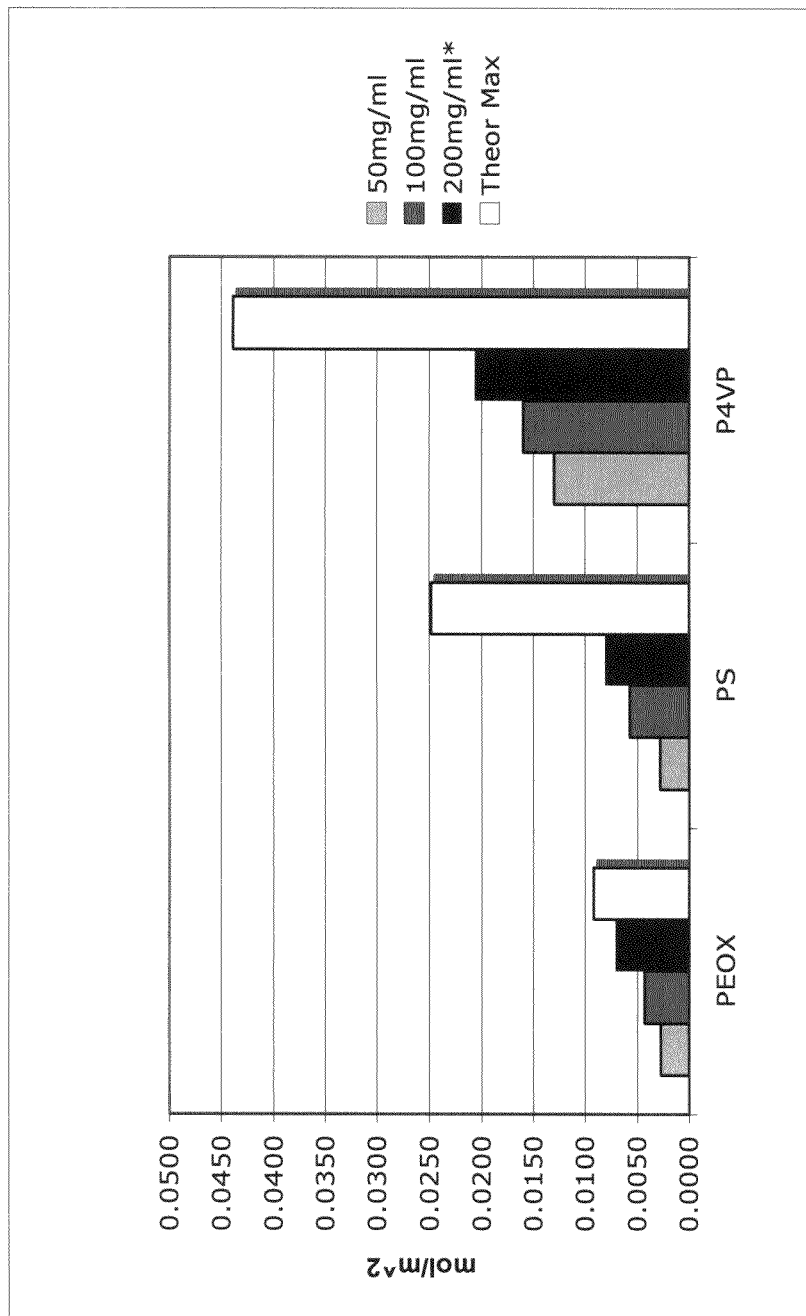
FIG. 19 is a graph of grafting density versus concentration of poly(2-ethyl-2-oxazoline) (PEOX), polystyrene (PS), and poly(4-vinylpyridine) (P4VP), which illustrates increased grafting density with increased concentration.

The results of these experiments show that the grafting density increased with increasing polymer concentration. (FIG. 19.) It is also apparent that PEOX is in best agreement with the theoretical maximum grafting density, followed by P4VP and lastly PS. The latter two polymers may deviate from the predicted maximum because the R$_g$ calculation assumes that the polymer adopts a spherical coil conformation when it is dissolved in solvent. However, it may take a different shape. It is also possible there is a change in conformation when the polymer contacts the nanoparticle surface that results in the coil taking up more space than the approximation assumes.

Figure 20:
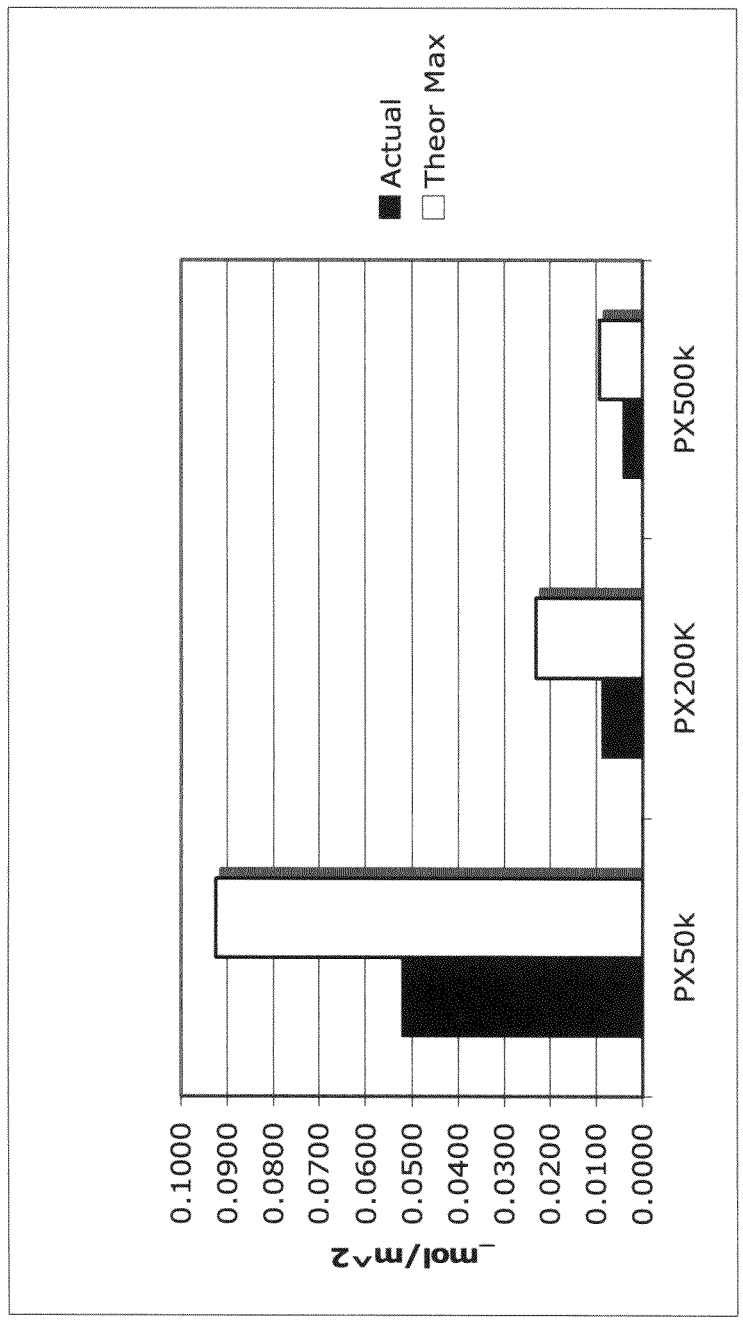
FIG. 20 is a graph of grafting density versus molecular weight of PEOX, which illustrates decreased grafting density with increased molecular weight.

To demonstrate the effect of molecular weight on the grafting density, PEOX at three different molecular weights (50,000, 200,000, and 500,000) was attached. (FIG. 20) There was good agreement with the predicted maximum grafting densities. The results suggest that the grafting density can be varied by choosing different molecular weight polymers.

Example 2

Synthesis of PFPA-Disulfide, Synthesis of PFPA-Derivatized Carbohydrates, and Preparation of Carbohydrate-Coated, Gold-Plated Quartz Crystals Materials and Methods:

Commercially available starting materials were purchased from Aldrich, Fluka, Lancaster, and Senn Chemicals. Concanavalin A (Con A), *Ulex europaeus* agglutinin-I (UEA) and *Pisum sativum* agglutinin (PSA) were purchased from Sigma. *Viscum album* agglutinin (VAA) was purified according to published protocols. (Ziska, P. et al., *Cellular and Molecular Life Sciences*, 1978, 34:123-124.)

Reactions were carried out with anhydrous solvents under a nitrogen atmosphere where appropriate. Chemical reactions were monitored with thin-layer chromatography using pre-coated silica gel 60 (0.25 mm thickness) plates (Macherey-Nagel). Flash column chromatography was performed on silica gel 60 (SDS 0.040-0.063 mm). Optical rotations were measured with a Perkin-Elmer 343 polarimeter at the sodium D line at ambient temperature. $^1$H and $^{13}$C spectra were recorded with a Bruker Avance 400 instrument or a Bruker DMX 500 instrument at 298K in CDCl$_3$ or D$_2$O, using the residual signals from CHCl$_3$ ($^1$H-NMR: δ=7.25 ppm; $^{13}$C-NMR: δ=77.0 ppm), and from H$_2$O ($^1$H-NMR: δ=4.70 ppm) as internal standards. $^1$H peak assignments were made by first order analysis of the spectra, supported by standard $^1$H-$^1$H correlation spectroscopy (COSY). Elemental analyses were performed by Analytische Laboratorien, Lindlar, Germany. High resolution molecular spectroscopy (HRMS) was carried out by Instrumentstationen, Kemicentrum, Lund University, Sweden. Quartz crystal microbalance experiments were performed using Attana 100 instrumentation (Attana AB, Stockholm, Sweden).

Protein binding was monitored by frequency logging with Attester 1.1 (Attana) and recorded as the resulting frequency shifts (Δf). The fabricated crystals were mounted in the flow-through QCM system, and equilibrated with buffer solution (10 mM PBS, pH 7.4) prior to manipulations/measurements. Blocking of the surfaces was performed by injection of bovine serum albumin (BSA) (10 mg/ml in PBS) until a stable frequency baseline was obtained (Δf=0). A continuous flow of running buffer (PBS 10 mM, pH 7.4, 50 μL/min) was used throughout, and all test samples were prepared in the same buffer (injection volume: 50 μL). Bound lectins were released from the surfaces between measurements by two successive injections of low pH buffer (PBS 10 mM, pH 1.5).

Synthesis of PFPA-Disulfide

Synthesis of PFPA-disulfide 3 was performed according to the following strategy. Treatment of PFPA 1 with 2 gave product 3 in one step (Scheme 12).

SCHEME 12[a]

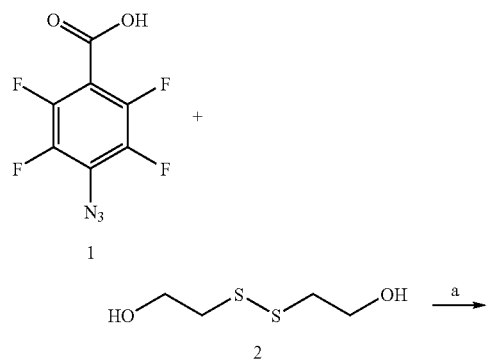

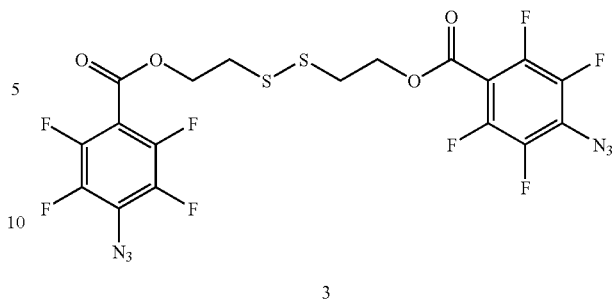

[a] Reagents and conditions: (a) DMAP, DCC, CH$_2$Cl$_2$, 0° C.-rt, dark, 12 h, 40%.

4-Azido-2,3,5,6-tetrafluorobenzoic acid[4] (1) (1.00 g, 4.3 mmol) was dissolved in CH$_2$Cl$_2$ (20 mL) at 0° C. 2,2'-Dithiodiethanol (2) (0.33 g, 2.1 mmol), N,N'-dimethylaminopyridine (DMAP, 0.05 g, 0.43 mmol), and 1,3-dicyclohexylcarbodiimide (DCC, 0.95 g, 4.6 mmol) were added to the solution, and the reaction was allowed to warm to room temperature and stirred for 12 hours. After removal of the precipitated dicyclohexylurea by filtration, the reaction mixture was recovered by extraction with CH$_2$Cl$_2$. The organic layer was washed with water, brine, dried over Na$_2$SO$_4$, and concentrated. Purification of the residue by flash column chromatography (hexane:ethyl acetate 6:1) afforded compound 3 in 40% yield (0.49 g). $^1$H-NMR (500 MHz, CDCl$_3$) δ 3.03 (4H, t, J=6.5 Hz, CH$_2$—S), 4.62 (4H, t, J=6.5 Hz, CH$_2$—OCO); $^{13}$C-NMR (125 MHz, CDCl$_3$) δ 37.2, 64.4, 107.7, 124.0, 139.6, 142.1, 144.6, 147.7, 159.6.

Synthesis of PFPA-Derivatized Carbohydrates

PFPA-derivatized carbohydrates 4, 5, and 6 were synthesized using the same synthetic route, as exemplified for fucose derivative 6 (Scheme 13). The fucose derivative 6a was obtained by treatment of tetra-O-acetate-α-L-fucose with 2-[2-(2-chloro-ethoxy)-ethoxy]-ethanol under Lewis acid activation (BF$_3$.Et$_2$O). The resulting 6a was subsequently converted to compound 6b by nucleophilic substitution with azide. Hydrogenation of 6b using Pd/C under hydrogen atmosphere, followed by treatment with compound 3 using 1-ethyl-3-(3-dimethylaminopropyl)carbodiimide (EDCI) and triethylamine as catalyst gave 6c. Compound 6 was then obtained after deprotection under basic conditions.

SCHEME 13[a]

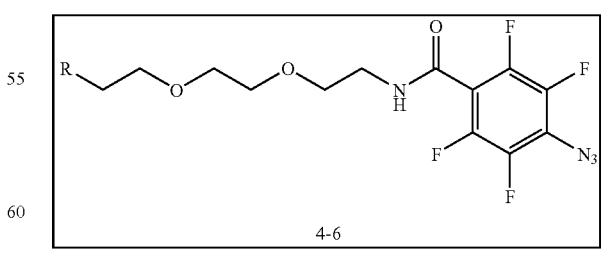

4-6

-continued

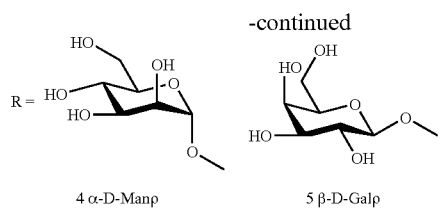

4 α-D-Manp    5 β-D-Galp

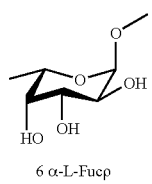

6 α-L-Fucp

[a] Reagents and conditions: (a) 2-[2-(2-chloro-ethoxy)-ethoxy]-ethanol, BF$_3$·Et$_2$O, CH$_2$Cl$_2$, 0° C.-rt, dark, 2 h; (b) NaN$_3$, DMF, 90° C., dark, 20 h, 25% for 2 steps; (c) i: Pd/C, acetic acid, H$_2$, MeOH, rt, 4 h, 95%; ii: 4-azido-2,3,5,6-tetrafluoro-benzoic acid, EDCI, triethylamine, CH$_2$Cl$_2$, 0° C.-rt, overnight, 33%; (d) NaOMe, MeOH, rt, 2 h, 64%.

Yield: 32%. $[\alpha]^{22}_D$ –75.0 (c 0.5, CHCl$_3$); $^1$H-NMR (500 MHz, CDCl$_3$) δ 1.03 (3H, d, J=6.6 Hz, H-6), 1.91, 1.99, 2.08 (9H, 3s, CH$_3$—CO), 3.53-3.60 (11H, m, CH$_2$—O), 3.65-3.75 (1H, m, CH$_2$—O), 4.11-4.18 (1H, m, H-5), 4.793-5.05 (2H, m, H-2, H-4), 5.20 (1H, d, J=1.2 Hz, H-1), 5.27 (1H, t, J=3.5 Hz, H-3) 6.90 (1H, br, NH); $^{13}$C-NMR (125 MHz, CDCl$_3$) δ 15.9, 20.7, 20.8, 20.9, 40.1, 64.4, 67.2, 68.0, 68.3, 69.5, 70.2, 70.6, 71.2, 96.3, 111.9, 122.1, 139.7, 141.4, 143.1, 145.1, 157.8, 170.1, 170.5, 170.6. Analysis calculated for C$_{25}$H$_{30}$F$_4$N$_4$O$_{11}$: C, 47.03%; H, 4.74%; N, 8.77%. Actual analysis: C, 46.87%; H, 4.85%; N, 8.64%.

Preparation of Carbohydrate-Derivatized Surfaces

Gold-plated 10 MHz quartz crystals (Attana) were initially immersed in a mixture of H$_2$O$_2$ (33%), NH$_3$ (33%) and distilled water (1/1/3 v/v/v) at 80° C. for 5 minutes to clean the surfaces. The resulting crystals were repeatedly rinsed with distilled water, and dried under a stream of nitrogen. The cleaned crystals were subsequently immersed in a solution of PFPA-disulfide 3 (14 mM in CH$_2$Cl$_2$) at room temperature in the dark overnight, rinsed 3-5 times with CH$_2$Cl$_2$ to remove excess compound 3, and dried under a stream of nitrogen.

The PFPA-activated crystals were immersed in a melt of poly(ethylene glycol) (PEG, M$_r$ 20,000) at 70° C., after which the temperature was increased to 140° C. for 20 minutes. The resulting PEG-coated crystals were removed from the melt, sonicated for 5 minutes in distilled water to remove unbound PEG, rinsed with water, and dried under a stream of nitrogen. The dried PEG-coated crystals were subsequently immersed in solutions of PFPA-derivatized carbohydrates (10 mM in ethanol) for 5 minutes. After drying under nitrogen, the crystals were irradiated with a medium pressure mercury UV-source (Hanovia) for 5 minutes. After UV irradiation, the crystals were rinsed 3-5 times with ethanol and dried under nitrogen.

Results and Characterization

Figure 21:
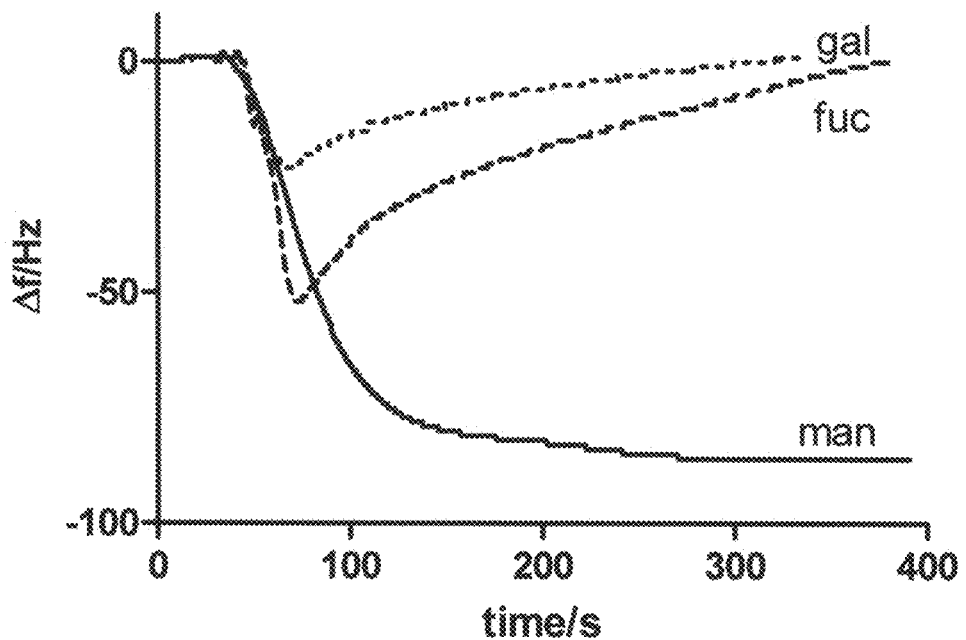
FIG. 21 is a graph of change in frequency versus time, comparing the binding of concanavalin A to carbohydrates coupled to a PEG-coated, gold-plated quartz crystal.

The protein binding to the carbohydrate-coated surfaces was evaluated for four different plant lectins: concanavalin A (Con A), Viscum album agglutinin (VAA), Ulex europaeus lectin I (UEA), and Pisum sativum agglutinin (PSA). FIG. 21 displays typical frequency-response graphs recorded for Con A-binding to the three different carbohydrate-derivatized surfaces. As can be seen, the α-D-mannopyranoside surface proved highly efficient in binding this lectin. On the other hand, the β-D-galactopyranoside- and the α-L-fucopyranoside-derivatized surfaces did not show any residual binding at 400 seconds. As shown, however, apparent transient binding to both surfaces could be seen, where especially the fucoside-surface showed temporary binding of the lectin of approximately 60% of the maximal binding to the mannoside surface. This suggests that the lectin can be weakly bound to these surfaces, but is easily washed away by the buffer flow over the surface.

Figure 22:
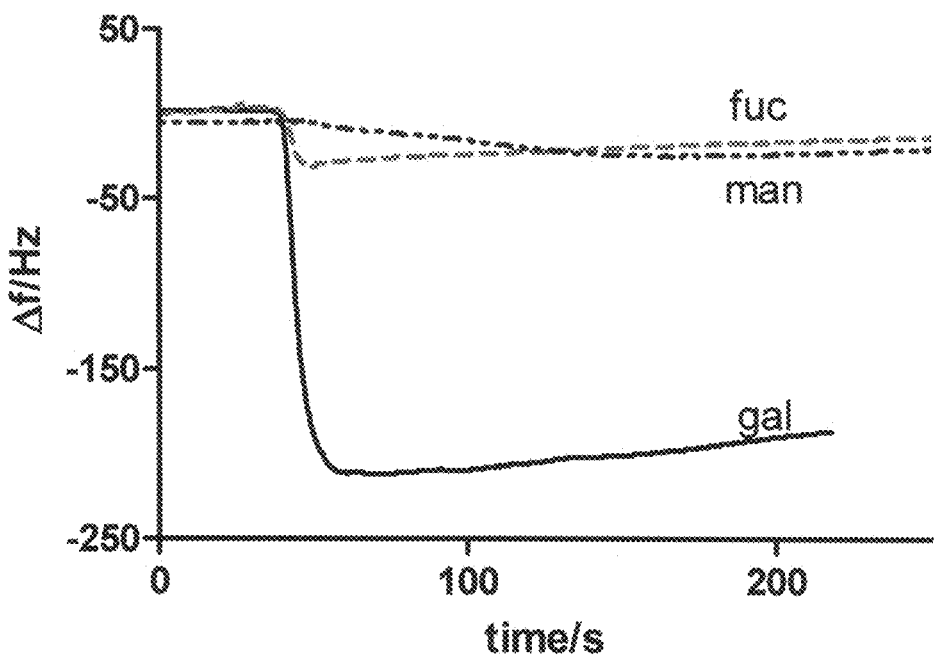
FIG. 22 is a graph of change in frequency versus time, comparing the binding of *Viscum album* agglutinin to carbohydrates coupled to a PEG-coated, gold-plated quartz crystal.

The mistletoe lectin (VAA) demonstrated a different behavior as shown in FIG. 22. This β-D-galactopyranoside-specific lectin showed efficient binding to the galactoside-derivatized surface as expected, and only very marginal binding to the mannoside- and fucoside-surfaces. However, the apparent binding strength of VAA to the galactoside surface proved slightly lower than for Con A to the mannoside surface, and slow release from the galactoside surface was recorded over time.

Figure 23:
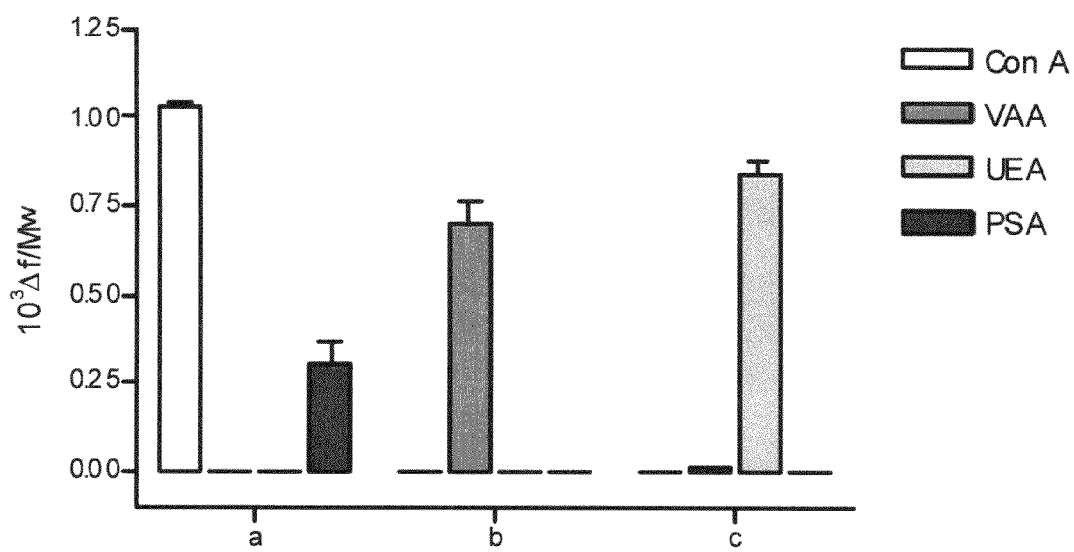
FIG. 23 is a graph of change in frequency versus various lectins, comparing the binding selectivity of lectins to carbohydrates coupled to a PEG-coated, gold-plated quartz crystal.

The binding results for the four different plant lectins to all three carbohydrate-expressing surfaces are shown in FIG. 23. The results follow the expected binding patterns for these lectins, where the mannoside-surface (a) was selective for PSA and Con A, the galactoside-surface (b) was selective for VAA, and the fucoside-surface (c) was selective for UEA. The binding performance for three of the lectins (VAA, Con A, and UEA) showed similar specific responses to the respective surfaces (Δf=0.7-1 mHz/M$_r$). On the other hand, PSA showed a lower specific response compared to Con A, indicating that PSA possesses lower binding capability to the mannoside surface, in accordance with literature data.

Figure 24:
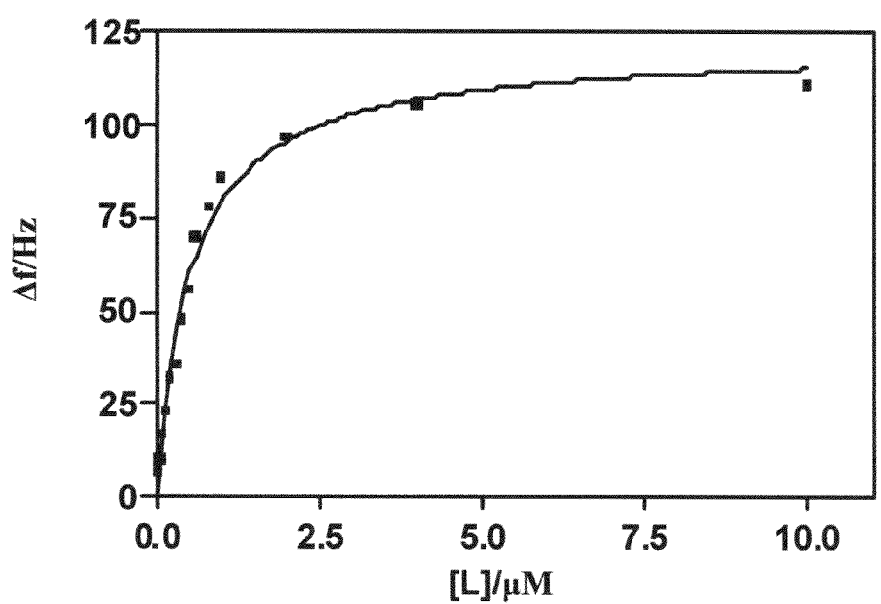
FIG. 24 is a graph of change in frequency versus concentration, which illustrates the saturation binding curve of concanavalin A to α-D-mannopyranoside coupled to a PEG-coated, gold-plated quartz crystal.

The binding characteristics of Con A to the mannose-expressing surface were subsequently evaluated by saturation analysis, where Con A samples ranging in concentration from 5 nM to 10 µM were injected over the mannose surface and the frequency differences resulting from the Con A binding recorded. The resulting saturation isotherm is displayed in FIG. 24, indicating that the surface is completely saturatable and following Langmuir-like isothermal behavior. The apparent dissociation constant was estimated at K$_D$=0.5 µM, a value well in accordance with reported literature values (0.1-1.1 µM).

Example 3

Synthesis of PFPA-Phosphate, and Preparation of Mannose-Coated Hematite Nanoparticles Materials and Methods:

Hematite nanoparticles were obtained from Dr. Hervé Dietsch and Professor Peter Schurtenberger, University of Fribourg, Switzerland.

Synthesis of Hematite

Fe(NO$_3$)$_3$·6H$_2$O (4.04 g, 0.01 mol) was dissolved in 250 mL of distilled water to which a solution of 1 M NaOH was added under stirring until the pH reached 10.5-10.8. The resulting brown precipitate (Fe(OH)$_3$) was washed with distilled water, and the supernatant liquid was decanted. The procedure was repeated 8-10 times, at which stage the pH was about 9.3. After the final rinse cycle 5 to 20 mL of 1.0 M HCl and 0.5 to 2.5 mL of 0.1 M NaH$_2$PO$_4$ solutions were added into about 200 mL of the dispersion, and the solution was diluted with distilled water to 500 mL. This final system was aged at 100±2° C. for 2 days in an air oven. The precipitate obtained by this procedure was repeatedly centrifuged and washed with distilled water to remove all extraneous ions. Finally, the purified solids were filtered, dried, and stored in a desiccator. The powder could be readily resuspended in aqueous solutions of desired pH in an ultrasonic bath. (*Journal of Colloid and Interface Science,* 1984, 102, 146-151.)

Synthesis of PFPA-Phosphate

PFPA-phosphate was synthesized according to the procedure shown below.

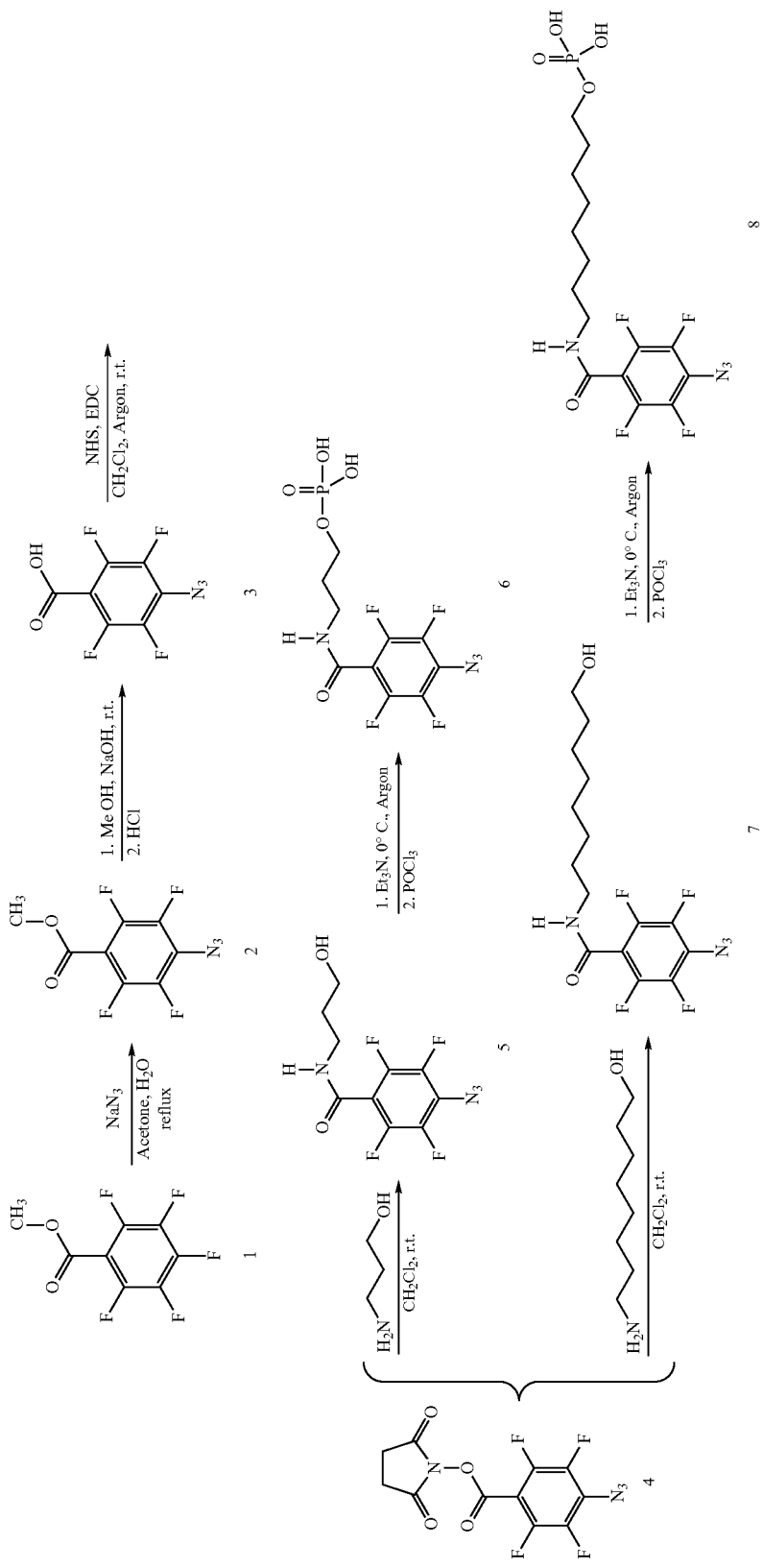

Methyl 4-azidotetrafluorobenzoate (2): A mixture of $NaN_3$ (0.6 g, 9.22 mmol) and methyl pentafluorobenzoate (1.76 g, 7.78 mmol) in acetone (16 mL) and water (6 mL) was refluxed for 8 hours. The mixture was cooled and then water (20 mL) was added, and the solution was extracted using diethyl ether (3×10 mL). The extracts were dried with $Na_2SO_4$ and the mixture was filtered. Solvent was evaporated to give 2 as a white power (1.67 g, yield=86%)

4-azidotetrafluorobenzoic acid (3): A solution of 2 (1.67 g, 6.7 mmol) with 10% (w/v) NaOH (4 mL) in MeOH (20 mL) was stirred overnight at room temperature. The solution was acidified by 2 M HCl in an ice bath to pH<1 and extracted with $CHCl_3$ (3×10 mL). The extracts were dried with $Na_2SO_4$, and the mixture was filtered. Solvent was evaporated to give 3 as a white solid (1.35 g, yield=85%)

N-succinimidyl 4-azidotetrafluorobenzoate (4): A mixture of 3 (1.35 g, 5.74 mmol) and EDAC (1-ethyl-3-(3-dimethylaminopropyl) carbodiimide hydrochloride, 1.10 g, 5.74 mmol) was added to 30 mL distilled $CH_2Cl_2$. This was the activation step. The solution was purged with argon for about 10-30 minutes, then NHS (0.66 g, 5.74 mmol) was added in a 1:1:1 molar ratio. The solution was purged with argon again for another 30 minutes. The container was covered with foil and stirred at room temperature for 4-6 hours. After stirring, the reaction solution was extracted with water (3×10 mL). The combined organic extracts were dried using $Na_2SO_4$. Solvent was evaporated to give 4 as a light yellow, highly viscous liquid. (1.80 g, yield=94%)

4-azidotetrafluoro-N-(3-hydroxypropyl)benzamide (5) and 4-azidotetrafluoro-N-(8-hydroxyoctyl)benzamide (7): 4 with 3-aminopropan-1-ol or 8-aminooctan-1-ol (in a 1:1 molar ratio) were added to 10 mL distilled $CH_2Cl_2$ and purged with argon for about 30 minutes. The solution was stirred at room temperature overnight. The reaction solution was extracted with $CHCl_3$ (3×10 mL). The product was then purified by column separation ($CHCl_3$:MeOH=10:1). Solvent was evaporated to give 5 or 7 as a white power.

$PFPA-PO_4$ compounds (6,3-(4-azidotetrafluorobenzamido)propyl dihydrogen phosphate and 8,8-(4-azidotetrafluorobenzamido)octyl dihydrogen phosphate): Compound 5 or 7 (0.7 mmole) was dissolved in 10 mL dry THF that was purged three times with argon. Anhydrous triethylamine (1 mmol) was added, and the mixture was the cooled to 0° C. with an ice bath. $POCl_3$ (0.08 mL) was added slowly, dropwise to the cooled solution. The reaction mixture was allowed to warm to room temperature as the ice melted and stirred overnight. When the reaction finished, 10 mL $H_2O$ was added for hydrolysis and allowed to react for 1 hour. The solution then was extracted with $CHCl_3$ (3×10 mL). The combined organic extracts were dried using $Na_2SO_4$. Solvent was evaporated to give 6 or 8 as a light amber, highly viscous, clear liquid.

$PFPA-PO_4$ NMR Data:

1H NMR (CDCl3) d: 1.3-1.5 (br, 8H), 1.61 (t, J=7.2 Hz, 2H), 1.77 (m, J=7.5 Hz, 2H), 3.45 (q, J=6.5 Hz, 2H), 3.53 (t, J=6.5 Hz, 2H), 5.95 (s, 1H). 13C NMR (CDCl3) d: 26.63, 26.74, 28.73, 29.00, 29.27, 32.55, 40.31, 45.12, 111.59, 121.84, 139.15, 141.81, 142.84, 145.36, 157.60.

Preparation of Carbohydrate-Coated Hematite Nanoparticles

A 1:1 mixture (by weight) of PFPA-phosphate and hematite nanoparticles was added to a flask, followed by addition of 5 ml of $CHCl_3$. The resulting mixture was sonicated for 30 minutes until the particles were well dispersed. Excess $PFPA-PO_4$ that was not attached to the surface of the hematite nanoparticles was removed by adding 2 ml of hexanes into the solution of particles followed by sonicating for 10 minutes. The mixture was then centrifuged at 8000-9000 rpm for 10 minutes, and the supernatant was discarded. The washing and centrifugation procedure was performed at least three times. After the final centrifugation, $Fe_2O_3$ nanoparticles functionalized with $PFPA-PO_4$ were collected.

The PFPA-functionalized hematite nanoparticles were mixed with a solution of 1 g/ml D-mannose in water, and the mixture was heated in the oven at 90° C. for 5 days. The mannose-hematite particles were then washed 5 times with water and ethanol. The precipitated mannose-hematite particles were stored in ethanol for further uses.

Characterization

Figure 25:
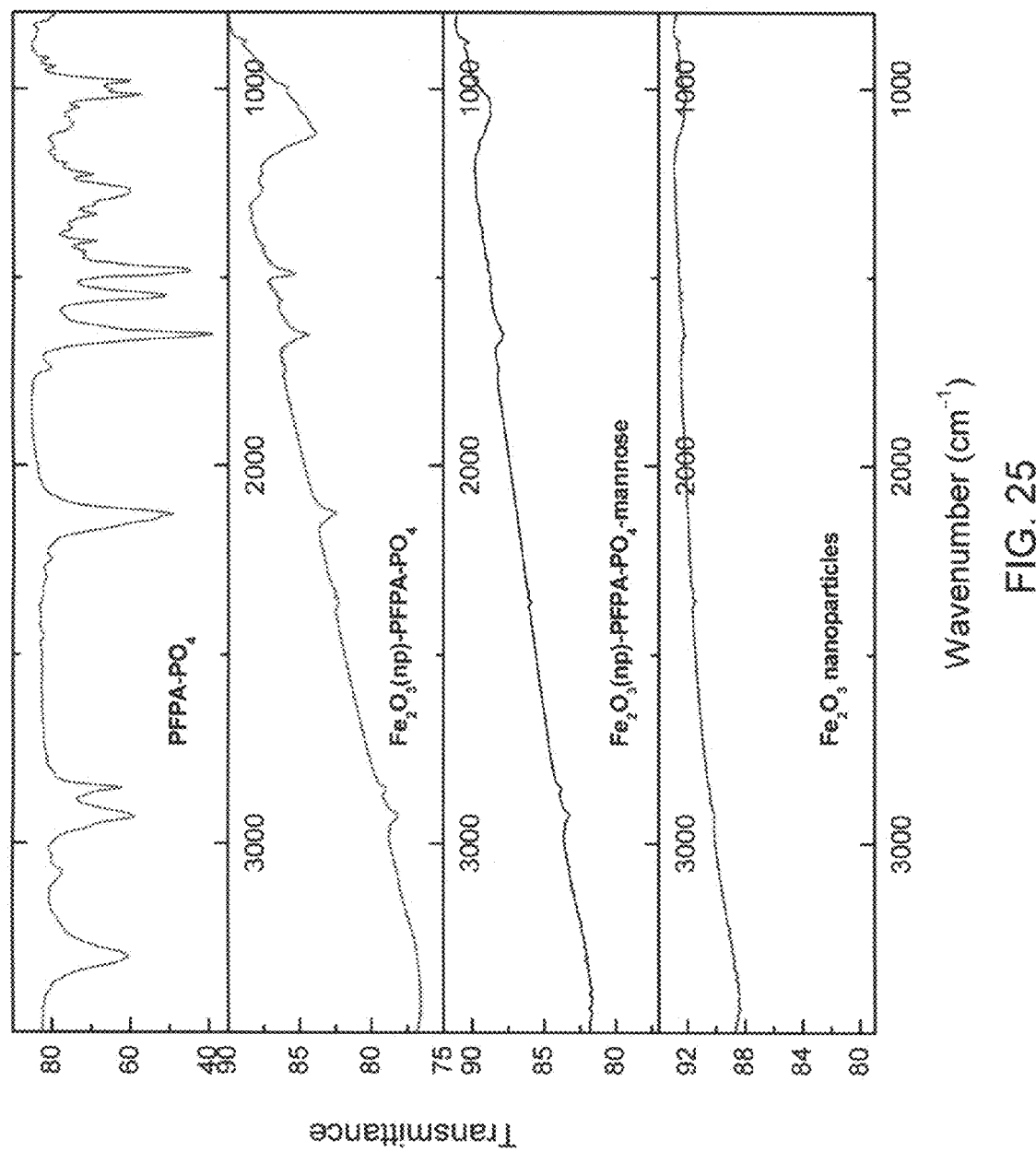
FIG. 25 is a series of IR spectra showing the functionalization of hematite nanoparticles with PFPA-phosphate.

FIG. 25 is a series of IR spectra showing the functionalization of hematite nanoparticles with PFPA-phosphate. The top $PFPA-PO_4$ spectrum shows absorption of the azide group at about 2100 $cm^{-1}$. The second spectrum is the $PFPA-PO_4$ functionalized hematite nanoparticles. The azide band is present, indicating the hematite nanoparticles have been successfully functionalized with the $PFPA-PO_4$. The third spectrum is mannose bound to the $PFPA-PO_4$ functionalized hematite nanoparticles. The disappearance of the azide band indicates that mannose is bound to the $PFPA-PO_4$. The final spectrum is the non-functionalized hematite nanoparticles and serves as a control to show that the azide group is not present on the non-functionalized hematite nanoparticles.

Figure 26:
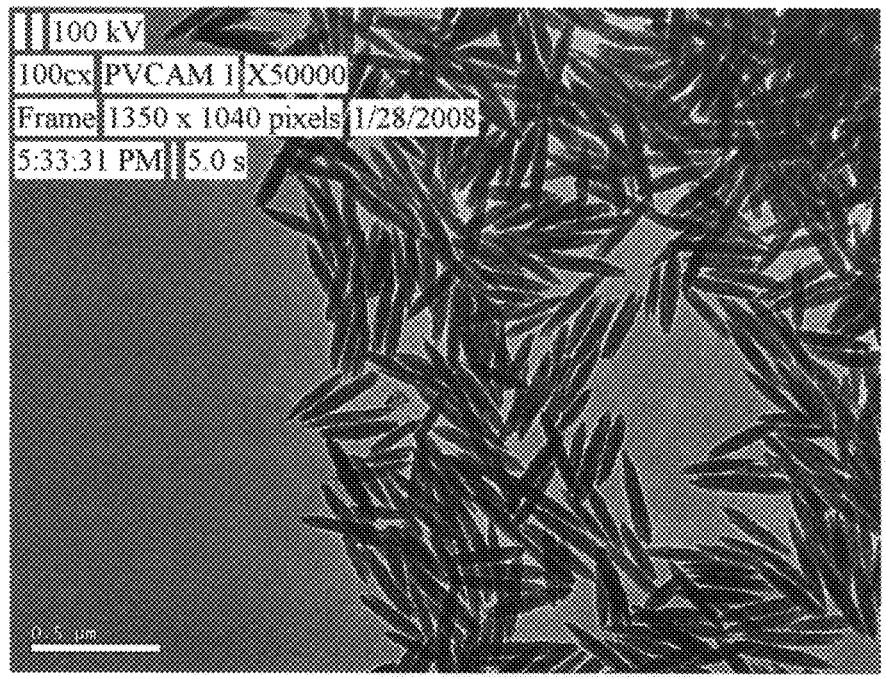
FIG. 26 is a TEM image of PFPA-hematite nanoparticles.
Figure 27:
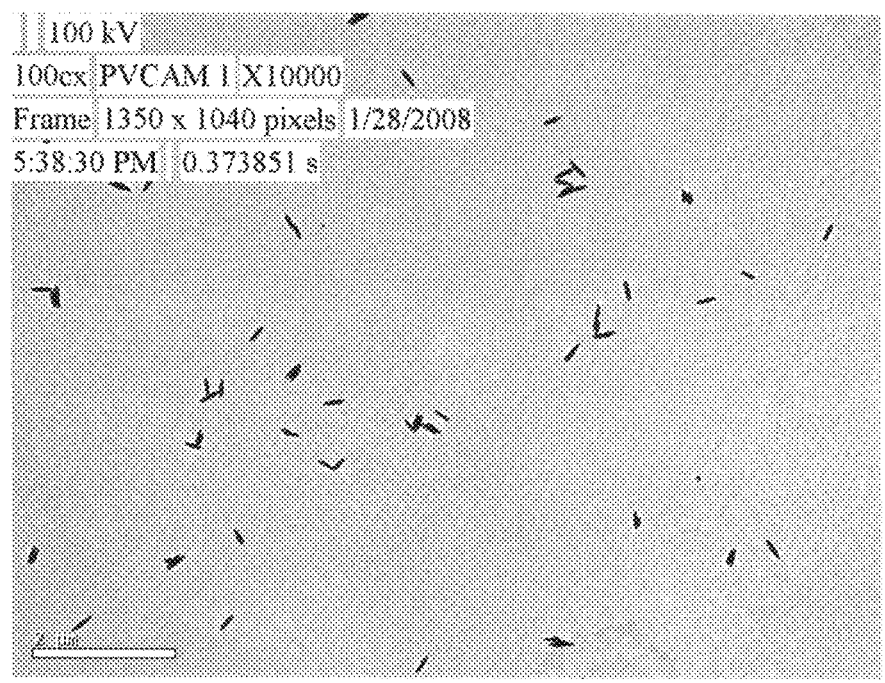
FIG. 27 is a TEM image of mannose-hematite nanoparticles.

FIG. 26 is a TEM image of PFPA-functionalized hematite nanoparticles. FIG. 27 is a TEM image of mannose-hematite nanoparticles.

Figure 28:
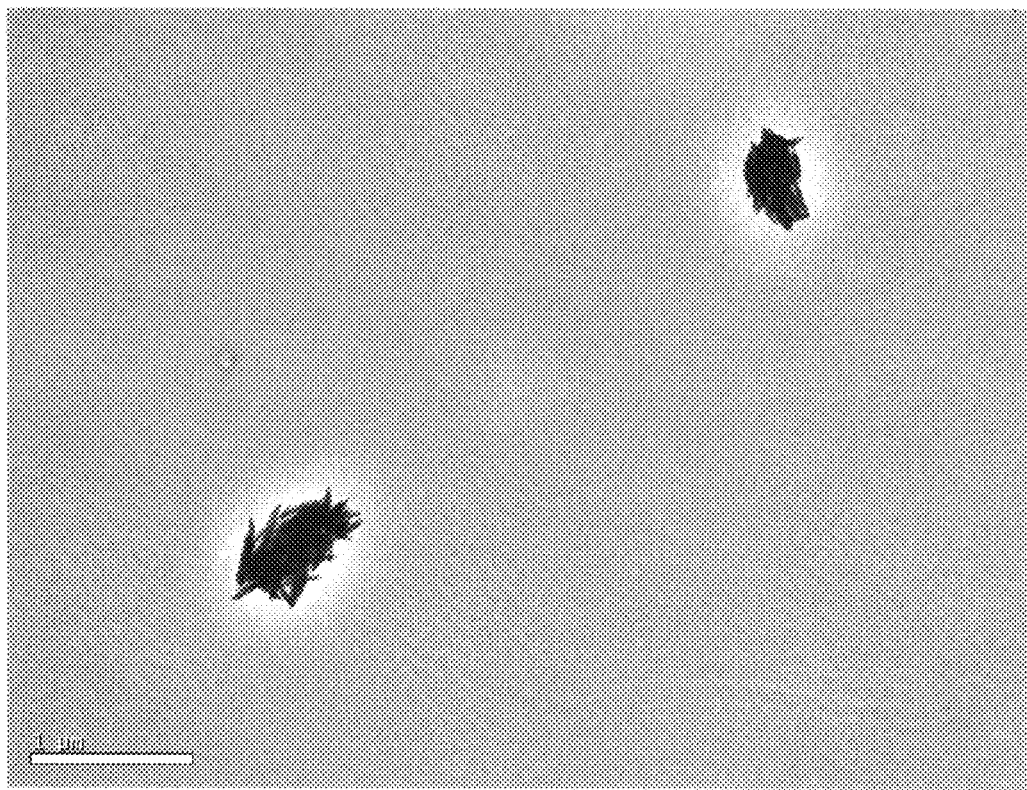
FIG. 28 is a TEM image of concanavalin A bound to mannose-hematite nanoparticles.

Mannose-hematite nanoparticles were incubated with a solution of PBA (pH=7.4) containing 0.1% Tween® 20 and 3% BSA (w/v) for about 30 minutes, and washed with PBS (pH=7.4) containing 0.1% Tween® 20 for about 20 minutes. The nanoparticles were then incubated with a solution of Con A (15 µg/ml) in PBS (pH=7.4) containing 0.1% Tween® 20 overnight at room temperature. The sample was washed thoroughly with the buffer solution followed by washing five times with deionized water. FIG. 28 is a TEM image of Con A bound to mannose-hematite nanoparticles.

Example 4

Synthesis of PFPA-Derivatized Carbohydrates and Preparation of Carbohydrate Microarrays on PEO-Coated Glass Slides Materials and Methods:

Commercially available starting materials for synthesis were purchased from Aldrich, Fluka, Lancaster, and Senn Chemicals; aminosilylated glass slides (UltraGAPS) were from Corning; Alexa Fluo 647-labeled lectins from *Griffonia simplicifolia* (GSII), peanut (PNA), jack bean (ConA), and soybean (SBA), were from Molecular Probes. All reactions were carried out with anhydrous solvents under a nitrogen atmosphere. Arrays were generated using a QArray microarrayer from Genetix Technologies, and scanned with a Scanarray 5000 from Agilent Technologies. Chemical reactions were monitored with thin-layer chromatography using precoated silica gel 60 (0.25 mm thickness) plates (Macherey-Nagel). Flash column chromatography was performed on silica gel 60 (SDS 0.040-0.063 mm). Optical rotations were measured with a Perkin-Elmer 343 polarimeter at the sodium D line at ambient temperature. $^1H$ and $^{13}C$ spectra were recorded with a Bruker Avance 400 instrument or a Bruker DMX 500 instrument at 298K in $CDCl_3$ or $D_2O$, using the residual signals from $CHCl_3$ ($^1H$: δ=7.25 ppm; $^{13}C$: δ=77.0 ppm), and from $H_2O$ ($^1H$: δ=4.70 ppm) as internal standard. $^1H$ peak assignments were made by first order analysis of the spectra, supported by standard $^1$H-$^1$H correlation spectroscopy (COSY). Elemental analyses were performed by Analytische Laboratorien, Lindlar, Germany. HRMS was carried out by Instrumentstationen, Kemicentrum, Lund University, Sweden.

Synthesis of PFPA-Derivatized Carbohydrates

A prototype library of PFPA-derivatized carbohydrates was synthesized. Nine different carbohydrate structures (compounds 1-9) were prepared, including the monosaccharides (α-D-mannose, β-D-glucose, β-D-galactose, N-acetyl-β-D-glucosamine, α-L-fucose, α-L-arabinose, β-D-xylose) and disaccharides (lactose, cellobiose.) In addition to the carbohydrates, the linker structure 10, which does not carry a carbohydrate head group, was coupled to PFPA and used as a reference.

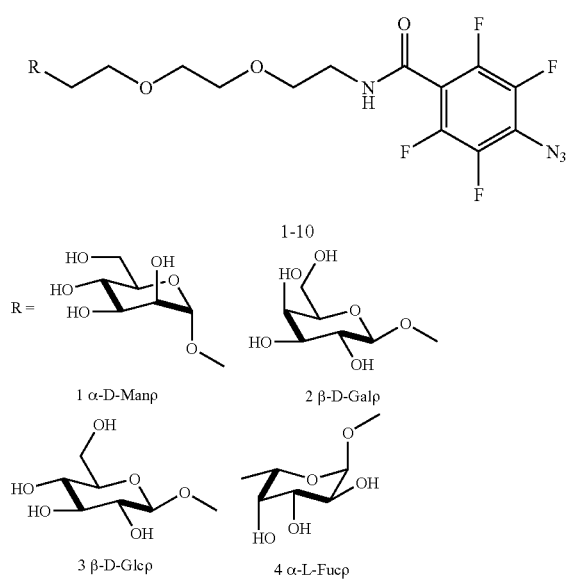

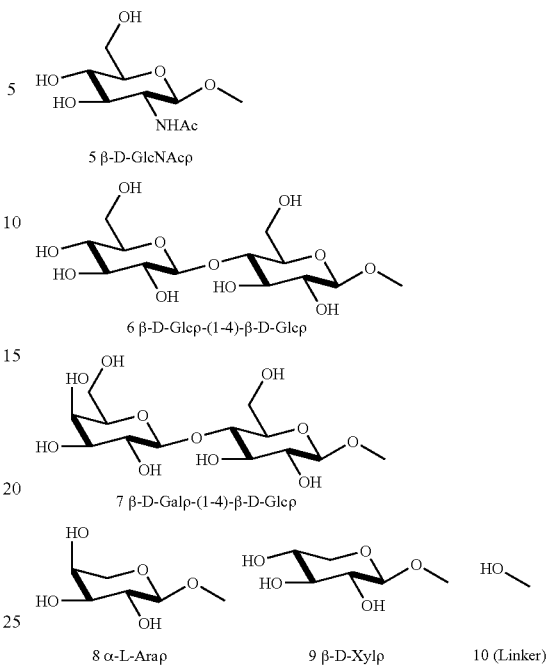

Synthetic Route for Compounds 6, 7, 8, 9 (Exemplified for Compounds 6 and 7)

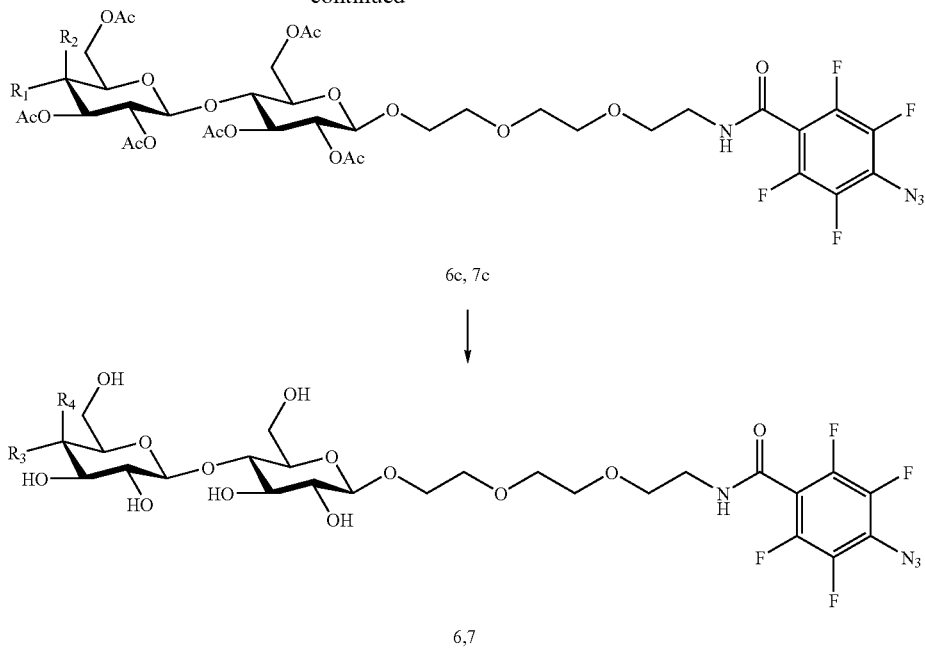

6: $R_1$ = OAc  7: $R_2$ = OAc
$R_2, R_4$ = H   $R_1, R_3$ = H
$R_3$ = OH      $R_4$ = OH

Compound 6b

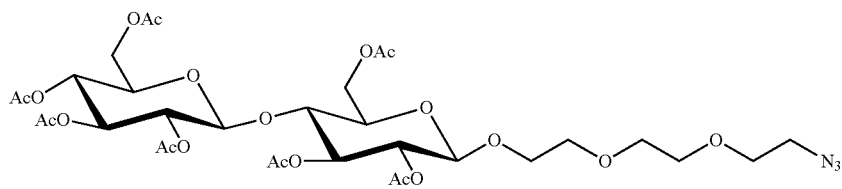

D-Octaacetyl cellobiose (4.0 g, 6 mmol) was dissolved in $CH_2Cl_2$ (10 ml), the resulting solution cooled to 0° C., and HBr—AcOH (33%, 14 ml) added to the solution. The reaction mixture was stirred for one hour, then poured into ice water (100 ml), and extracted with $CH_2Cl_2$ (3×50 ml). The combined organic layer was washed with saturated $NaHCO_3$, brine, dried over $Na_2SO_4$, and concentrated. 2-[2-(2-Azido-ethoxy)-ethoxy]-ethanol (0.87 g, 5 mmol) was added to the residue in anhydrous $CH_2Cl_2$ (30 ml). The solution was cooled to −30° C., AgOTf (1.35 g, 5.5 mmol) was added, and the reaction mixture was stirred in the dark for two hours. The resulting mixture was filtered over a celite bed, and the filtrate was subsequently washed with 1 M HCl, saturated $NaHCO_3$, water, brine, dried with $Na_2SO_4$, and concentrated. Purification of the crude product by flash column chromatography afforded compound 6b in 60% yield.

$[\alpha]^{22}_D$ −8.0 (c 6.0, $CHCl_3$); $^1$H-NMR (400 MHz, $CDCl_3$) δ 1.97, 2.00, 2.02, 2.05, 2.06, 2.11, 2.14 (21H, 7×s, $CH_3$—CO), 3.40 (2H, t, J=5.0 Hz, $CH_2$—$N_3$), 3.61-3.70 (11H, m, H-5', $CH_2$—O of linker), 3.79 (1H, t, J=7.8 Hz, H-4), 3.93 (1H, dt, J=11.0, 4.6 Hz, H-5), 4.05 (1H, dd, J=12.6, 2.3 Hz, H-6a), 4.11 (1H, dd, J=12.2, 4.2 Hz, H-6'a), 4.48 (1H, dd, J=12.6, 4.2 Hz, H-6'b), 4.49-4.52 (2H, m, H-6b, H-1), 4.57 (1H, d, J=8.2 Hz, H-1'), 4.88-4.97 (2H, m, H-2, H-2'), 5.07 (1H, t, J=7.8 Hz, H-4'), 5.13-5.21 (2H, m, H-3, H-3'); $^{13}$C-NMR (125 MHz, $CDCl_3$) δ 20.5, 20.6, 20.7, 20.8, 50.7, 61.5, 61.9, 67.8, 69.1, 70.1, 70.4, 70.70, 71.0, 71.6, 72.0, 72.7, 73.0, 76.8, 71.56, 100.7, 100.8, 169.1, 169.3, 169.6, 169.8, 170.2, 170.3, 170.5. Analysis calculated for $C_{32}H_{47}N_3O_{20}$: C, 48.42; H, 5.97; N, 5.29. Actual analysis: 48.54; H, 5.97; N, 4.98.

Compound 6c

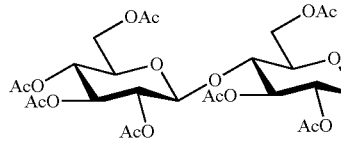
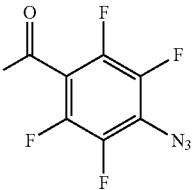

Compound 6b (2.4 g, 3.0 mmol) was dissolved in acetic acid (30 ml), and 10% Pd/C (150 mg) was added. The reaction mixture was stirred under hydrogen atmosphere at room temperature for four hours, after which time it was filtered over celite, and concentrated. The residue was dissolved in MeOH:H$_2$O (4:1), and the acetate exchanged for chloride over an Amberlite IRA-400 (Cl$^-$) column. The solvent was removed, yielding a solid that was dissolved in CH$_2$Cl$_2$ (50 ml) and the solution cooled to 0° C. 4-Azido-2,3,5,6-tetrafluorobenzoic acid (700 mg, 3 mmol) and 1-ethyl-3-(3-dimethylaminopropyl)carbodiimide hydrochloride (570 mg) were added to the solution, to which triethylamine (0.78 ml, 6 mmol) in CH$_2$Cl$_2$ (15 ml) was added dropwise, and the reaction mixture stirred overnight in the dark at room temperature. The product solution was diluted with CH$_2$Cl$_2$ (100 ml), washed with 1 M HCl, then saturated NaHCO$_3$, water, brine, dried over Na$_2$SO$_4$, and concentrated. Purification of the residue by flash column chromatography (hexane:EtOAc 1:1) afforded the product in 33% yield.

$[\alpha]^{22}_D$ −16.0 (c 1.0, CHCl$_3$); $^1$H-NMR (400 MHz, CDCl$_3$) δ 1.92, 1.95, 1.99, 2.01, 2.03, 2.06, 2.08, 2.10 (21H, 7×s, CH$_3$—CO), 3.49-3.62 (15H, m, H-5', CH$_2$—O of linker, CH$_2$—NHCO), 3.69 (1H, t, J=7.8 Hz, H-4), 3.81 (1H, dt, J=11.0, 4.6 Hz, H-5), 3.98 (1H, dd, J=12.6, 2.3 Hz, H-6a), 4.03 (1H, dd, J=12.5, 4.2 Hz, H-6'a), 4.31 (1H, dd, J=12.5, 4.2 Hz, H-6'b), 4.42-4.48 (3H, m, H-6b, H-1, H-1'), 4.69 (1H, dd, J=13.2, 8.0 Hz, H-2), 4.86 (1H, dd, J=13.3, 8.1 Hz, H-2'), 5.00 (1H, t, J=7.8 Hz, H-4'), 5.06-5.12 (2H, m, H-3, H-3'), 6.95 (1H, br, NHCO); $^{13}$C-NMR (125 MHz, CDCl$_3$) δ 20.6, 20.7, 20.8, 20.9, 21.0, 21.1, 40.0, 61.5, 61.8, 67.8, 69.2, 69.40, 70.2, 70.3, 70.5, 71.5, 71.6, 72.0, 72.4, 72.8, 72.9, 76.4, 100.7, 100.8, 111.9, 121.6, 139.4, 141.5, 143.1, 145.1, 157.8, 169.1, 169.3, 169.8, 169.9, 170.2, 170.3, 170.5. Analysis calculated for C$_{39}$H$_{48}$F$_4$N$_4$O$_{21}$: C, 47.56; H, 4.91; N, 5.69. Found: 47.57; H, 5.12; N, 5.50.

Compound 6

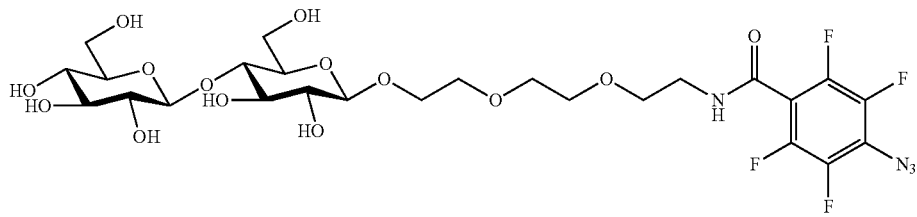

Compound 6c (980 mg, 1 mmol) was dissolved in methanol (40 ml), and NaOMe (70 mg) was added to the solution. The reaction mixture was stirred at room temperature for one hour. Amberlite IR-120H$^+$ resin was added to adjust the pH to 7, and the solution was filtered, and concentrated. Purification of the residue by flash column chromatography in EtOAc:EtOH (4:1) afforded the product in 60% yield.

$[\alpha]^{22}_D$ +1.0 (c 1.0, CH$_3$OH); $^1$H-NMR (500 MHz, D$_2$O) δ 3.16-3.21 (2H, m, H-2, H-2'), 3.30-3.45 (3H, m, H-3, H-4, H-4'), 3.46-3.51 (1H, m, H-5'), 3.51-3.58 (3H, m, CH$_2$—NH, H-3'), 3.58-3.66 (10H, m, CH$_2$—O of Linker), 3.67-3.70 (2H, m, H-6a, H-6'a), 3.80 (1H, dd, J=12.0, 2.0 Hz, H-6b), 3.86 (1H, dd, J=12.0, 2.0 Hz, H-6'b), 3.89 (1H, dt, J=11.8, 4.2 Hz, H-5), 4.37 (1H, d, J=7.9 Hz, H-1), 3.40 (1H, d, J=7.8 Hz, H-1'); $^{13}$C-NMR (125 MHz, D$_2$O) δ 39.7, 60.0, 60.5, 68.5, 68.7, 69.2, 69.4, 69.5, 69.7, 72.8, 73.1, 74.2, 74.6, 75.5, 75.9, 78.7, 102.1, 102.6, 110.1, 122.4, 139.3, 140.1, 141.3, 142.6, 160.73. Analysis calculated for C$_{25}$H$_{34}$F$_4$N$_4$O$_{14}$·H$_2$O: C, 42.38; H, 5.12; N, 7.91. Actual analysis: 42.06; H, 5.16; N, 7.71.

Compound 7c

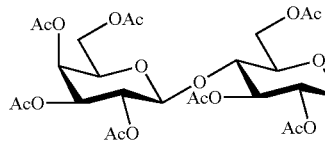

Prepared using the same synthetic route as compound 6c. Yield: 40%.

$[\alpha]^{22}_D$ −8.2 (c 1.0, CHCl$_3$); $^1$H-NMR (400 MHz, CDCl$_3$) δ 1.93, 1.97, 1.99, 2.01, 2.04, 2.07, 2.09, 2.13 (21H, 7×s, CH$_3$—CO), 3.55-3.73 (13H, m, H-5, CH$_2$—O of linker, CH$_2$—NHCO), 3.77 (1H, t, J=9.5 Hz, H-4), 3.86-3.91 (1H, m, H-5'), 4.06-4.13 (3H, m, H-6a, H-6'a, H-6'b), 4.47-4.56 (3H, m, H-1, H-1', H-6b), 4.77 (1H, dd, J=13.2, 8.0 Hz, H-2), 4.98 (1H, dd, J=13.3, 8.1 Hz, H-3'), 5.09 (1H, dd, J=10.3, 7.8 Hz, H-2'), 5.12 (1H, t, J=9.2 Hz, H-3), 5.31-5.39 (1H, m, H-4'), 7.00 (1H, br, NH—CO); $^{13}$C-NMR (125 MHz, CDCl$_3$) δ20.5, 20.6, 20.7, 20.8, 20.9, 21.0, 40.0, 60.8, 61.9, 66.6, 69.1, 69.4, 70.3, 70.5, 70.6, 71.6, 71.7, 72.0, 72.7, 72.8, 76.2, 100.63, 101.11, 111.9, 121.6, 139.4, 141.6, 143.2, 145.3, 157.8, 169.1, 169.7, 169.8, 170.2, 170.4. Analysis calculated for C$_{39}$H$_{48}$F$_4$N$_4$O$_{21}$: C, 47.56; H, 4.91; N, 5.69. Actual analysis: 47.55; H, 5.06; N, 5.52.

Compound 7

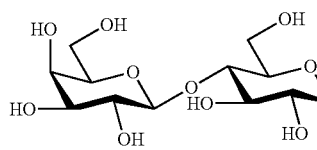

Prepared using the same synthetic route as compound 6. Yield: 58%.

$[\alpha]^{22}_D$ −0.8 (c 1.0, CH$_3$OH); $^1$H-NMR (500 MHz, D$_2$O) δ 3.21 (1H, dd, J=9.0, 8.0 Hz, H-2), 3.44 (1H, dd, J=10.0, 8.0 Hz, H-2'), 3.48-3.59 (6H, m, H-3, H-3', H-4, H-5', CH$_2$—NH), 3.60-3.72 (13H, m, H-6a, H-6b, H-6'a, CH$_2$—O of Linker), 3.84 (1H, dd, J=3.6, 1.0 Hz, H-4'), 3.87 (1H, dd, J=12.0, 2.0 Hz, H-6'b), 3.95 (1H, dt, J=12.6, 5.0 Hz, H-5), 4.37 (1H, d, J=9.8 Hz, H-1'), 3.40 (1H, d, J=9.8 Hz, H-1); $^{13}$C-NMR (125 MHz, D$_2$O) δ 39.7, 60.1, 61.0, 68.5, 68.7, 69.4, 69.7, 70.9, 72.5, 72.8, 74.3, 74.8, 75.3, 78.3, 78.4, 102.1, 102.9, 110.0, 122.4, 141.3, 142.5, 144.4, 160.7. Analysis calculated for C$_{25}$H$_{34}$F$_4$N$_4$O$_{14}$·H$_2$O: C, 42.38; H, 5.12; N, 7.91. Actual analysis: 42.13; H, 5.13; N, 7.75.

Compound 8

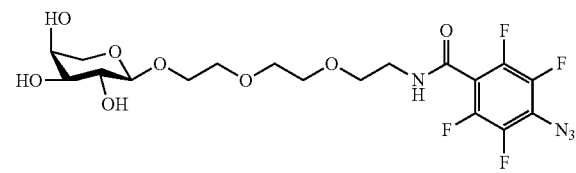

Prepared using the same synthetic route as compound 6. Yield: 60%.

$[\alpha]^{22}_D$ +2.0 (c 2.0, CH$_3$OH); $^1$H-NMR (500 MHz, D$_2$O) δ 3.46 (1H, dd, J=9.5, 7.6 Hz, H-2), 3.55 (2H, t, J=5.0 Hz, CH$_2$—NH), 3.58 (1H, dd, J=9.4, 3.5 Hz, H-3), 3.63-3.68 (10H, m, CH$_2$—O of linker), 3.72 (1H, dt, J=11.0, 3.8 Hz, H-5a), 3.81-3.86 (1H, m, H-4), 3.72 (1H, dt, J=11.0, 3.8 Hz, H-5b), 4.27 (1H, d, J=7.6 Hz, H-1); $^{13}$C-NMR (125 MHz, D$_2$O) δ 39.7, 61.7, 68.3, 68.6, 68.8, 68.9, 69.4, 70.7, 72.3, 103.1, 110.2, 122.4, 139.3, 141.4, 142.5, 144.6, 160.7. Analysis calculated for C$_{18}$H$_{22}$F$_4$N$_4$O$_8$: C, 43.38; H, 4.45; N, 11.24. Actual analysis: C, 42.98; H, 4.52; N, 10.98.

Compound 9

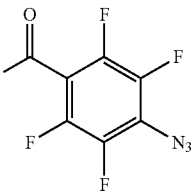

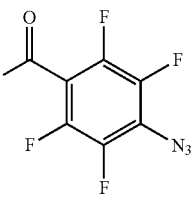

Prepared using the same synthetic route as compound 6. Yield: 60%.

$[\alpha]^{22}_D$ −15.0 (c 1.0, CH$_3$OH); $^1$H-NMR (500 MHz, D$_2$O) δ 3.18 (1H, dd, J=9.1, 7.8 Hz, H-2), 3.22 (1H, t, J=12.0 Hz, H-5a), 3.35 (1H, t, J=9.4 Hz, H-3), 3.51-3.54 (1H, m, H-4), 3.55 (2H, t, J=5.0 Hz, CH$_2$—NH), 3.63-3.68 (8H, m, CH$_2$—O of linker), 3.69-3.74 (1H, m, CH$_2$—O of linker), 3.85 (1H, dd, J=11.0, 37.4 Hz, H-5b), 3.86-3.93 (1H, m, CH$_2$—O of linker), 4.32 (1H, d, J=7.9 Hz, H-1); $^{13}$C-NMR (125 MHz, D$_2$O) δ 39.7, 60.3, 69.2, 68.5, 68.8, 69.5, 69.6, 73.0, 75.6, 103.0, 110.1, 122.4, 139.4, 141.4, 142.6, 144.6, 160.8. Analysis calculated for C$_{18}$H$_{22}$F$_4$N$_4$O$_8$: C, 43.38; H, 4.45; N, 11.24. Actual analysis: C, 43.13; H, 4.46; N, 11.04.

Synthetic Route for Compounds 1, 2, 3, 4, 5 (Exemplified for Compound 4)

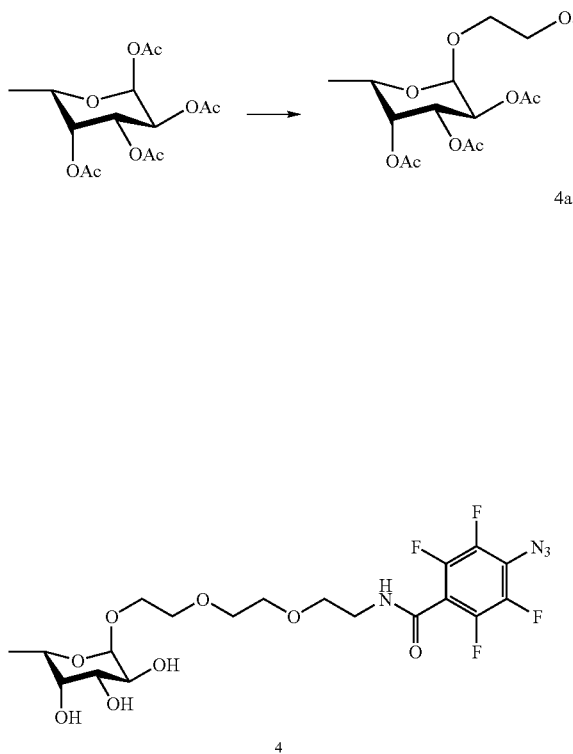

4a

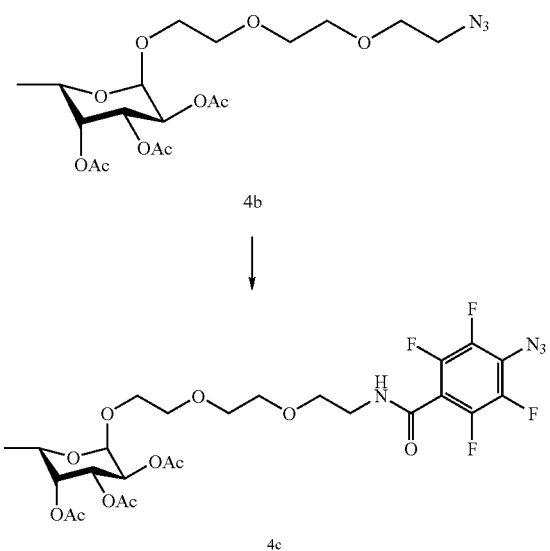

4b

4

4c

Compound 4b[1]

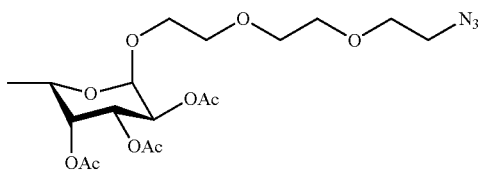

α-L-Fucose tetraacetate (3.4 g, 10 mmol) and 2-(2-(2-chloroethoxy)ethoxy)ethanol (1.8 g, 12 mmol) in CH$_2$Cl$_2$ (30 ml) was cooled to 0° C. BF$_3$Et$_2$O (7.0 ml, 50 mmol) was added dropwise, and the solution stirred overnight at room temperature. The product solution was poured into ice water (30 ml), exacted with CH$_2$Cl$_2$, and the organic layer washed with water, saturated NaHCO$_3$, water, brine, dried over Na$_2$SO$_4$, and the solvent evaporated in vacuo. The crude product and NaN$_3$ (650 mg, 10 mmol) were dissolved in DMF (15 ml), and stirred at 90° C. for 20 hours. Purification of the residue by flash column chromatography in Hexane:EtOAc (1:1) afforded the product in 25% yield.

$[\alpha]^{22}_D$ −96.0 (c 1.5, CHCl$_3$); $^1$H-NMR (500 MHz, CDCl$_3$) δ 1.09 (3H, d, J=6.6 Hz, H-6), 2.01, 2.13, 2.19 (9H, 3×s, CH$_3$—CO), 3.40 (2H, t, J=4.8 Hz, CH$_2$—N$_3$), 3.60-3.77 (9H, m, CH$_2$—O of linker), 3.80-3.89 (1H, m, CH$_2$—O of linker), 4.18-4.27 (1H, m, H-5), 5.11 (1H, d, J=1.2 Hz, H-1), 5.20-5.41 (3H, m, H-2, H-3, H-4); $^{13}$C-NMR (125 MHz, CDCl$_3$) δ 17.4, 20.7, 20.8, 21.0, 50.70, 64.3, 67.5, 68.0, 68.3, 69.6, 70.3, 70.6, 71.3, 96.3, 170.0, 170.1, 170.5.

Compound 4c

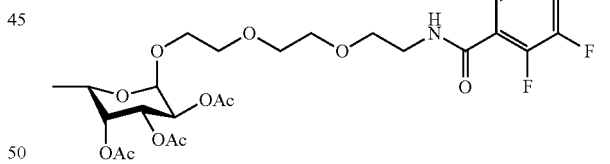

Prepared using the same synthetic route as compound 6c. Yield: 32%.

$[\alpha]^{22}_D$ −75.0 (c 0.5, CHCl$_3$); $^1$H-NMR (500 MHz, CDCl$_3$) δ 1.03 (3H, d, J=6.6 Hz, H-6), 1.91, 1.99, 2.08 (9H, 3s, CH$_3$—CO), 3.53-3.60 (11H, m, CH$_2$—O of linker), 3.65-3.75 (1H, m, CH$_2$—O of linker), 4.11-4.18 (1H, m, H-5), 4.793-5.05 (2H, m, H-2, H-4), 5.20 (1H, d, J=1.2 Hz, H-1), 5.27 (1H, t, J=3.5 Hz, H-3) 6.90 (1H, br, NH); $^{13}$C-NMR (125 MHz, CDCl$_3$) δ 15.9, 20.7, 20.8, 20.9, 40.1, 64.4, 67.2, 68.0, 68.3, 69.5, 70.2, 70.6, 71.2, 96.3, 111.9, 122.1, 139.7, 141.4, 143.1, 145.1, 157.8, 170.1, 170.5, 170.6. Analysis calculated for C$_{25}$H$_{30}$F$_4$N$_4$O$_{11}$: C, 47.03; H, 4.74; N, 8.77. Actual analysis: C, 46.87; H, 4.85; N, 8.64.

Compound 4

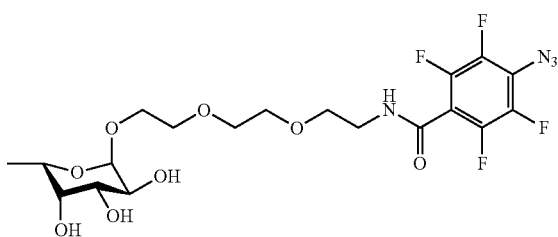

Prepared using the same synthetic route as compound 6. Yield: 51%.

$[\alpha]^{22}_D$ −57.7 (c 1.0, CH$_3$OH); $^1$H-NMR (500 MHz, D$_2$O) δ 1.12 (3H, d, J=6.6 Hz, H-6), 3.51-3.56 (3H, m, CH$_2$—NHCO, H-4), 3.60-3.65 (10H, m, CH$_2$—O of linker), 3.65 (1H, dd, J=9.0, 3.6 Hz, H-2), 3.74 (1H, dt, J=12.0, 3.6 Hz, H-3), 3.98 (1H, q, J=6.3 Hz, H-5), 4.85 (1H, d, J=3.8 Hz, H-1); $^{13}$C-NMR (125 MHz, D$_2$O) δ 15.2, 39.7, 66.6, 68.1, 68.5, 69.5, 69.7, 70.5, 71.7, 71.8, 96.3, 110.1, 122.5, 139.3, 141.3, 141.4, 142.4, 160.7. Analysis calculated for C$_{19}$H$_{24}$F$_4$N$_4$O$_8$: C, 44.54; H, 4.72; N, 10.93. Actual analysis: C, 44.44; H, 4.84; N, 11.02.

Compound 1

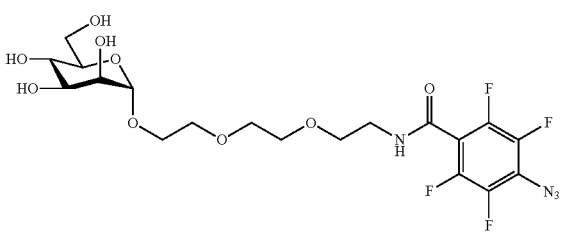

Prepared using the same synthetic route as compound 4. Yield: 63%.

$[\alpha]^{22}_D$ +50.0 (c 0.1, H$_2$O); $^1$H-NMR (400 MHz, D$_2$O) δ 3.50-3.80 (17H, m, CH$_2$—O of linker, H-3, H-4, H5, H-6) 3.84-3.86 (1H, m, H-2), 4.78 (1H, d, J=1.5 Hz, H-1); $^{13}$C-NMR (125 MHz, D$_2$O) δ 39.7, 61.0, 66.3, 66.7, 68.5, 69.7, 69.9, 70.5, 72.7, 99.9, 110.2, 122.41, 139.0, 141.5, 142.5, 144.7, 160.8. Analysis calculated for C$_{19}$H$_{24}$F$_4$N$_4$O$_9$: C, 43.19; H, 4.58; N, 10.60. Actual analysis: C, 43.05; H, 4.73; N, 10.72.

Compound 2

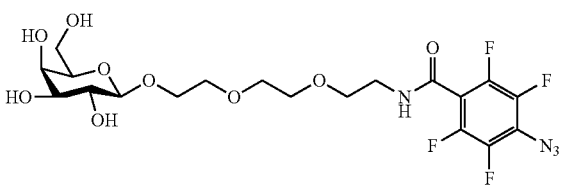

Prepared using the same synthetic route as compound 4. Yield: 64%.

$[\alpha]^{22}_D$ +5.2 (c 0.1, H$_2$O); $^1$H-NMR (400 MHz, D$_2$O) δ 3.41 (1H, dd, J=7.8 Hz, J=9.8 Hz, H-2), 3.50-3.61 (2H, m, CH$_2$—O of linker), 3.61-3.68 (10H, m, CH$_2$—O of linker), 3.50-3.53 (1H, m, H-5), 3.58-3.60 (1H, m, H-3), 3.68-3.75 (1H, m, H-6b), 3.82 (1H, d, J=3.5 Hz, H-4), 3.97 (1H, m, H-6a), 4.30 (1H, d, J=7.8 Hz, H-1); $^{13}$C-NMR (125 MHz, D$_2$O) δ 39.7, 61.0, 68.5, 69.4, 69.7, 69.8, 70.8, 72.7, 102.8, 110.2, 122.4, 139.0, 141.5, 142.5, 144.7, 160.8. Analysis calculated for C$_{19}$H$_{24}$F$_4$N$_4$O$_9$: C, 43.19; H, 4.58; N, 10.60. Actual analysis: C, 43.07; H, 4.62; N, 10.74.

Compound 3

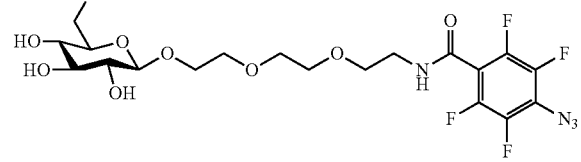

Prepared using the same synthetic route as compound 4. Yield: 38%.

$[\alpha]^{22}_D$ +11.0 (c 0.1, H$_2$O); $^1$H-NMR (400 MHz, D$_2$O) δ 3.17 (1H, dd, J=9.2 Hz, J=7.9 Hz, H-2), 3.23-3.41 (3H, m, H-3, H-4, H-5), 3.49-3.68 (11H, m, CH$_2$—O of linker, H-6b), 3.72 (1H, dd, J=11.5 Hz, J=4.4 Hz, H-6a), 3.77-3.84, 3.91-3.98 (2H, m, CH$_2$—O of linker), 4.37 (1H, d, J=8.1 Hz, H-1); $^{13}$C-NMR (125 MHz, D$_2$O) δ 39.7, 61.0, 68.5, 68.7, 69.4, 69.6, 73.1, 75.9, 102.2, 110.2, 122.4, 139.4, 141.3, 142.5, 144.5, 160.7. HRMS: Analysis calculated for the sodium salt of C$_{19}$H$_{24}$F$_4$N$_5$O$_9$: 551.1377; actual analysis: 551.1375.

Compound 5

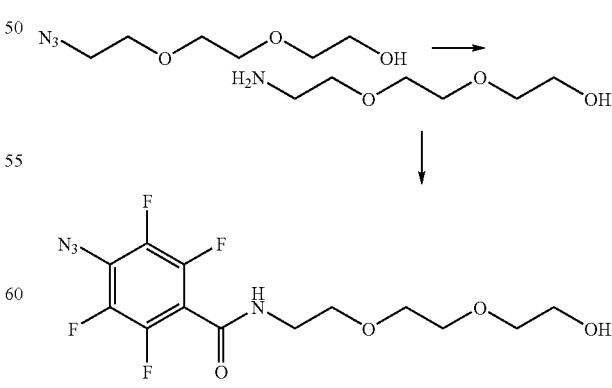

Prepared using the same synthetic route as compound 4. Yield: 59%.

$[\alpha]^{22}_D$ −4.0 (c 0.1, H$_2$O); $^1$H-NMR (400 MHz, D$_2$O) δ 1.93 (3H, s, COCH$_3$), 3.28-3.95 (18H, m, CH$_2$—O of linker, H-2-H-6), 4.44 (1H, d, J=8.3 Hz, H—); $^{13}$C-NMR (125 MHz, D$_2$O) δ 22.1, 39.7, 43.1, 55.5, 60.8, 68.5, 68.9, 69.5, 69.7, 69.9, 73.8, 75.9, 101.1, 110.2, 122.5, 139.4, 141.3, 142.5, 144.5, 160.7, 174.5. HRMS: Analysis calculated for the sodium salt of C$_{21}$H$_{27}$F$_4$N$_5$O$_9$: 592.1643; actual analysis: 592.1649.

Synthetic Route for Compound 10

Compound 10

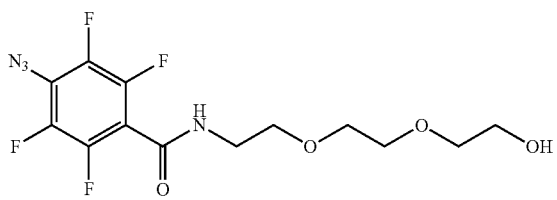 [SMILES: [N-]=[N+]=Nc1c(F)c(F)c(C(=O)NCCOCCOCCO)c(F)c1F]

A solution of 2-[2-(2-azido-ethoxy)-ethoxy]-ethanol (700 mg, 4 mmol) in dry THF (10 ml) was cooled to 0° C. Triphenyl phosphine (1.1 g, 4.0 mmol) was added, and the reaction mixture stirred at room temperature for 10 hours. Water (6.7 mmol) was subsequently added, and the reaction mixture was stirred for another five hours, after which time it was diluted with water and washed with toluene. The aqueous layer was concentrated, and the resulting oil dissolved in $CH_2Cl_2$ (50 ml) and cooled to 0° C. 4-Azido-2,3,5,6-tetrafluorobenzoic acid (910 mg, 4 mmol) and 1-ethyl-3-(3-dimethylaminopropyl)carbodiimide hydrochloride (768 mg, 4 mmol) were added to the solution, triethylamine (1.0 ml, 8 mmol) in $CH_2Cl_2$ (15 ml) was added dropwise, and the reaction mixture stirred overnight in the dark at room temperature. Purification of the residue by flash column chromatography in $CH_2Cl_2$: MeOH (10:1) afforded the product in 36% yield.

$^1$H-NMR (500 MHz, $D_2O$) δ 3.51-3.57 (6H, m), 3.62-3.71 (4H, m), 3.73-3.80 (2H, m); $^{13}$C-NMR (125 MHz, $D_2O$) δ 44.9, 60.4, 67.4, 69.4, 69.5, 71.9, 110.1, 121.9, 139.3, 141.3, 142.4, 144.3, 164.9. HRMS: Analysis calculated for the sodium salt of $C_{13}H_{14}F_4N_4O_4$: 389.0843; actual analysis: 389.0839.

Preparation of Carbohydrate Microarrays

Aminosilylated glass slides were treated with a solution containing succinimidyl 4-azidetetrafluorobenzoate (NHS-PFPA, 10 mmol/L) in $CH_2Cl_2$ containing diisopropylethylamine (1%, v/v) for two hours, washed three times with $CH_2Cl_2$, and dried under a stream of nitrogen at room temperature. The resulting slides were immersed in a solution of PEO ($M_r$ 200,000) in $CHCl_3$ (90 mg/ml) for 20 minutes, dried, and irradiated for 7 minutes at a distance of about 5 cm from a medium pressure Hg lamp. Unbound polymer was removed by sonicating the slides three times with distilled water. The resulting slides were dried under a stream of nitrogen and stored in a desiccator prior to use.

Solutions of carbohydrates (10 mM) in water (1 mL) were printed on the PEO-coated glass slides from a 384-well plate (Genetix 384×7020) at a distance between adjacent spots of 200 μm. Printing conditions: humidity 30-40%; temperature: 20° C.; spot size: 100 μm; pin type: aQu microarray spotting pins K2805; dwell time: 10 milliseconds; wash cycles: water 5×2 seconds, dry time 5 seconds, ethanol 3 seconds, dry time 5 seconds, ethanol 3 seconds, dry time 10 seconds. The slides were subsequently irradiated under UV (7 min), and washed with PBS (pH 7.4) containing 0.1% Tween® 20 for 30 minutes and then rinsed with water to remove excess carbohydrates. After drying under a stream of nitrogen, the slides were first incubated with a solution of PBS (pH 7.4) containing 0.1% Tween® 20 and 3% BSA (w/v) for 30 minutes, and then washed with PBS (pH 7.4) containing 0.1% Tween® 20 for 20 minutes. After drying under a stream of nitrogen, the slides were incubated with Alexa Fluo 647-labeled lectins (10 μg/ml) in PBS (pH 7.4) containing 0.1% Tween® 20 overnight at room temperature. The unbound lectins were removed by gentle shaking in the same buffer for 20 minutes, after which time the slides were scanned (Ex: 633 nm; Em: 650-750 nm).

Results and Characterization

Following array preparation, binding analysis of the surfaces was performed. Fluorescence-tagged lectins were used, and fluorescence imaging was employed in developing the array binding patterns. Four different lectins were assayed: *Griffonia simplicifolia* II (GSII), peanut agglutinin (PNA), jack bean lectin (Con A), and soybean agglutinin (SBA).

Figure 29:
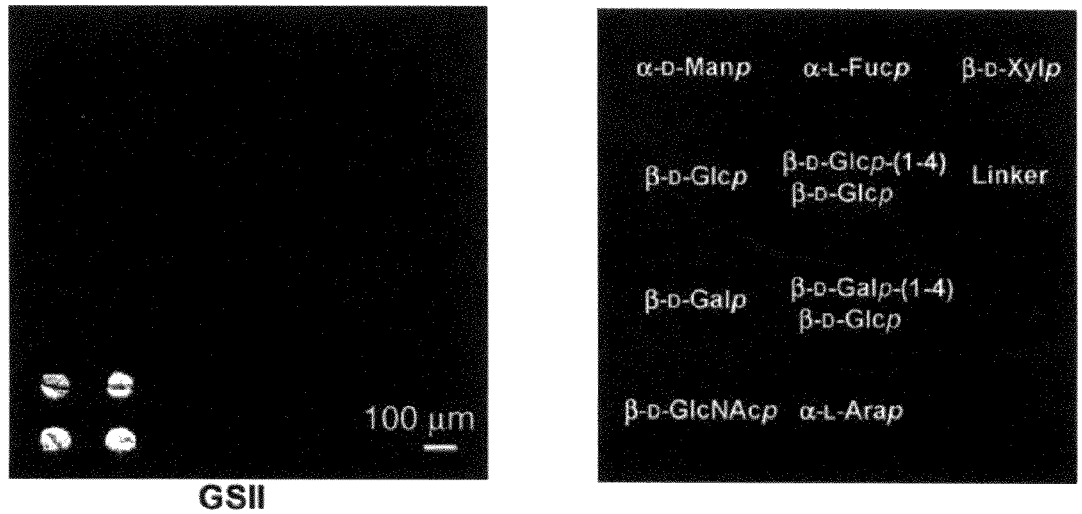
FIG. 29 is a fluorescence image of a carbohydrate microarray with bound *Griffonia simplicifolia* II agglutinin.
Figure 30:
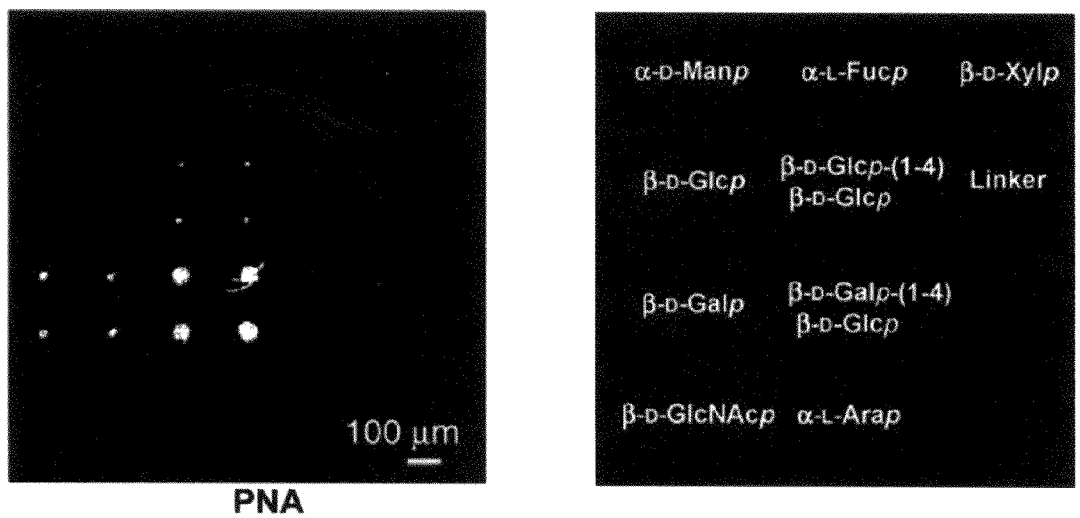
FIG. 30 is a fluorescence image of a carbohydrate microarray with bound peanut agglutinin.
Figure 31:
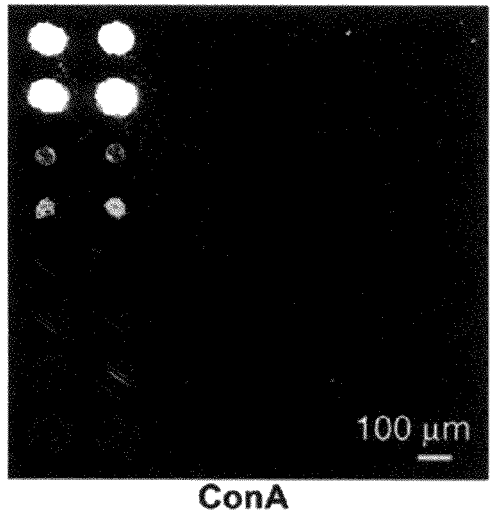
FIG. 31 is a fluorescence image of a carbohydrate microarray with bound concanavalin A.
Figure 31:
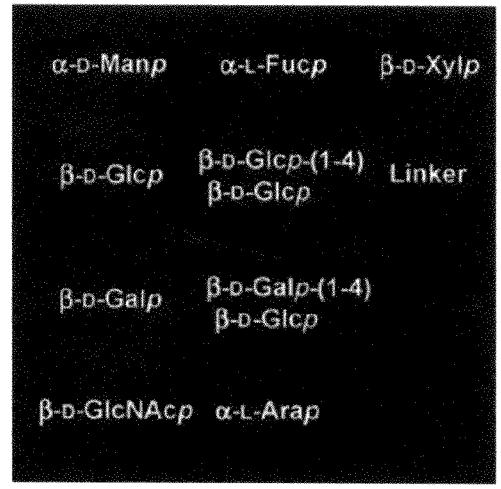
Figure 32:
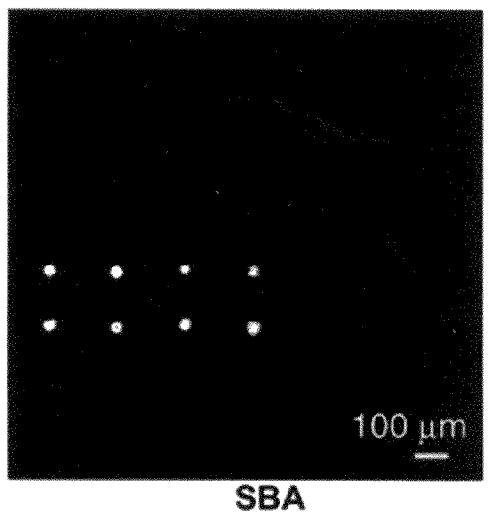
FIG. 32 is a fluorescence image of a carbohydrate microarray with bound soybean agglutinin.
Figure 32:
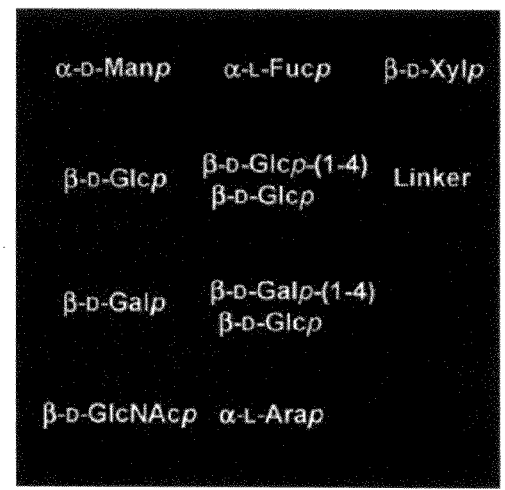

FIGS. 28-31 demonstrate the binding patterns of the four lectins to the carbohydrate microarrays. As can be seen, the arrays were efficient in demonstrating the specific binding patterns of the chosen lectins. Both the primary binding partners and the secondary ligands could be identified. GSII showed a clear preference for binding to N-acetyl-β-D-glucosamine (0-D-GlcNAcp), in agreement with the known ligand specificity for this lectin, and with no detectable binding to the other structures (FIG. 29). The primary ligand for PNA was seen to be lactose (β-D-Galp-(1-4)-β-D-Glcp), followed by lesser amounts of binding to β-D-galactose (β-D-Galp) and cellobiose (β-D-Glcp-(1-4)-β-D-Glcp) (FIG. 30). The specificity of Con A for binding with α-D-mannoside structures (α-D-Manp) is clearly demonstrated. Con A also showed low binding to the β-D-glucoside (β-D-Glcp) and very low binding to the N-acetyl-β-D-glucosamine structure (β-D-GlcNAcp) (FIG. 31). The soybean agglutinin is specific for terminal β-D-galactoside units and showed binding to both β-D-galactose (β-D-Galp) and lactose (β-D-Galp-(1-4)-β-D-Glcp) (FIG. 32). Thus, these results indicate that the method can be used to demonstrate the binding pattern to different carbohydrate structures for specific lectins in a single analysis.

Example 5

Synthesis of PHPA-Functionalized Graphene—I

Synthesis of PHPA-Functionalized Graphene

Natural graphite (20 mg) is added to a solution of 4-azidotetrafluoro-N-(8-hydroxyoctyl)benzamide (20 mg) in chlorobenzene (20 mL). The mixture is refluxed for about 96 h. As the reaction progresses, the solution turns from colorless to light brown. After the reaction, the solution is concentrated by removing about 15 mL of solvent from the mixture by rotary evaporation. The mixture then is centrifuged at 8000 rpm, and supernatant is removed from the unreacted graphite powder. A drop of the supernatant is placed on a mica or silicon wafer, and the sample is subjected to AFM imaging.

Results and Characterization

AFM analysis revealed platelet heights of about 2.4 nm, conforming to the expected heights of individual graphene sheets after derivatization on both surfaces with PFPA. Furthermore, the identical heights observed for multiple platelets confirms that they are individual graphene sheets.

Example 6

Synthesis of PHPA-Functionalized Graphene II

Synthesis of PHPA-Functionalized Graphene

Four trials were performed. Natural graphite (20 mg) was added to a solution of 4-azidotetrafluoro-N-(8-hydroxyoctyl)benzamide (20 mg) in N-methyl-2-pyrrolidone (NMP) (10 mL). The mixtures were sonicated and refluxed for 2, 4, 6, or 10 h at 110° C. As the reaction progressed, the solutions turned from colorless to dark brown. After the reaction, the mixtures then were centrifuged at 8000 rpm, and supernatant was removed from the unreacted graphite powder. Each resulting product (supernatant) was dropped on a TEM grid, and the samples were subjected to TEM imaging.

Results and Characterization

TEM analysis revealed that at least some of the graphite had been exfoliated into graphene sheets after derivatization on both surfaces with PFPA. TEM images showed graphene layers obtained by this method.

Example 7

Synthesis of PHPA-Functionalized Graphene—III

Synthesis of PHPA-Functionalized Graphene

Graphite powder (25 mg) was added to a solution of PFPA (e.g., PFPA-NHS or PFPA-C18) in 10 mL of chlorobenzene or tetrachloroethane. The mixture was subjected to ultrasonication overnight. After ultrasonication, the mixture was refluxed at high temperature (120-140° C.) for 72 hours, followed by centrifugation to remove unreacted graphite.

In an alternate method, three kinds of graphite (natural graphite, SP1 and graphite flake), 0.5 g, were treated overnight at room temperature with 20 mL of a mixture of concentrated sulfuric acid and nitric acid (3:1 (v/v)) separately. The intercalated graphite (e.g., graphite with sulfate anions intercalated between the layers) was filtered (0.45 mm pore size), washed with distilled water, and air-dried for two days. The intercalated graphites were exfoliated by brief (1 minute) heating to 1000° C. in forming gas (3% hydrogen in argon). The resulting exfoliated graphite was dispersed in chlorobenzene or tetrachloroethane. A PFPA (e.g., PFPA-NHS, PFPA-C18) was then added and subjected to ultrasonication overnight. Following ultrasonication, the mixture was refluxed at high temperature (120-140° C.) for 72 hours, followed by centrifugation to remove unreacted graphite. The supernatant was filtered using filters with different pore sizes (e.g., 0.45 µm, 0.22 µm). The residue on the filter was characterized by AFM.

Results and Characterization

AFM revealed the coexistence of platelet heights of about 2.4 nm and 10 nm, which match the expected heights of individual graphene sheets after derivatization on both sides with PFPA molecules and multiple plates respectively, suggesting possible successful separation of single graphene sheets.

Example 8

Synthesis of PHPA-Functionalized Graphene—IV

Synthesis of PHPA-Functionalized Graphene

The synthesis and handling of air-sensitive materials was performed under $N_2$. Solvents were dried at least overnight using the molecular sieve 4A and stored under $N_2$.

In a typical synthesis, 2.40 g of graphite (varied particle size, 1-2 µm, or larger size using SP1) was mixed with 0.98 g of potassium metal (mol C/mol K=8/1). After heating with vigorous stirring at 80-120° C. for 10-30 minutes, the content changed from black to gold characteristics of potassium-intercalated graphite (KC8). The crystallinity of KC8, e.g., the sharpness of the peaks and the peaks intensity relative to the background, depends on the particle size of graphite, the level of magnetic stirring, temperature, and time.

An amount of 0.25 g of KC8 was mixed with 1.52 g of tetra-n-octylammonium bromide (Oct4NBr) (mol Oct4NBr/mol KC8=1.5) and 8 mL of toluene to produce expanded graphite. The content was stirred at room temperature with vigorous stirring for 24 h, after which the material changed to black. After removing the liquid, it was washed with the solution of 0.73 g of 18-crown-6 in 20 mL of toluene (mol 18C6/mol KC8=1.5), and then washed briefly with toluene. Overnight vacuum-drying was performed after each washing step. The use of other tetraalkylammonium ions or (e.g., tetra-n-pentyl, tetra-n-hexyl, dodecyltrimethyl, octadecyltrimethyl, etc.) is possible with the right combination of appropriate solvents and the reaction temperature.

Figure 33:
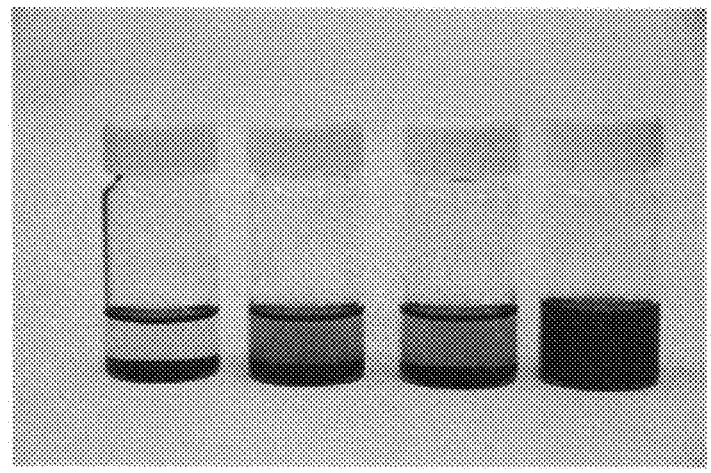
FIG. 33 is a color photograph of PFPA-C18 functionalized graphite prepared by reaction for various times at 110° C.

In one embodiment, the expanded graphite was sonicated for 2 h, 4 h, 6 h, or 10 h while heating at 110° C. with PFPA-C18 in N-methyl-2-pyrrolidone (NMP). FIG. 33 is a color photograph of the prepared graphite+PFPA-C18.

Figure 34:
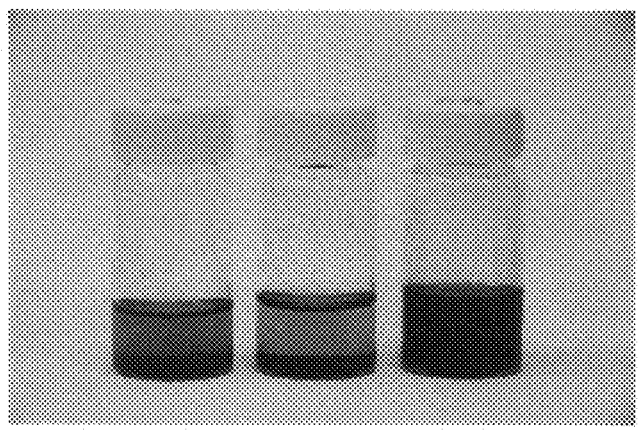
FIG. 34 is a color photograph of PFPA-C18 functionalized graphite prepared by reaction at various temperatures for 6 h.
Figure 35:
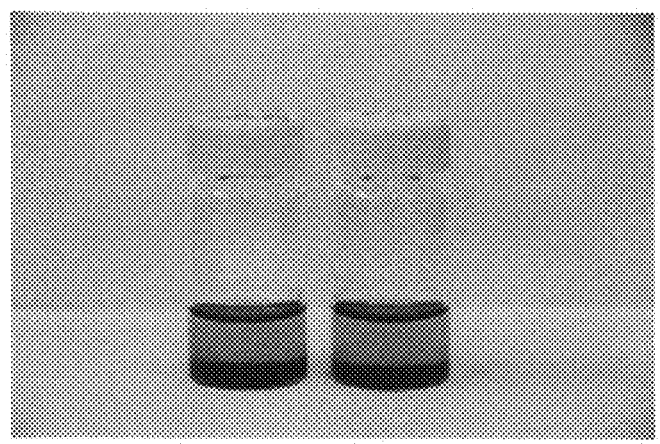
FIG. 35 is a color photograph of graphite and graphite+ PFPA-C18 prepared by reaction for 6 h at 110° C.
Figure 36:
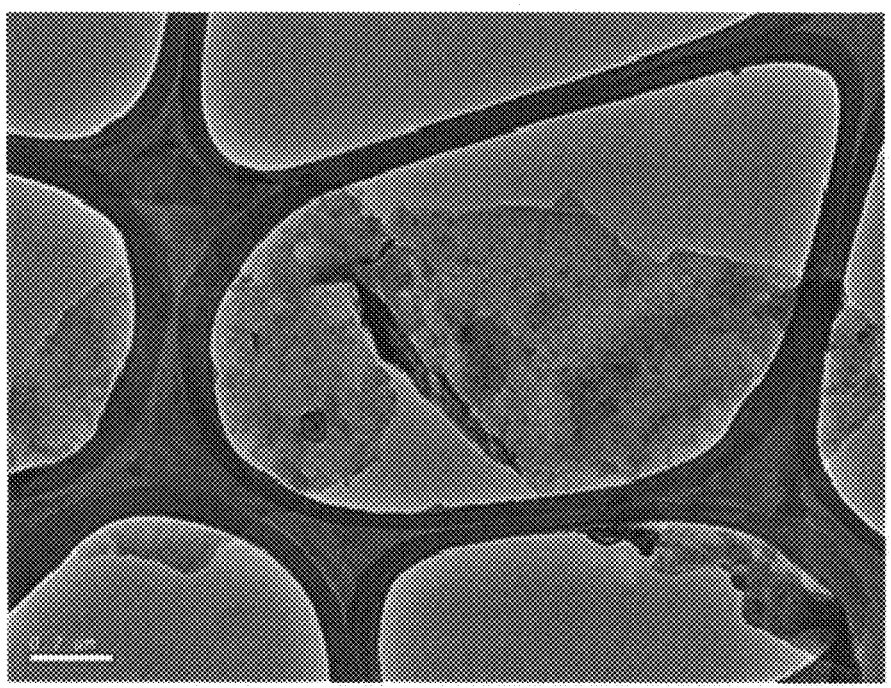
FIGS. 36-39 are transmission electron microscope (TEM) images of graphene sheets on TEM grids.
Figure 37:
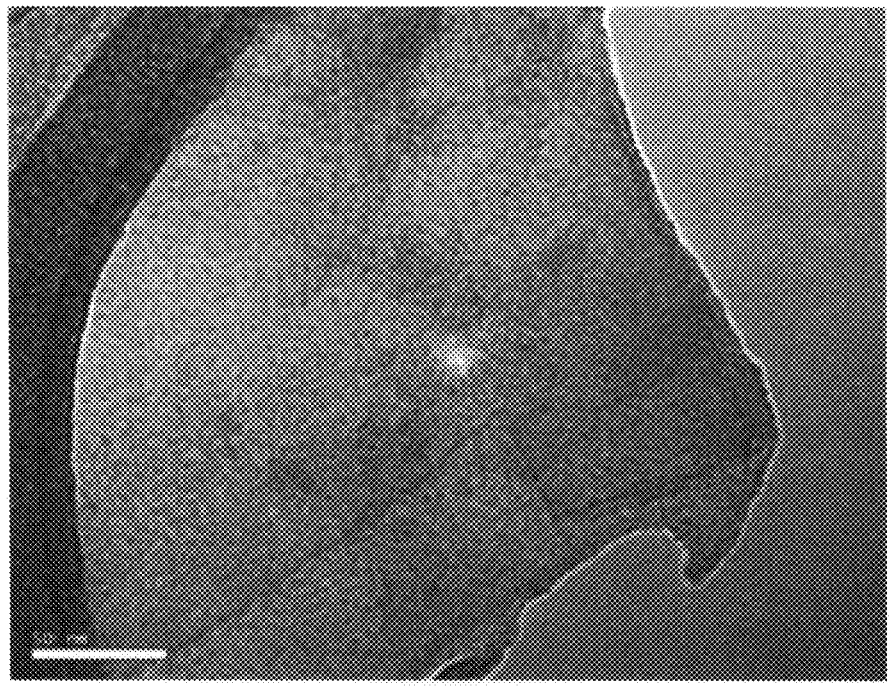
Figure 38:
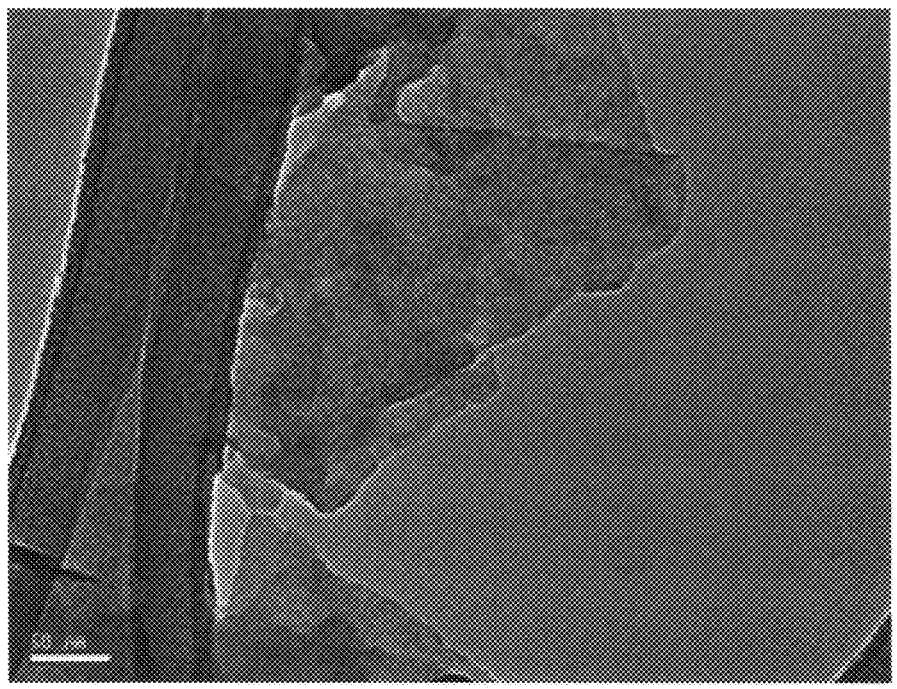
Figure 39:
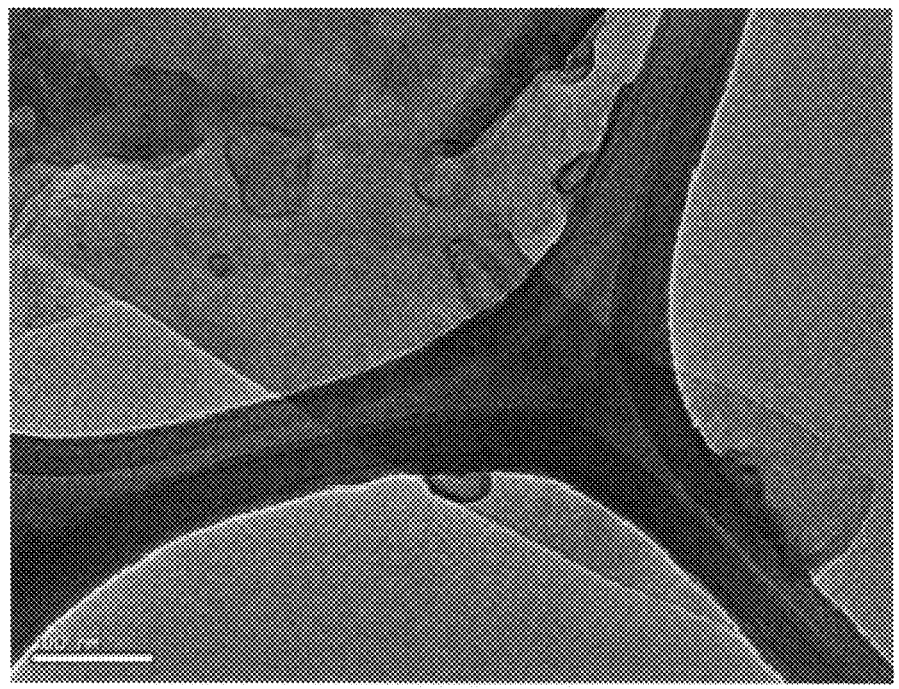

In another embodiment, the expanded graphite was sonicated for 6 h while heating at 90° C., 10° C., or 130° C. with PFPA-C18 in NMP. FIG. 34 is a color photograph of the prepared graphite+PFPA-C18. FIG. 35 is a color photograph comparing graphite and graphite+PFPA-C18 after sonication for 6 h at 110° C. in NMP. The upper clear supernatents were dropped onto TEM grids for imaging. Graphene sheets were found in both graphite and expanded graphite samples, as shown in FIGS. 36-39.

Example 9

Covalent Immobilization of Graphene on Silicon

Synthesis of Graphene-PFPA-Silicon

Silicon wafers with an oxide layer thickness of about 300 nm were cleaned with piranha solution (7:3 (v/v) concentrated $H_2SO_4$:35 wt % $H_2O_2$) followed by thorough washing with boiling water. The wafers were then treated with a solution of PFPA-silane in toluene (12.6 mM) for 4 h, washed with toluene and cured at room temperature overnight. HOPG was then placed on a PFPA-functionalized wafer, and pressed by applying pressure (about 10 psi) on top of the HOPG. The assembly was brought to 140° C. and maintained at 140° C. and 10 psi for 40 minutes. The HOPG was then removed. The resulting wafer was sonicated in isopropanol for 10 min., then sonicated in NMP for 10 min. After sonication, the wafer was washed with NMP followed by acetone, and dried with nitrogen.

Results and Characterization

Figure 40:
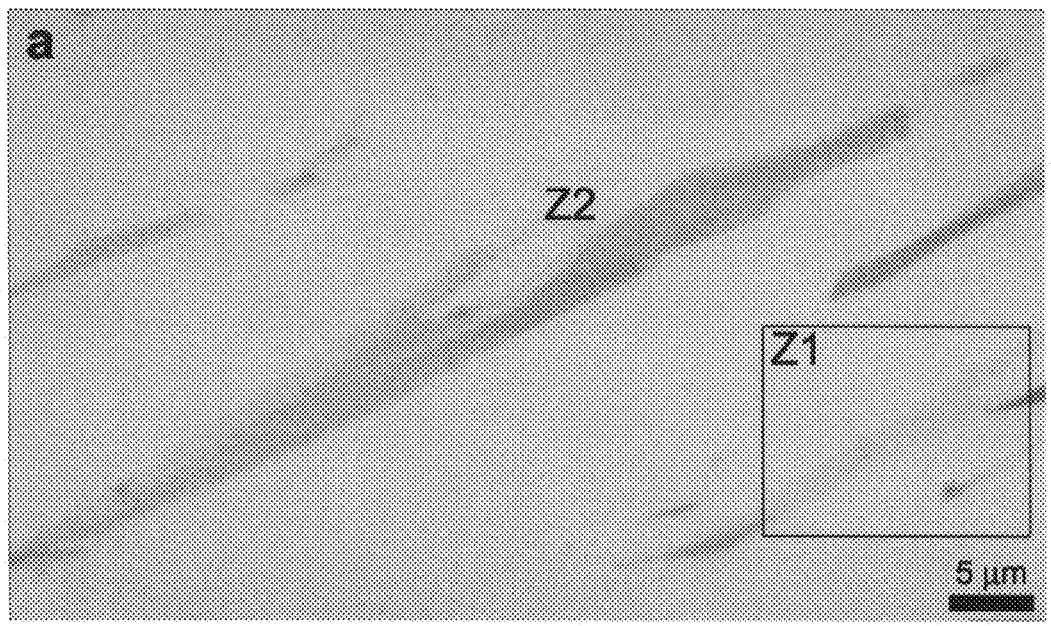
FIGS. 40-42 are optical microscope images of graphene immobilized on a silicon wafer.
Figure 41:
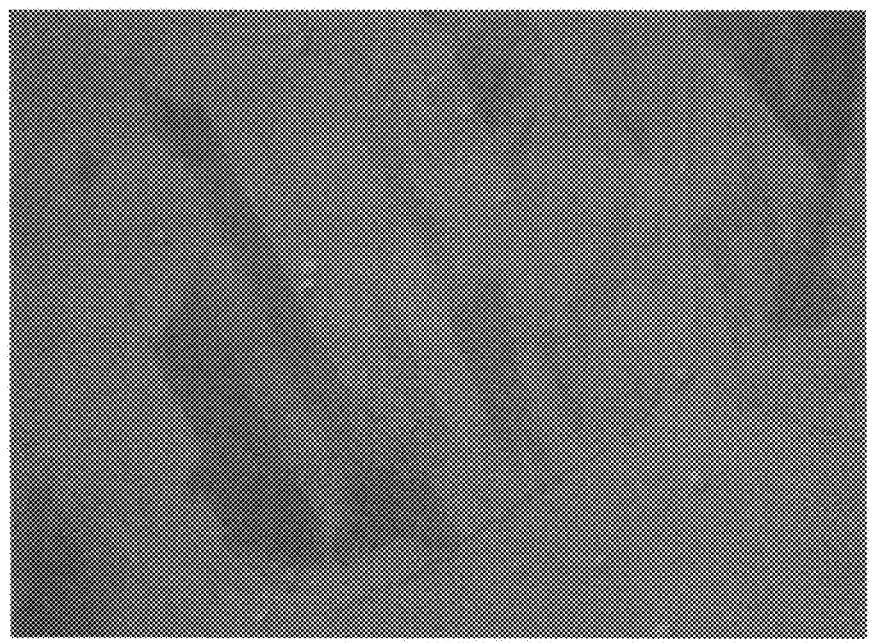
Figure 42:

The immobilized graphene films were evaluated using optical microscopy, atomic force microscopy, and Raman spectroscopy. Large pieces of graphene films immobilized on a silicon wafer were observed under the optical microscope, as shown in FIGS. 40-42. Z1 is a 2 µm×15 µm strip of graphene film, and Z2 is a 4 µm×50 µm strip of graphene film. FIG. 42 is a magnified image of the area within the box of FIG. 41.

Figure 43:
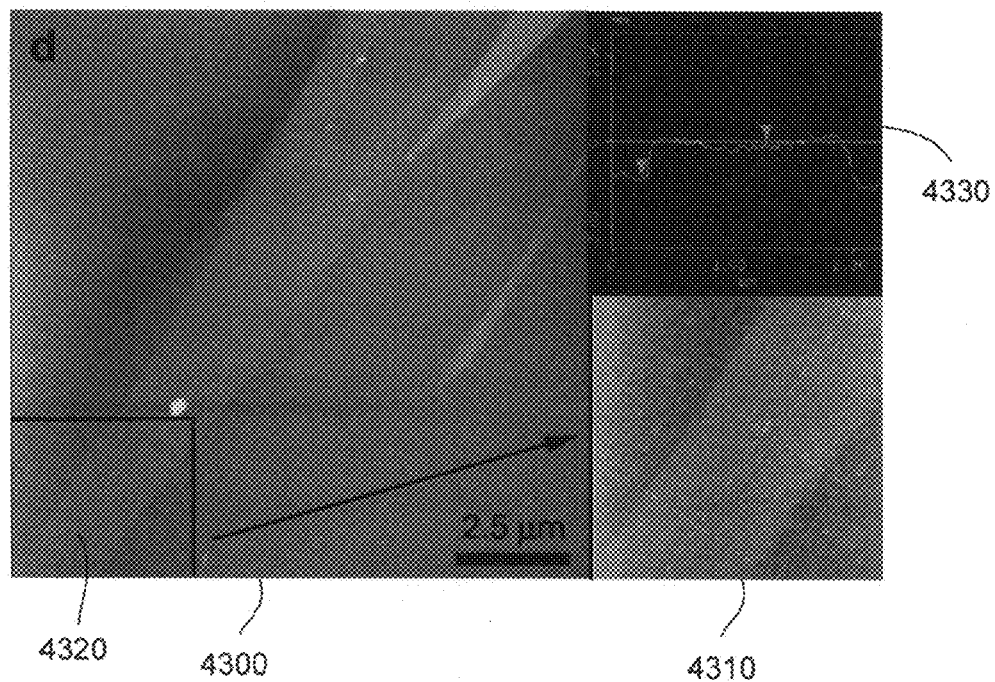
FIGS. 43-45 are AFM images and scans of graphene films immobilized on a silicon wafer.

Z1 was characterized by AFM microscopy. FIG. 43 is an image 4300 of the Z1 region of FIG. 40. Inset 4310 is a magnified image of the area indicated by the box 4320. Sectional analysis 4330 shows the average film thickness is 0.84 nm, which is consistent with the thickness of a single-layer graphene sheet. The literature-reported value of the AFM step height of a single-layer graphene sheet on a silicon wafer ranges from 0.4 nm to 1.0 nm. This result further confirmed that the Z1 graphene film was single-layer graphene.

Figure 44:
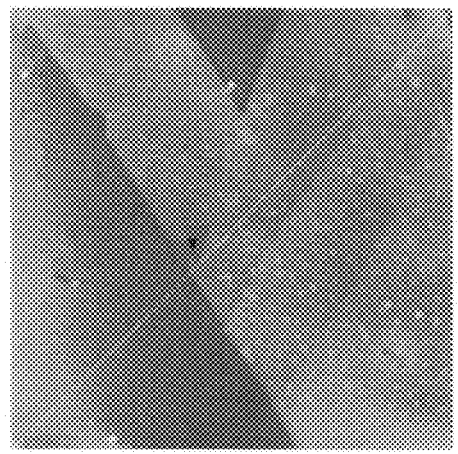
Figure 45:
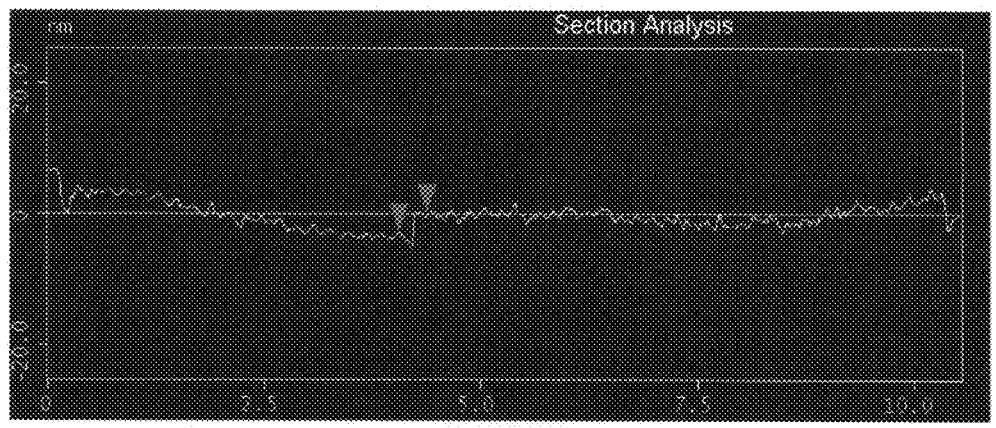

FIGS. 44-45 are an AFM image and scan of graphene film immobilized on a silicon wafer. The graphene film had a scanned thickness of 2.8 nm as indicated by the red arrows on the scan. The thickness corresponds to approximately 3-5 layers of graphene sheets.

Figure 46:
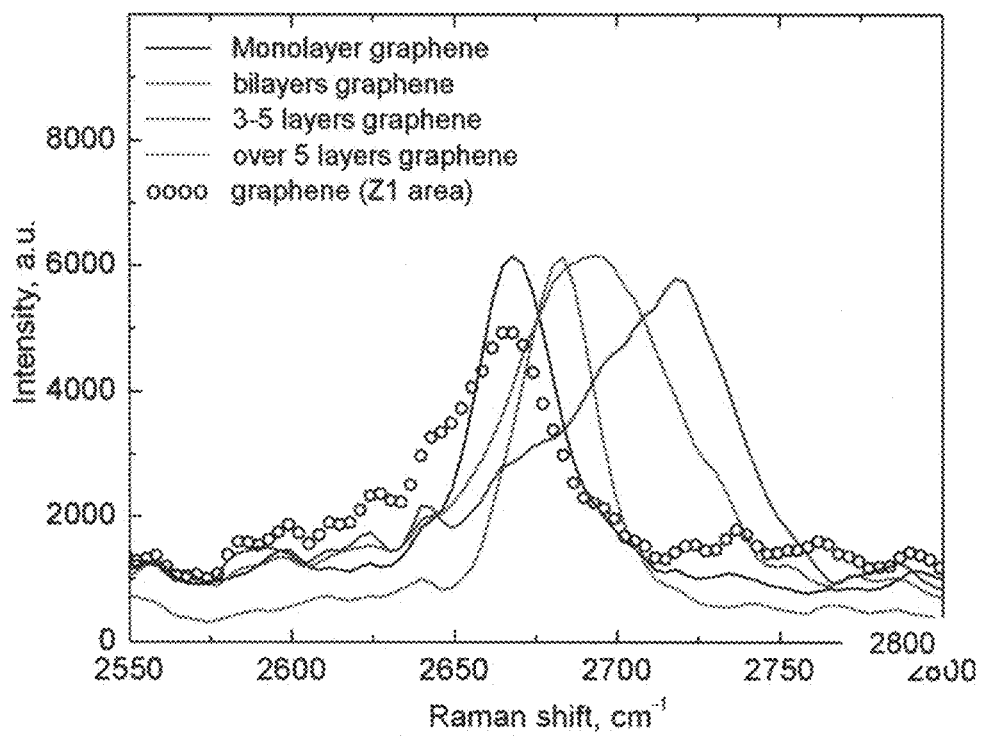
FIGS. 46-48 are Raman spectra of covalently immobilized graphene films.
Figure 47:
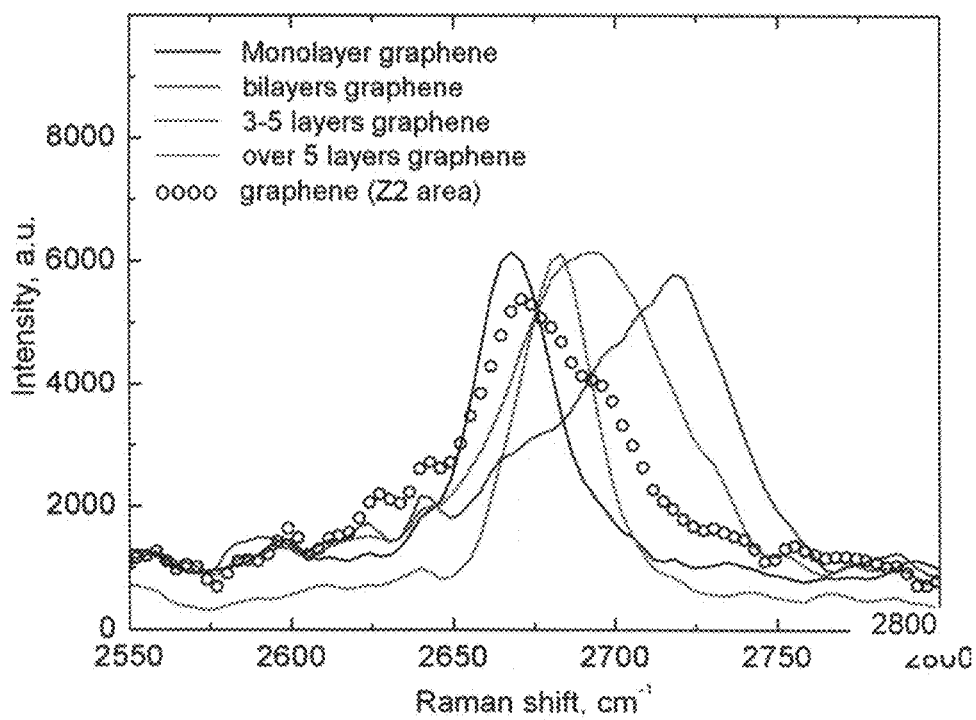
Figure 48:
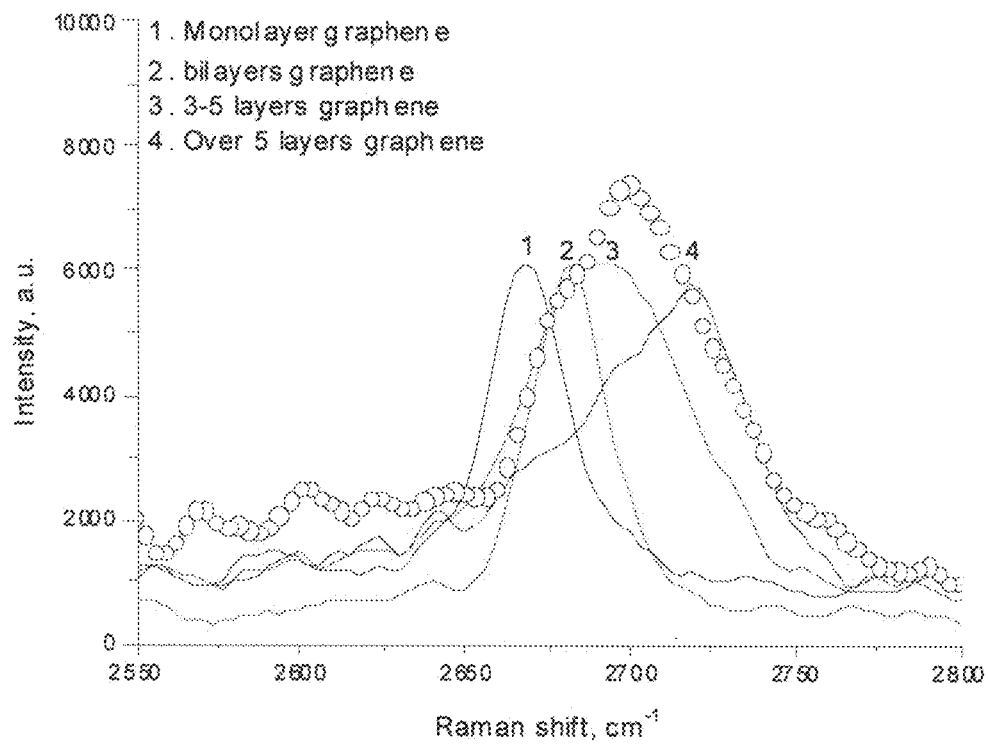

The films were further studied by Raman spectroscopy to determine the number of graphene layers in the immobilized films. Reference samples were prepared by a conventional mechanical cleavage method using cellophane tape to transfer graphene sheets from HOPG to a clean wafer. FIGS. 46-48 are Raman spectra of covalently immobilized graphene films. Single-layer graphene shows a characteristic Raman 2D peak at 2668 cm$^{-1}$. Increases in the number of graphene layers result in gradual 2D peak shift of about 50 cm$^{-1}$. Two-layer graphene peaks at 2682 cm$^{-1}$, 3-5 layers of graphene show a peak at 2692 cm$^{-1}$, and graphene with more than 5 layers, including HOPG, show a broad absorption peak at 2720 cm$^{-1}$. Comparison of the Raman spectra of the immobilized graphene films Z1 and Z2 to the reference samples allows the number of graphene layers to be determined. FIG. 46 shows the Raman spectrum of Z1, designated by open circles. The peak at 2668 cm$^{-1}$ confirms that the Z1 graphene film is a single layer of graphene. FIG. 47 shows the Raman spectrum of Z2. The spectrum has a strong single-layer graphene peak at around 2668 cm$^{-1}$ as well as a smaller shoulder at around 2700 cm$^{-1}$, indicating that the Z2 graphene film comprises a mixture of single and multiple layers of graphene shapes. FIG. 48 is the Raman spectrum (open circles) of the graphene film shown in FIG. 44. The spectrum indicates that the covalently immobilized film consisted of a mixture of different numbers of graphene layers, which was consistent with the AFM result in FIG. 45.

The covalently-bonded graphene film remained intact after repetitive solvent and sonication treatment in isopropanol and NMP, clearly demonstrating that the bonding between graphene and the wafer is strong and stable. In contrast, when a drop of NMP was placed on the graphene film prepared by the cellophane tape method, the film disappeared after the wafer was dried with $N_2$. The tape-prepared graphene also can be readily removed by sonicating the samples in isopropanol or acetone.

Figure 49:
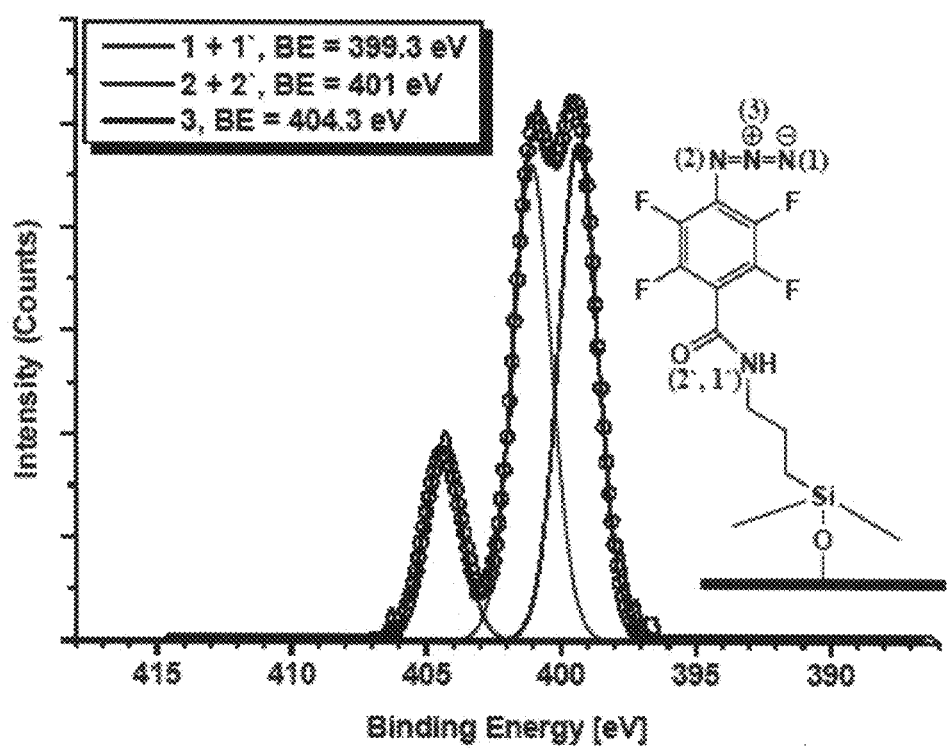
FIG. 49 is an XPS N 1s core level spectrum of PFPA-silane linked on a silicon wafer.

Further evidence confirming the covalent bond formation between graphene and the PFPA-functionalized silicon wafer was provided by X-ray photoelectron spectroscopy (XPS). FIG. 49 is a curve-fitted XPS N 1s core level spectrum of PFPA-silane linked on a silicon wafer. Three components were resolved at binding energies of 399.3, 401.4, and 404.3 eV, corresponding to (—C—N=N$^+$=N$^-$ and O=C—NH—CH$_2$—), (—C—N=N$^+$=N$^-$ and O=C—NH—CH$_2$—), and (—C—N=N$^+$=N$^-$), respectively. The peak ratio of 399 eV/401 eV is around 1:1. Table 2 summarizes the XPS peak assignments of the N 1s core level spectrum of the PFPA moiety on the PFPA-functionalized wafer.

TABLE 2

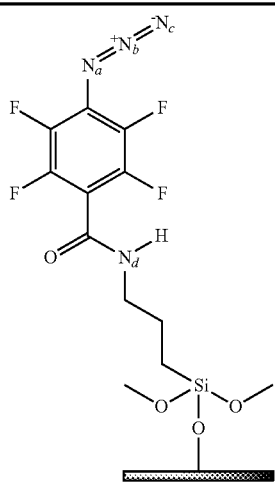

TABLE 2-continued

| | Binding Energy, eV | | |
|---|---|---|---|
| $N_a$ | $N_b$ | $N_c$ | $N_d$ |
| 401.4 | 404.3 | 399.3 | 400.8 |

Figure 50:
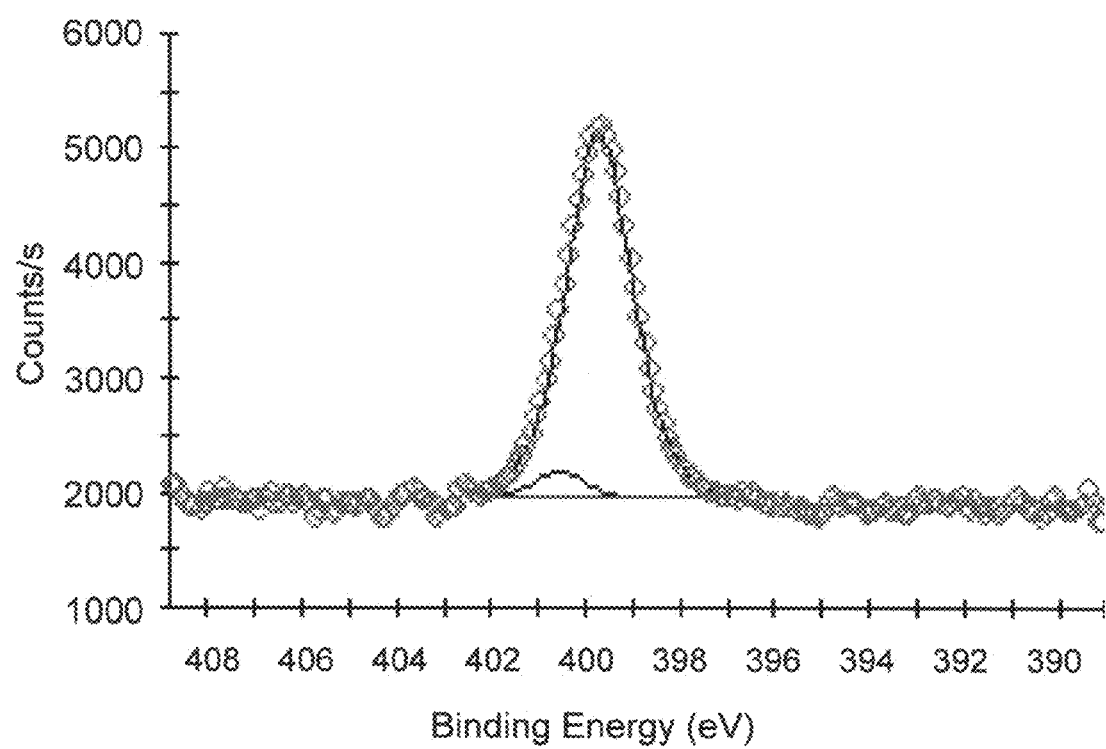
FIG. 50 is an XPS N 1s core level spectrum (open circles) and curve fitting (solid curves) of graphene film immobilized on a silicon wafer.
Figure 51:
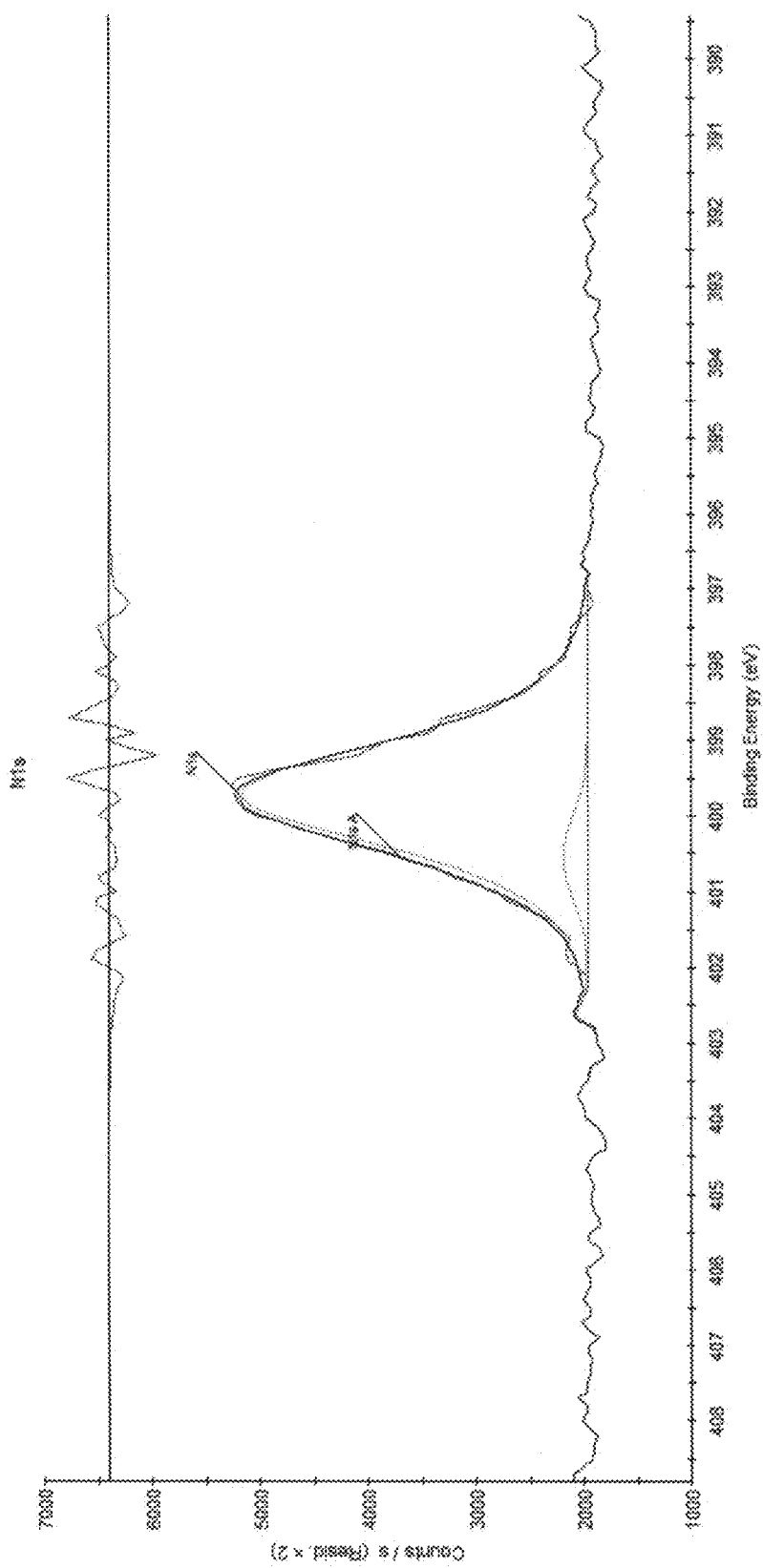
FIG. 51 is an XPS N 1s core level spectrum of graphene film immobilized on a silicon wafer.

After the graphene film was immobilized, the peak at 404.3 eV, corresponding to $N_b$ of the $N_3$ group (—N$_a$=N$_b^+$=N$_c^-$), disappeared, as shown in FIGS. 50-51. The disappearance is consistent with the PFPA reaction where the $N_3$ decomposes and splits off $N_2$ after activation, as illustrated in Scheme 9 above. Simultaneously, N, is expected to disappear, resulting in a significant decrease in the peak intensity at ~399.3 eV. However, a substantial increase in the peak intensity at 399.7 eV was observed in the XPS spectrum of the graphene sample (FIG. 50). This peak is attributed to the N of the aziridine structure formed upon reaction of perfluorophenylnitrene with graphene:

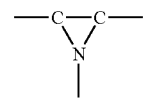

FIG. 51 also shows the disappearance of the peak at 404 eV, indicating activation of the $N_3$ group and its reaction with adjacent graphene. Compared to the PFPA-functionalized wafer itself (FIG. 42), the peak ratio of 39 eV/401 eV increases to 10:1. This increase in N—C signal at 399 eV may be a direct result of covalent bond formation between nitrogen and graphene.

Example 10

Carbohydrate Immobilization on Gold Nanoparticles

PFPA Synthesis

Synthetic route for compounds:

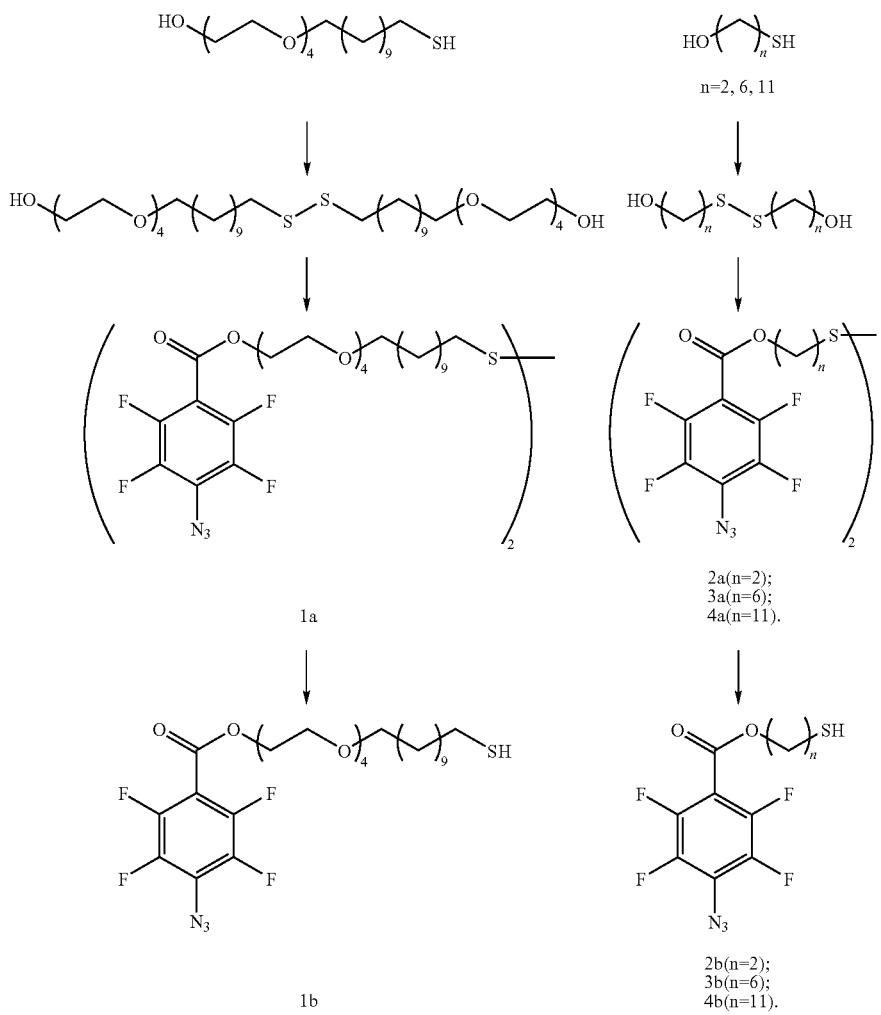

3,6,9,12,37,40,43,46-octaoxa-24,25-dithiaoctatetracontane-1,48-diylbis(4-azido-2,3,5,6-tetrafluorobenzoate). (1a)

100 mg (0.26 mmol) of (1-mercaptoundec-11-yl)tetra(ethylene glycol) in 10 mL absolute ethanol was titrated with a saturated solution of iodine in ethanol until the brown color of iodine persisted. The solution was concentrated into 2 mL and then 10 mL of water was added. The solution was extracted using diethyl ether (3×10 mL). The combined ethereal extracts were washed with brine, dried over $NaSO_4$, and the solvent was removed under reduced pressure to afford the disulfide as brown oil.

61.8 mg (0.26 mmol) of 4-azido-2,3,5,6-tetrafluorobenzoic acid in 10 mL $CH_2Cl_2$ was cooled to 0° C., and then mixed with 3.7 mg (0.03 mmol) of DMAP (4-dimethyl aminopyridine) and 37.5 mg (0.3 mmol) of EDAC (1-ethyl-3-(3-dimethylaminopropyl) carbodiimide hydrochloride) The disulfide obtained above was added into the solution. After stirring for 1 h, the reaction was allowed to warm to room temperature, and stirred for 12 h under argon. The product was recovered by extraction with $CH_2Cl_2$. The organic layer was washed with water, brine, and dried over $Na_2SO_4$ Purification of the crude product was carried out by flash column chromatography (hexane/ethyl acetate=8/1), and solvent was removed under reduced pressure to afford the product as clear oil in 37% yield. $^1H$ NMR (400 MHz, $CDCl_3$): δ (ppm) 4.79 (t, J=8.2 Hz, 2H), 4.35 (dd, J=14.7, 7.4 Hz, 4H), 3.85-3.59 (m, 10H), 3.46 (t, J=7.8 Hz, 2H), 2.57 (d, J=6.6 Hz, 2H), 1.39-1.15 (m, 16H). $^{13}C$ NMR (100 MHz, $CDCl_3$): δ (ppm) 164.9, 148.1, 145.0, 141.0, 140.3, 127.9, 109.5, 70.4, 69.6, 69.1, 68.4, 61.3, 37.4, 36.7, 30.4, 29.3, 29.1, 28.4, 28.0.

23-mercapto-3,6,9,12-tetraoxatricosyl 4-azido-2,3,5,6-tetrafluoro-benzoate. (1b)

To 20 mL of ethanol/acetonitrile, 1:1 by volume, 40 mg of 1a was added. The solution was treated with 0.1 g of zinc dust and 0.05 mL of concentrated HCl, and the reaction mixture was stirred for 2 hour under argon at room temperature. The reaction mixture was filtered to remove zinc and zinc salts, and the solvents were removed by rotary evaporation. The residue was dissolved in chloroform. The resulting solution was washed twice with water and dilute aqueous sodium bicarbonates, and the organic layer was dried over $NaSO_4$. Removal of the solvent by rotary evaporation afford 1b as clear oil that solidified in the cold to a waxy material: $^1H$ NMR (400 MHz, $CDCl_3$): δ (ppm) 4.80 (t, J=5.4 Hz, 2H), 4.36 (dd, J=11.2, 5.7 Hz, 4H), 3.83-3.58 (m, 10H), 3.45 (t, J=7.4 Hz, 2H), 2.36 (d, J=6.3 Hz, 2H), 1.64 (br s, 1H), 1.38-

1.15 (m, 16H). $^{13}$C NMR (100 MHz, CDCl$_3$): δ (ppm) 165.7, 147.6, 145.2, 141.2, 140.6, 128.2, 108.9, 70.5, 69.9, 69.1, 68.5, 61.8, 37.7, 30.3, 29.7, 29.2, 28.7, 28.1, 23.4.

11,11'-disulfanediylbi(undecane-11,1-diyl)bis(4-azido-2,3,5,6-tetrafluorobenzoate). (4a)

90 mg (0.42 mmol) of 11-mercapto-1-undecanol in 15 mL absolute ethanol was titrated with a saturated solution of iodine in ethanol until the brown color of iodine persisted. The solution was concentrated into 2 mL and then 15 mL of water was added. The solution was extracted using diethyl ether (3×15 mL). The combined ethereal extracts were washed with brine, dried over NaSO$_4$, and the solvent was removed under reduced pressure to afford the disulfide as brown oil.

100 mg (0.42 mmol) of 4-azido-2,3,5,6-tetrafluorobenzoic acid in 15 mL CH$_2$Cl$_2$ was cooled to 0° C., and then mixed with 5.2 mg (0.042 mmol) of DMAP (4-dimethyl aminopyridine) and 88.56 mg (0.46 mmol) of EDAC (1-ethyl-3-(3-dimethylaminopropyl) carbodiimide hydrochloride). The disulfide obtained above was added to the solution. After stirring for 1 h, the reaction was allowed to warm to room temperature, and stirred for 12 h. The product was recovered by extraction with CH$_2$Cl$_2$. The organic layer was washed with water, brine, and dried over Na$_2$SO$_4$ Purification of the crude product was carried out by flash column chromatography (hexane/ethyl acetate=10/1), to afford the product as slight yellow oil in 42% yield. $^1$H NMR (400 MHz, CDCl$_3$): δ (ppm) 4.36 (t, J=7.4 Hz, 2H), 2.68 (t, J=7.2 Hz, 2H), 1.76-1.72 (m, 4H), 1.41-1.28 (m, 14H). $^{13}$C NMR (100 MHz, CDCl$_3$): δ (ppm) 159.4, 147.4, 144.1, 142.5, 141.8, 139.0, 124.7, 107.1, 63.8, 38.7, 34.4, 31.5, 29.8, 28.8, 28.1, 27.7, 25.1. Anal. Calcd for C$_{36}$H$_{44}$F$_8$N$_6$O$_4$S$_2$: C, 51.42; H, 5.27; N, 9.99. Found C, 51.50; H, 5.31; N, 10.01.

11-mercaptoundecyl 4-azido-2,3,5,6-tetrafluorobenzoate. (4b)

To 20 mL of ethanol/acetonitrile, 1:1 by volume, 50 mg of 4a was added. The solution was treated with 0.1 g of zinc dust and 0.05 mL of concentrated HCl, and the reaction mixture was stirred for 2 hours at room temperature. The reaction mixture was filtered to remove zinc and zinc salts, and the solvents were removed by rotary evaporation. The residue was dissolved in chloroform. The resulting solution was washed once with water and dilute aqueous sodium bicarbonate, and the organic layer was dried over NaSO$_4$. The solvent was removed by rotary evaporation to afford 4b as oil that solidified in the cold to a waxy material. $^1$H NMR (400 MHz, CDCl$_3$): δ (ppm) 4.27 (t, J=6.5 Hz, 2H), 2.51 (t, J=6.6 Hz, 2H), 1.72-1.56 (m, 9H), 1.40-1.27 (m, 14H). $^{13}$C (100 MHz, CDCl$_3$) 6 (ppm) 159.5, 147.7, 144.4, 142.6, 139.2, 125.3, 107.4, 64.4, 34.5, 31.6, 29.7, 29.0, 28.3, 28.0, 25.4, 23.0. Anal. Calcd for C$_{18}$H$_{23}$F$_4$N$_3$O$_2$S: C, 51.30; H, 5.50; N, 9.97. Found C, 51.36; H, 5.51; N, 9.99.

2,2'-disulfanediylbis(ethane-2,1-diyl)bis(4-azido-2,3,5,6-tetrafluoro-benzoate). (2a)

Preparation of 2a was described Pei et al. (*Anal. Chem.*, 2007, 79:6897-6902.)

2-mercaptoethyl 4-azido-2,3,5,6-tetrafluorobenzoate. (2b)

Preparation of 2b was carried out as described for 4b. $^1$H NMR (400 MHz, CDCl$_3$): δ (ppm) 4.45 (t, J=8.0 Hz, 2H), 2.86 (t, J=7.8 Hz, 2H), 1.63 (t, J=6.4 Hz, 1H); $^{13}$C NMR (100 MHz, CDCl$_3$): δ (ppm) 166.4, 147.8, 144.4, 141.7, 139.2, 124.2, 106.8, 64.0, 23.2. Anal. Calcd for C$_9$H$_5$F$_4$N$_3$O$_2$S: C, 36.32; H, 1.71; N, 14.23. Found C, 36.35; H, 1.77; N, 14.02.

6,6'-disulfanediylbis(hexane-6,1-diyl)bis(4-azido-2, 3,5,6-tetrafluoro-benzoate). (3a)

Preparation of 3a was carried out as described for 4a. $^1$H NMR (400 MHz, CDCl$_3$) δ (ppm) 4.37 (t, J=7.5 Hz, 2H), 3.65 (t, J=6.5 Hz, 2H), 1.69-1.63 (m, 8H), 1.45-1.40 (m, 8H). $^{13}$C NMR (100 MHz, CDCl$_3$): δ (ppm) 159.4, 147.8, 146.7, 143.7, 138.0, 125.0, 107.1, 64.6, 36.1, 29.0, 28.1, 25.4, 22.7. Anal. Calcd for C$_{26}$H$_{24}$F$_8$N$_6$O$_4$S$_2$: C, 44.57; H, 3.45; N, 12.00. Found C, 44.63; H, 3.50; N, 11.96.

6-mercaptohexyl 4-azido-2,3,5,6-tetrafluorobenzoate. (3b)

Preparation of 3b was carried out as described for 4b. $^1$H NMR (400 MHz, CDCl$_3$): δ (ppm) 4.32 (t, J=8.8 Hz, 2H), 2.54 (t, J=8.4 Hz, 2H), 1.75 (m, 2H), 1.65 (m, 2H), 1.46-1.32 (m, 5H). $^{13}$C NMR (100 MHz, CDCl$_3$): δ (ppm) 159.7, 147.9, 146.9, 144.2, 138.7, 125.4, 107.2, 64.8, 39.1, 36.4, 29.1, 28.4, 25.7. Anal. Calcd for C$_{13}$H$_{13}$F$_4$N$_3$O$_2$S: C, 44.44; H, 3.73; N, 11.96. Found C, 44.31; H, 3.75; N, 12.04.

Gold Nanoparticle Synthesis and PFPA-Disulfide Functionalization

Gold nanoparticles were prepared following a modified procedure of the two-phase system. (Brust et al., *J. Chem. Soc., Chem. Commun.*, 1994, 801-802.) A 0.25 mM aqueous solution (100 mL) of HAuCl$_4$ (Aldrich) was heated to boiling and 1 wt % sodium citrate solution (1.8 mL) was added quickly with vigorous stirring. The solution was allowed to boil for an additional 5 min until the color of the solution became first dark purple and finally light red.

A 1.7 mM solution of PFPA-disulfide in acetone (5 mL) was added slowly to the Au nanoparticle solution, and the solution was stirred for 10 hours when it turned to a burgundy color. Toluene (15 mL) was subsequently added, and the mixture vigorously stirred for 1 hour, leaving behind a light pink aqueous phase. The toluene layer was then separated, concentrated to 5 mL using a rotary evaporator at 45° C., and then diluted with acetone (20 mL). The diluted solution was kept in the refrigerator overnight, and then centrifuged at 14,000 rpm for 30 min. Precipitates were collected, re-dissolved in acetone by sonication for 1 min, and further centrifuged. The re-dissolution and centrifugation processes were repeated 3 times to remove the excess PFPA-disulfide. The functionalized gold nanoparticles were kept in acetone for storage. To determine the concentration of functionalized Au nanoparticles, an aliquot of the solution was centrifuged, and the precipitate collected, dried, and weighed.

Carbohydrate Immobilization

A solution of PFPA-functionalized gold nanoparticles (1.5 mL) was mixed with 2.9 mM α-1,4-mannobiose aqueous solution (0.1 mL) in a short, flat beaker. The mixture was covered with a 280-nm long-path optical filter (Schott Glass, WG-280) and was irradiated with a 450-W medium pressure Hg lamp (Hanovia) for 5 min with vigorous stirring. Centrifugation of the solution at 14,000 rpm for 15 min separated the mannobiose-attached gold nanoparticles as precipitates. Excess mannobiose was removed by rinsing the nanoparticles with water 3 times and centrifugation.

Binding Assays

The carbohydrate-attached gold nanoparticles were incubated in a pH 7.4 PBS buffer solution containing 0.1% Tween 20 and 3% bovine serum albumin (BSA) for 30 min, centrifuged, and incubated in a PBS solution without BSA for another 20 min. The nanoparticles were subsequently treated with 10 μg/mL Con A (Sigma) solution in pH 7.4 PBS buffer (0.05 mL) containing 10 mM $MnCl_2$ and $CaCl_2$ for 1 hour while shaking. In cases where aggregation was induced after binding with Con A, the suspension was transferred to a centrifuge tube and centrifuged at 14,000 rpm for 15 min.

Ligand Density Measurement

A freshly-prepared anthrone solution in concentrated $H_2SO_4$ (0.5 wt %, 1 mL) was added into various concentrations of D-mannose in water (0.5 mL) in an ice bath under stirring. The solution was then heated to 100° C. and stirred for 10 min. The UV-vis spectra of the resulting solutions were recorded on a Perkin-Elmer Lambda 45 UV-vis spectrometer. The absorbance of the solution at 620 nm was measured and the data were plotted against the concentration of D-mannose. The result was used as the calibration curve for the calculation of the ligand density on Au NPs.

Ligand density experiments for Au nanoparticles were carried out by dissolving D-mannose-conjugated Au nanoparticles (0.3-0.5 mg) in 0.5 mL Milli-Q water, and the solutions were treated with anthrone/$H_2SO_4$ following the same protocol described above. The density of D-mannose immobilized was determined using the calibration curve.

Results and Analysis

Figure 52:
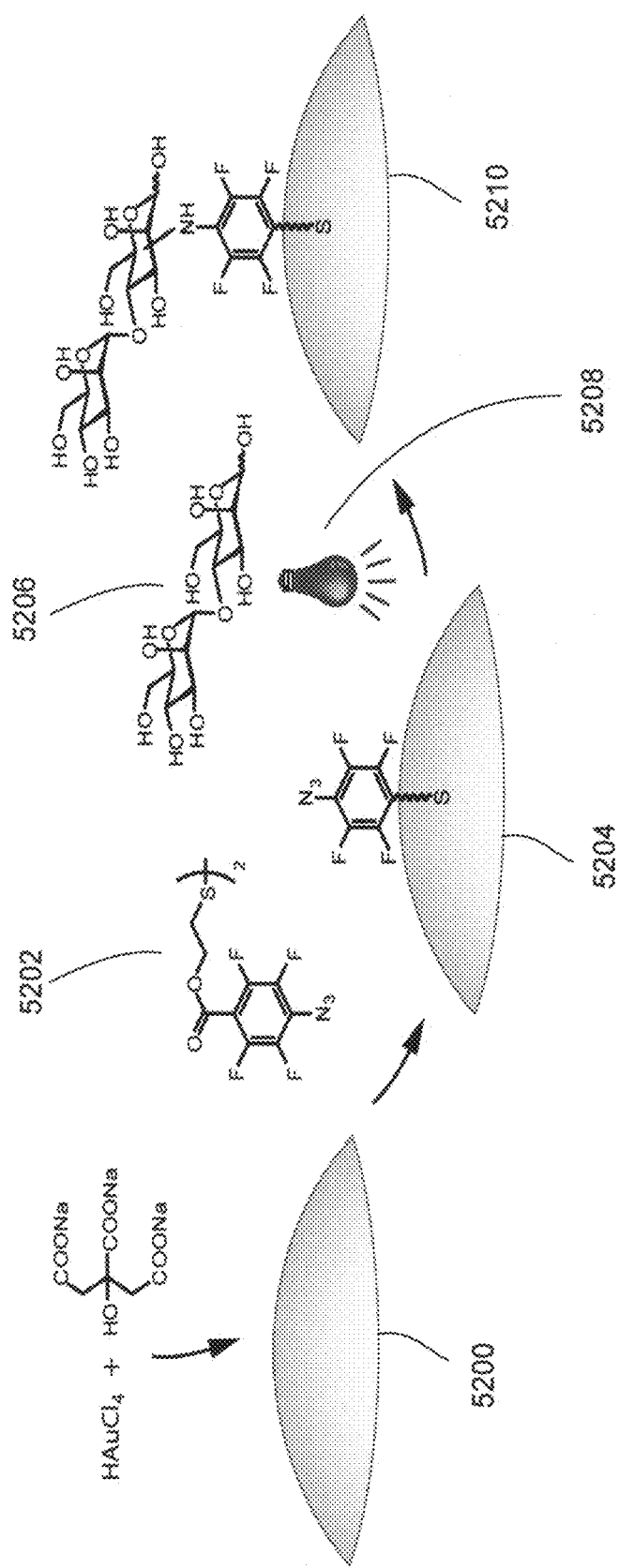
FIG. 52 illustrates one disclosed embodiment for immobilizing carbohydrates on gold nanoparticles.

FIG. 52 illustrates the procedure for immobilizing carbohydrates on gold nanoparticles. Gold nanoparticles 5200 are synthesized as described above. The nanoparticles 5200 are functionalized with PFPA-disulfide 5202 to provide PFPA-functionalized gold nanoparticles 5204. Carbohydrate molecules 5206 are coupled to the PFPA-functionalized gold nanoparticles 5204 and covalently immobilized by irradiation with UV light 5208 to produce carbohydrate-coupled gold nanoparticles 5210.

Figure 53:
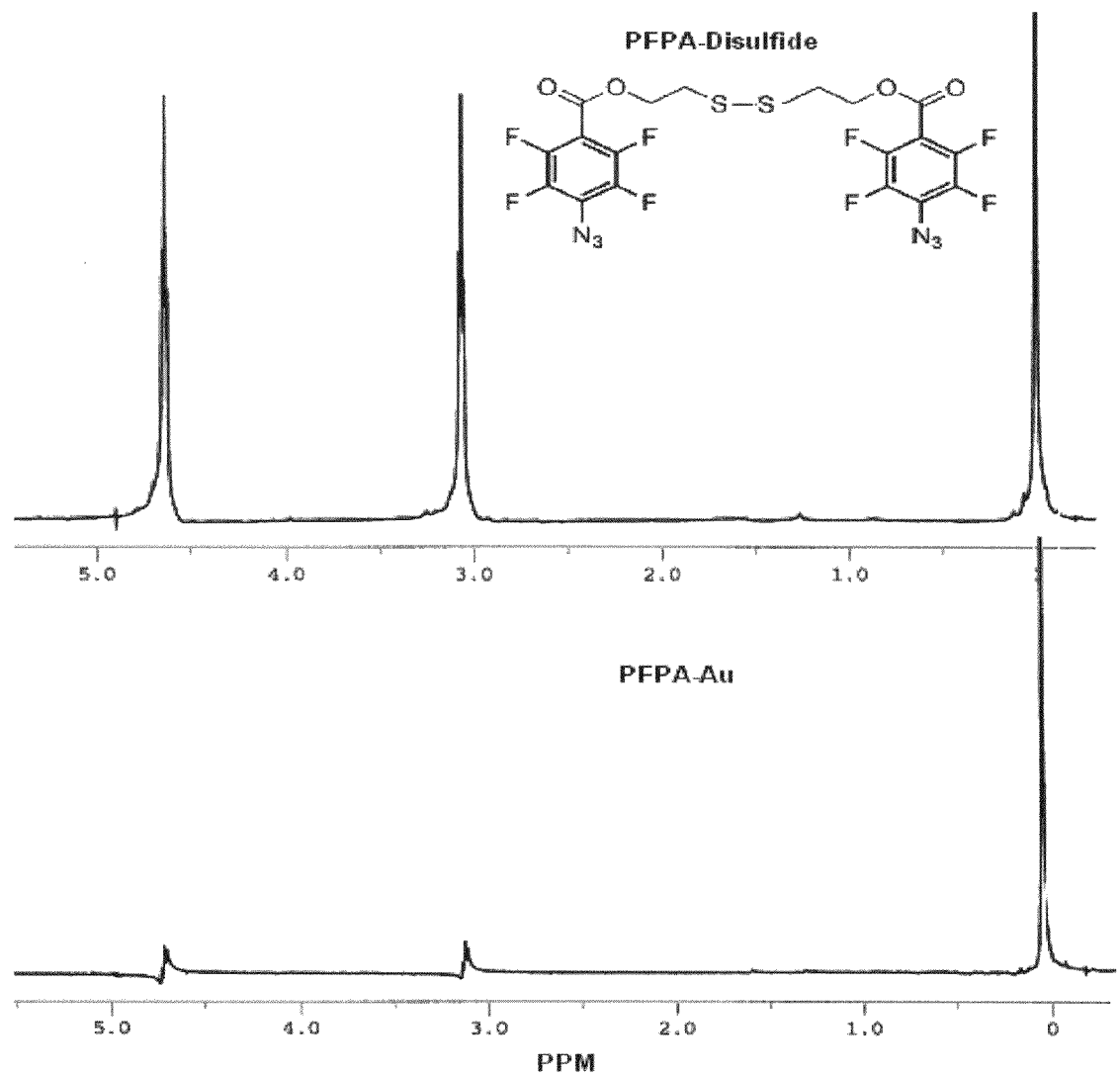
FIG. 53 is $^1$H NMR spectra of PFPA-disulfide and gold nanoparticles functionalized with PFPA-disulfide (PFPA-Au) in CDCl3 with TMS (δ 0.0 ppm).

Colloidal Au nanoparticles (NPs), 20 nm in diameter, were prepared. The resulting citrate-stabilized Au NPs were light red in color exhibiting a surface plasmon absorption peak at ~520 nm. The Au NPs were subsequently functionalized with PFPA-disulfide, after which the PFPA-functionalized Au NPs migrated to the organic phase, indicating that the hydrophilic surface of citrate-stabilized Au nanoparticles became hydrophobic. The successful functionalization of Au NPs with PFPA was confirmed by $^1H$ NMR and FTIR, as shown in FIG. 53.

Figure 54:
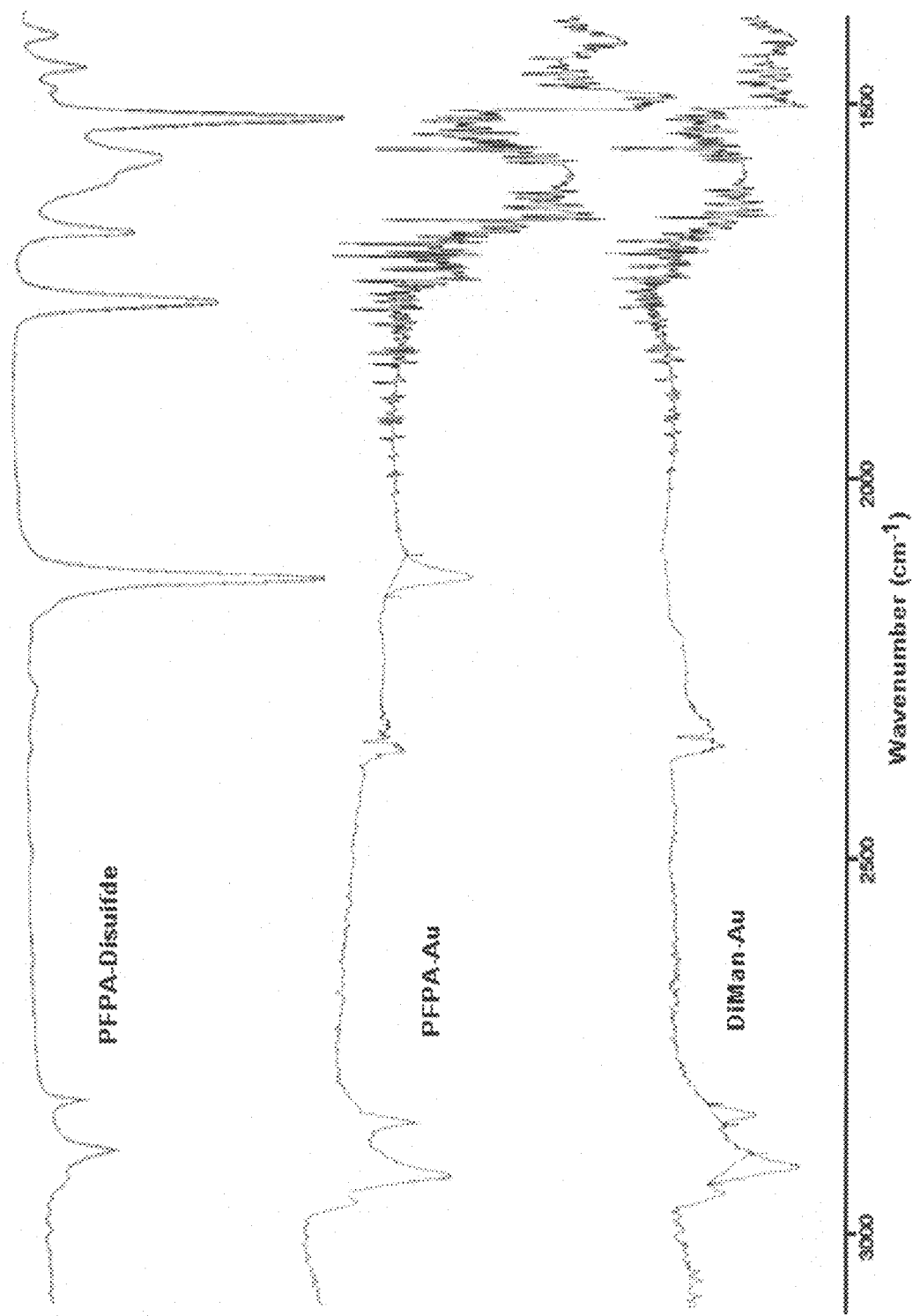
FIG. 54 is FT-IR spectra of PFPA-disulfide, gold nanoparticles functionalized with PFPA-disulfide (PFPA-Au), and Au nanoparticles subsequently coupled with α-1,4-mannobiose (DiMan-Au).

FTIR spectra of the PFPA-disulfide, PFPA-functionalized nanoparticles, and carbohydrate-coupled nanoparticles show the disappearance of the characteristic —$N_3$ absorption at 2125 $cm^{-1}$ (FIG. 54), indicating that the azido groups were activated.

Figure 55:
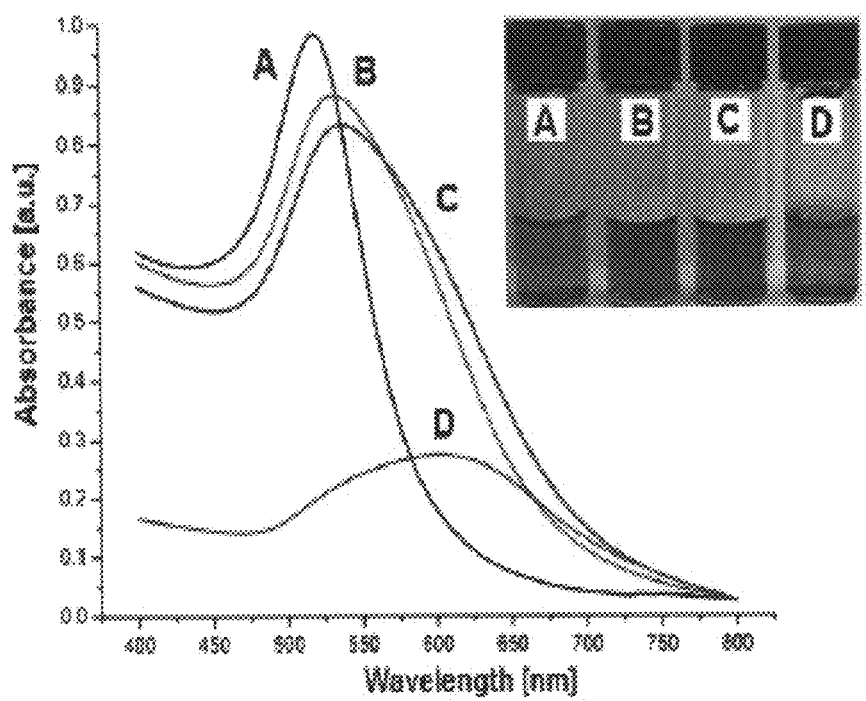
FIG. 55 is a series of UV-via spectra for (A) gold nanoparticles, (B) PFPA-thiol functionalized gold nanoparticles, (C) gold nanoparticles with surface-coupled α-1,4-mannobiose, and (D) gold nanoparticles with surface-coupled α-1,4-mannobiose subsequently treated with Concanavalin A. The inset is a color photograph of the four nanoparticle solutions.
Figure 56:
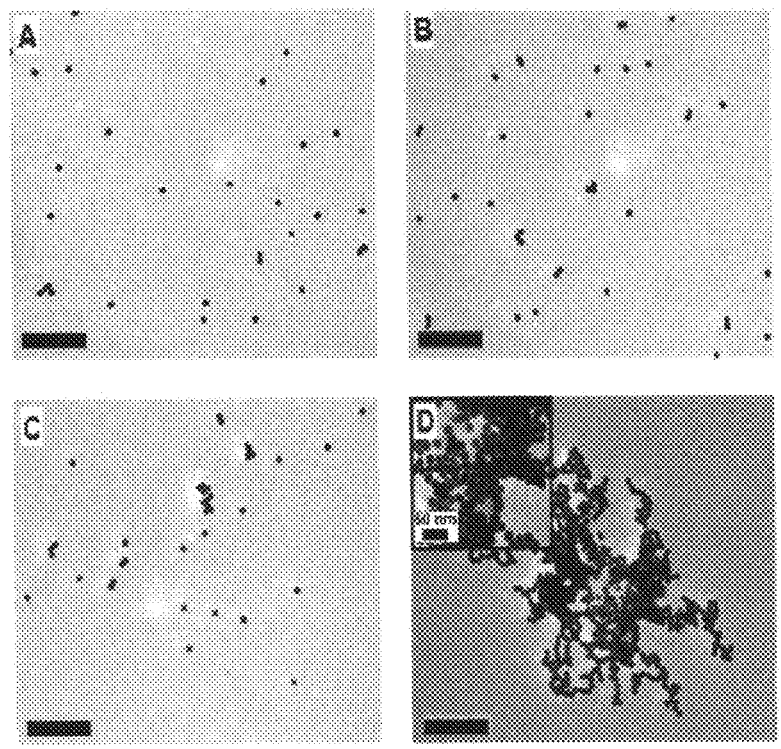
FIG. 56 is a series of TEM images of (A) gold nanoparticles, (B) PFPA-thiol functionalized gold nanoparticles, (C) gold nanoparticles with surface-coupled α-1,4-mannobiose, and (D) gold nanoparticles with surface-coupled α-1,4-mannobiose subsequently treated with Concanavalin A.

Accompanied by each step of surface functionalization is the color change of the nanoparticle solution. FIG. 55 is a series of UV-vis spectra of (A) gold nanoparticles, (B) PFPA-thiol-functionalized gold nanoparticles, (C) α-1,4-mannobiose coupled on gold nanoparticles, and (D) α-1,4-mannobiose coupled on gold nanoparticles and subsequently treated with Concanavalin A. The UV-vis spectra of PFPA-Au and mannobiose-Au both underwent red-shifts after surface functionalization (8 nm and 4 nm, respectively), likely due to the slight size growth and the change of environment around the nanoparticles. FIG. 56 is a series of TEM images of the nanoparticles.

Figure 57:
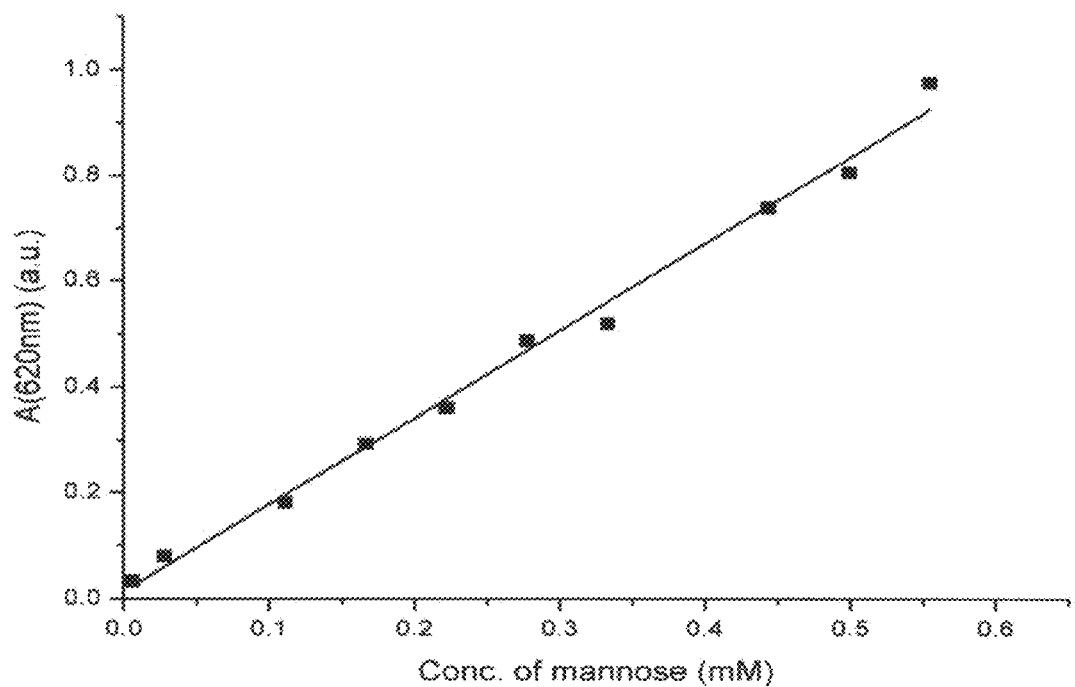
FIG. 57 is a calibration curve obtained by treating various concentrations of D-mannose with anthrone/sulfuric acid and measuring the absorption at 620 nm.

The amount of carbohydrate ligands photochemically coupled to the Au NPs was determined by a colorimetry method using anthrone/sulfuric acid. The ligand density on Au NPs using D-mannose was determined. A calibration curve was obtained by treating various concentrations of D-mannose with anthrone/sulfuric acid, and the absorption at 620 nm was measured (FIG. 57). Au NPs with D-mannose immobilized were then treated with the same assay and the absorptions at 620 nm were recorded. The amount of D-mannose attached to Au NPs was subsequently derived from the calibration curve, which averaged at 23.9 nmol/mg Au NPs, or 1,200 molecules per Au NP. Assuming that D-mannose ligands are close-packed on the NP, the maximal amount of D-mannose that can occupy each 20-nm Au NP was calculated to be 71.7 nmol/mg Au NPs, or 3,500 molecules per Au NP. This result corresponds to a surface coverage of 33% of the photocoupled D-mannose, indicating a fairly reasonable coupling efficiency.

The maximal number of D-mannose molecules on each Au NP is calculated as follows. Assuming that D-mannose takes the shape of a square in space, each side of the square is measured to be ~6 Å by Chem 3D (CambridgeSoft., Ultra, version 9.0). Accordingly, the surface area of each D-mannose molecule is 36 $Å^2$. The surface area of one 20-nm Au NP is $1.26×10^5$ $Å^2$. The maximal number of D-mannose molecules occupying the surface of one Au NP in a closely packed manner is 3,500 (=$1.26×10^5$ $Å^2$/36 $Å^2$).

The number of moles of D-mannose molecules per mg of Au NPs was calculated as follows. The number of moles of D-mannose molecules per mole of Au NPs is 3,500, as calculated above. The volume of each 20-nm diameter Au NP is $4.19×10^6$ $Å^3$. Assuming that the density of Au NPs equals to that of gold (19.32 $g/cm^3$), the weight of each Au NP is $8.09×10^{-14}$ mg. Thus, 1 mg of Au NPs is equivalent to 0.0205 nmol of nanoparticles. The moles of D-mannose on 1 mg of Au NPs is 71.7 nmol (0.0205×3,500).

To investigate the insertion yield of the photocoupling reaction, various concentrations of D-mannose were used when mixing with PFPA-functionalized Au NPs during light activation. Here another PFPA-disulfide 1 was used in the study. The amount of D-mannose attached to Au NPs was then determined by the anthrone/sulfuric acid assay described above, and results are shown in Table 3. At lower ligand loading, the coupling yield was fairly high but the surface coverage was low. As the amount of added ligand increased, the coupling efficiency decreased whereas the surface coverage increased drastically before saturating at around 80%. Even at a low ligand loading concentration of 100 nmol/mg NPs, high surface coverage was obtained while relatively high coupling efficiency of 57% was maintained. The result is significant because it shows that a large excess of ligand is unnecessary. This is especially beneficial for carbohydrates that are expensive or difficult to obtain. Moreover, this approach provides a way to control the ligand density on the NPs. Nanoparticles with coupled D-mannose density varying over 3 orders of magnitude can be produced just by changing the amount of the ligand initially added.

TABLE 3

Coupling efficiency and surface coverage of D-mannose immobilized on Au NPs using PFPA-disulfide 1 as the coupling agent

| Mannose Added (nmol/mg NPs) | Mannose Coupled (nmol/mg NPs) | Coupling Yield[a] (%) | Surface Coverage[b] (%) |
|---|---|---|---|
| 0.1 | 0.08 | 84.5 | 0.11 |
| 0.5 | 0.40 | 80.2 | 0.56 |
| 1 | 0.78 | 78.2 | 1.09 |
| 5 | 3.06 | 61.1 | 4.27 |
| 10 | 5.28 | 52.8 | 7.36 |
| 50 | 29.5 | 59.1 | 41.1 |
| 80 | 44.4 | 55.5 | 61.9 |
| 100 | 57.4 | 57.4 | 80.0 |
| 120 | 57.5 | N/A | 80.2 |
| 150 | 57.4 | N/A | 80.0 |

[a] Coupling Yield = Mannose Coupled/Mannose Added × 100%.
[b] Surface Coverage = Mannose Coupled/Max. Mannose Computed × 100%. The Max. Mannose Computed is 71.7 nmol/mg NPs for 20-nm Au NPs (see Supporting Information for detailed calculation).

Figure 58:
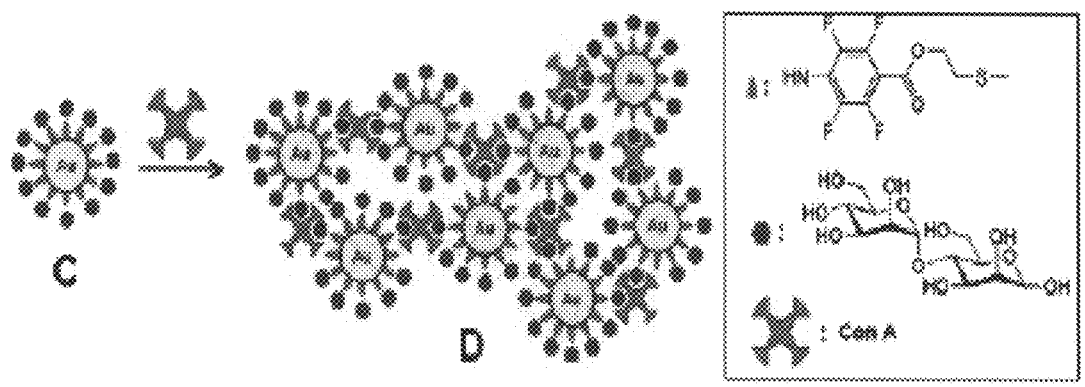
FIG. 58 is a schematic diagram illustrating the interaction of mannobiose-coupled gold nanoparticles with Concanavalin A and the formation of gold nanoparticle aggregates.

The carbohydrate conjugated NPs were subsequently subjected to binding studies with carbohydrate-binding proteins to investigate whether the coupled carbohydrates retained their binding affinity. Concanavalin A (Con A), a mannose-binding protein, was used as a model system to test the effectiveness of this carbohydrate coupling chemistry. At neutral pH, Con A is tetrameric, with each monomer having one saccharide binding site specific for mannose, and to a less extent, glucose. Upon treating the mannobiose-Au NPs with Con A, rapid and drastic color change occurred (D, FIG. 55 insert), and the UV-vis spectrum of the resulting solution showed a large SPR red-shift of ~75 nm (D, FIG. 55). Simultaneously observed was cluster formation causing the broadening of the SPR peak and a decrease in the absorption intensity. The aggregation of the nanoparticles is likely a result of Con A's multiple binding sites for mannose bringing together dimannose-modified nanoparticles. TEM micrographs showed that the nanoparticles were discrete and isolated until the addition of Con A (FIG. 56). The tetrameric Con A acted as a crosslinking agent that agglomerated mannose strongly, forming larger sizes of nanoclusters (FIG. 58).

Figure 59A:
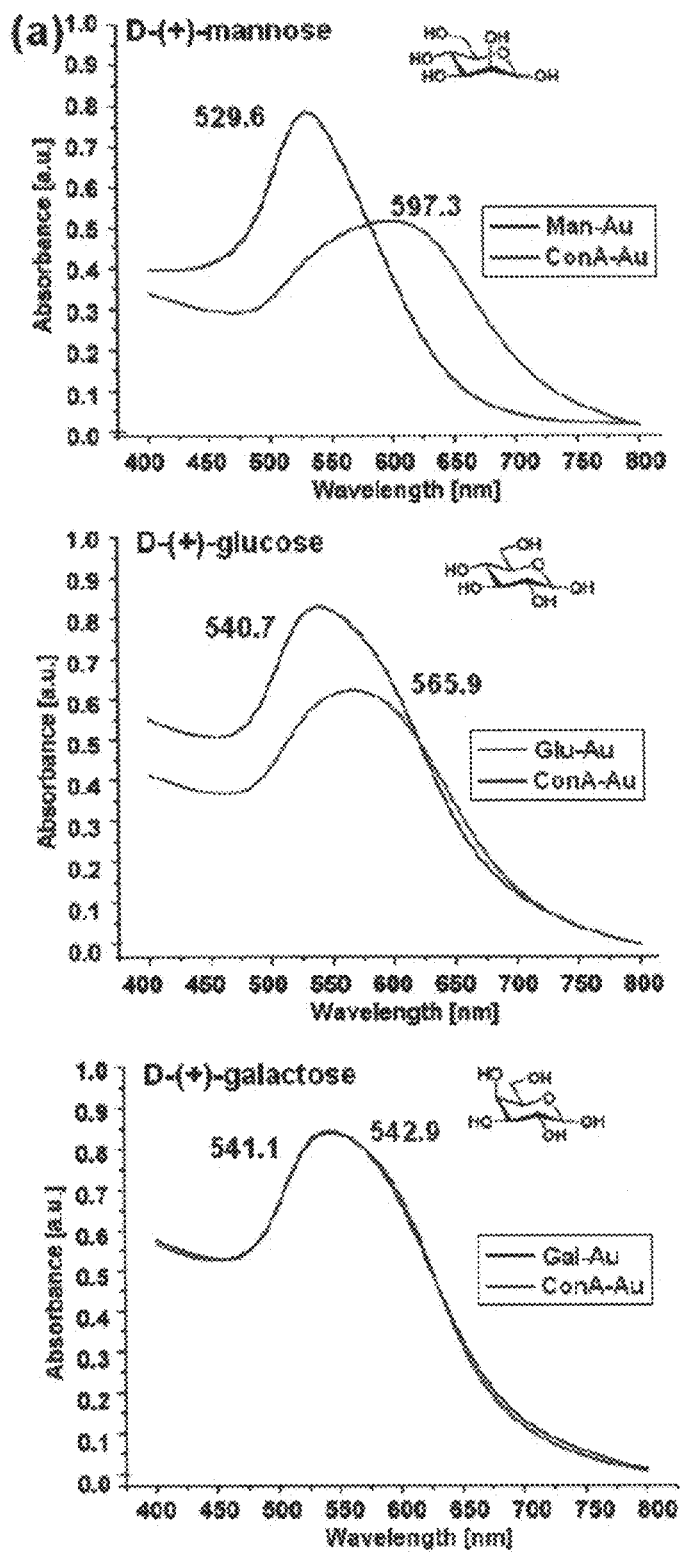
FIGS. 59A-B are a series of UV-vis spectra of monosaccharide- and disaccharide-functionalized gold nanoparticles before and after binding with Concanavalin A.
Figure 59B:
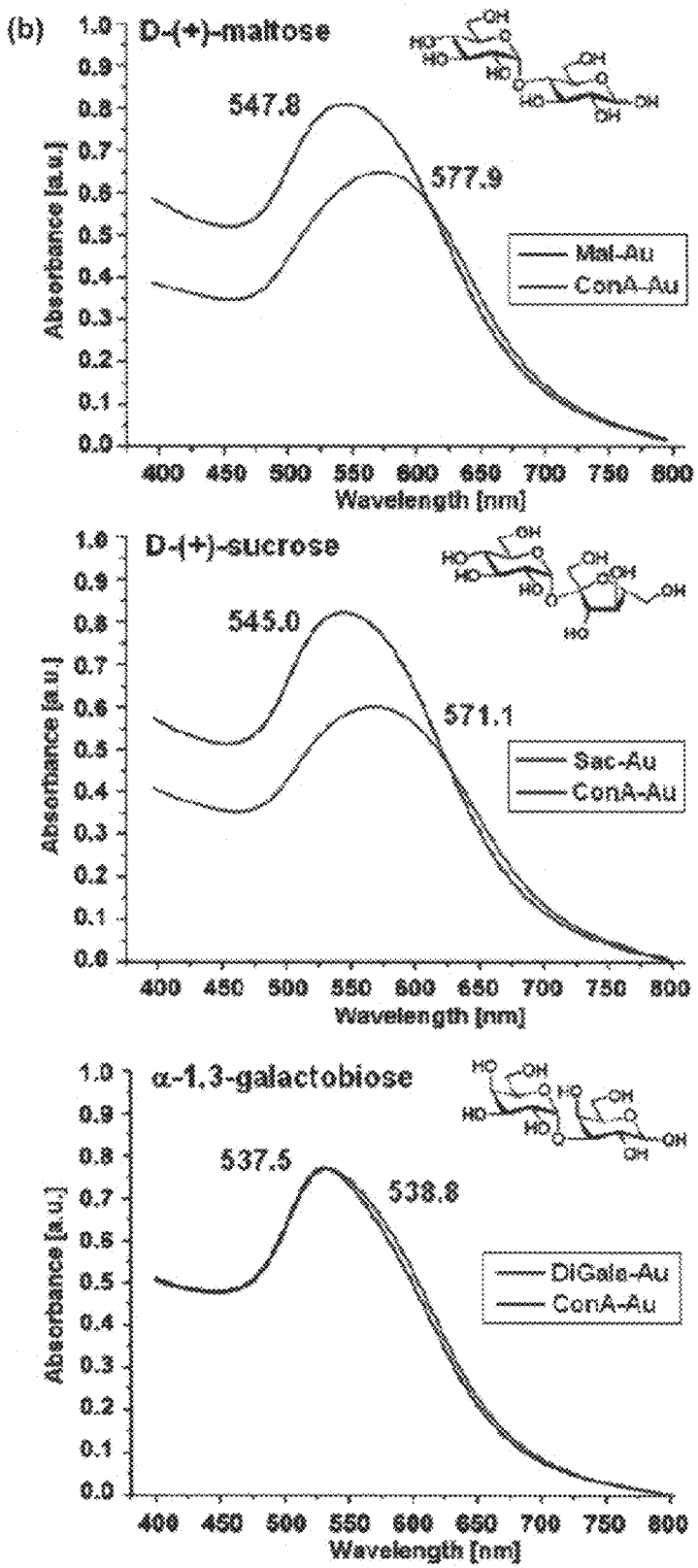

To investigate the generality of this coupling chemistry and the specificity of the resulting recognition system, additional monosaccharides (mannose, glucose, galactose) and disaccharides (maltose, sucrose, α-1,3-galactobiose) were immobilized on PFPA-functionalized Au NPs using the same experimental protocols. The resulting carbohydrate-NPs were subsequently treated with Con A and the UV-vis spectra were recorded. Glucose is a known ligand to Con A with a lower binding strength than that of mannose, and galactose has no affinity for Con A. The binding constants vary depending on the measurement methods. In the work by Mandal et al. (*Biochemistry*, 1994, 33:1149-1156), the $K_a$ values of glucose, mannose, and α-1,3-mannobiose were reported to be $1.96 \times 10^3$ $M^{-1}$, $0.82 \times 10^4$ M-1, and $14.2 \times 10^4$ $M^{-1}$, respectively, as measured by isothermal microcalorimetry. In the disclosed embodiments, the UV-vis spectra of the monosaccharide-modified Au NPs showed the largest SPR red-shift for mannose (67.7 nm) compared to glucose (25.2 nm), whereas almost no change was observed for galactose-functionalized NPs (FIG. 59A). These results directly correlated with the affinity ranking of the free monosaccharides with Con A. Similar results were also observed for disaccharide-functionalized NPs (FIG. 52B). Maltose, having two glucose units, showed a red-shift of 30.1 nm whereas sucrose, containing one glucose unit, resulted in a shift of 26.1 nm upon binding with Con A. Almost no change in SPR absorption was observed for galactobiose which consists of two non-binding galactose units (FIG. 59B).

Additional control experiments were carried out by treating mannobiose-functionalized Au NPs with lectins that do not bind mannose to establish that the large SPR shifts and aggregation were the result of the specific mannose-Con A interaction. In the experiments, mannobiose-functionalized Au NPs were incubated with a solution of either *Griffonia simplicifolia* lectin II (GS II), peanut agglutinin (PNA), or soybean agglutinin (SBA), neither of which have an affinity for mannose. The resulting solutions remained unchanged and the UV-vis spectra showed no noticeable red-shift of the SPR peak.

The disclosed embodiments have been described with reference to particular embodiments to exemplify the scope of the invention. It will be apparent to a person of ordinary skill in the art that the invention is not limited to the particular embodiments described, and instead the scope of the disclosed embodiments should be determined with reference to the following claims.

The following patents and applications are considered to be part of the disclosure of this application and are incorporated herein by reference: U.S. Pat. No. 5,465,151, issued Nov. 7, 1995, U.S. Pat. No. 5,580,697, issued Dec. 3, 1996, U.S. Pat. No. 5,582,955, issued Dec. 10, 1996, U.S. Pat. No. 5,587,273, issued Dec. 24, 1996, U.S. Pat. No. 5,830,539, issued Nov. 3, 1998, U.S. Pat. No. 6,022,597, issued Feb. 8, 2000, PCT Application No. PCT/US02/24675, filed Aug. 1, 2002, U.S. patent application Ser. No. 10/769,423, filed Jan. 30, 2004, and U.S. patent application Ser. No. 11/775,190, filed Jul. 9, 2007.

We claim:

1. A device, comprising:
    at least a substrate; and
    graphene covalently bonded to at least a portion of a surface of the substrate using a perhalophenylazide.

2. The device of claim 1, where the substrate is a hematite nanoparticle and the perhalophenylazide comprises a phosphate-perfluorophenylazide.

3. The device of claim 1 where the substrate is a silica nanoparticle and the perhalophenylazide is a silane-perhalophenylazide.

4. The device of claim 1, where the substrate comprises silicon or gold.

5. The device of claim 4, where the device is an integrated circuit.

6. The device of claim 4 where the substrate comprises silicon and the perhalophenylazide is a silane perfluorophenylazide.

7. The device of claim 4 where the substrate comprises gold and the perhalophenylazide is a thiol-perfluorophenylazide.

8. The device of claim 1 where the substrate comprises copper.

9. A method for immobilizing graphene on a silicon wafer, comprising:
    providing a silicon wafer;
    coating the silicon wafer with perfluorophenylazide-silane to produce a functionalized wafer;
    pressing graphite onto the functionalized wafer;
    exposing the graphite and functionalized wafer to heat or ultraviolet irradiation; and
    removing the graphite to produce a graphene-perfluorophenylazide-silicon wafer.

* * * * *